United States Patent
Moser

(10) Patent No.: US 12,505,602 B2
(45) Date of Patent: Dec. 23, 2025

(54) SYSTEM AND METHOD FOR DYNAMIC NEURAL FACE MORPHING

(71) Applicant: Lucio Dorneles Moser, Vancouver (CA)

(72) Inventor: Lucio Dorneles Moser, Vancouver (CA)

(73) Assignee: Digital Domain Virtual Human (US), Inc., Los Angeles, CA (US)

( * ) Notice: Subject to any disclaimer, the term of this patent is extended or adjusted under 35 U.S.C. 154(b) by 114 days.

(21) Appl. No.: 18/625,191

(22) Filed: Apr. 2, 2024

(65) Prior Publication Data

US 2024/0257431 A1    Aug. 1, 2024

Related U.S. Application Data

(63) Continuation of application No. PCT/CA2022/051478, filed on Oct. 6, 2022.
(Continued)

(51) Int. Cl.
   *G06T 13/80* (2011.01)
   *G06T 7/11* (2017.01)
   *G06T 9/00* (2006.01)

(52) U.S. Cl.
   CPC ............ *G06T 13/80* (2013.01); *G06T 7/11* (2017.01); *G06T 9/002* (2013.01);
   (Continued)

(58) Field of Classification Search
   None
   See application file for complete search history.

(56) References Cited

U.S. PATENT DOCUMENTS 10,552,977 B1 *   2/2020   Theis ................... G06T 7/70
12,111,880 B2 *  10/2024   Naruniec ............ G06V 10/774
(Continued)

FOREIGN PATENT DOCUMENTS

| CN | 111652960 A | 7/2022 |
|---|---|---|
| WO | 2022192991 A1 | 9/2022 |
| WO | 2022192992 A1 | 9/2022 |

OTHER PUBLICATIONS

Moser, L. et al. "Dynamic Neural Face Morphing for Visual Effects", Proceedings of SIGGRAPH Asia 2021 Technical Communications, Article No. 2, pp. 1-4, Dec. 14, 2021.
(Continued)

*Primary Examiner* — Nurun Flora
(74) *Attorney, Agent, or Firm* — Todd A. Rattray; Oyen Wiggs Green & Mutala LLP

(57) ABSTRACT

A method morphs an input image depicting a face to an output image depicting a face that is a blend of characteristics of a plurality of input entities. The method comprises: training a face-morphing model comprising: a shared set of parameters shared between the input identities; and, for each of the input entities, an identity-specific set of parameters. The method also comprises: receiving an input image depicting a face of one of the plurality of input identities; receiving a set of interpolation parameters; combining the identity-specific sets of trained neural-network parameters for the plurality input identities based on the interpolation parameters, to thereby obtain a blended set of neural-network parameters; and inferring an output image depicting a face that is a blend of characteristics of the input entities using the shared set of trained neural-network parameters, the blended set of neural-network parameters and the input image.

29 Claims, 18 Drawing Sheets

Related U.S. Application Data

(60) Provisional application No. 63/270,546, filed on Oct. 21, 2021.

(52) U.S. Cl.
CPC .............. *G06T 2207/20081* (2013.01); *G06T 2207/20084* (2013.01); *G06T 2207/30201* (2013.01)

(56) References Cited

U.S. PATENT DOCUMENTS

| | | | |
|---|---|---|---|
| 2021/0142440 A1 | 5/2021 | Ahn et al. | |
| 2021/0327038 A1* | 10/2021 | Helminger | G06T 9/002 |
| 2023/0319223 A1* | 10/2023 | Naruniec | H04N 5/272 |
| | | | 348/239 |
| 2024/0412432 A1* | 12/2024 | Chung | G06T 11/001 |

OTHER PUBLICATIONS

Moser, L. et al. "Semi-supervised video-driven facial animation transfer for productions", ACM Transactions on Graphics, vol. 40/Iss. 6, pp. 1-18, Dec. 10, 2021.

Serra, J. et al. "Accelerating facial motion capture with video-driven animation transfer", Proceedings of SIGGRAPH 2022 Talks, Article No. 19, pp. 1-2, Jul. 24, 2022.

Serra, J. et al. "Simplified facial capture with head mounted cameras", Proceedings of SIGGRAPH 2021 Talks, Article No. 27, pp. 1-2, Aug. 6, 2021.

Bulat, A. et al. "How far are we from solving the 2D & 3D Face Alignment problem? (And a Dataset of 230,000 3D Facial Landmarks)", Proceedings of the 2017 IEEE International Conference on Computer Vision, Oct. 29, 2017.

Umeyama, S. "Least-Squares Estimation of Transformation Parameters Between Two Point Patterns", IEEE Transactions on Pattern Analysis and Machine Intelligence, vol. 13/Iss. 4, pp. 376-380, Apr. 1, 1991.

Naruniec, J. et al. "High-Resolution Neural Face Swapping for Visual Effects", Computer Graphics Forum vol. 39/Iss. 4, pp. 173-184, Jul. 20, 2020.

Chen et al. "Rethinking Atrous Convolution for Semantic Image Segmentation", Computer Vision and Pattern Recognition, arXiv:1706.05587, Jun. 17, 2017.

Buslaev, A. et al. "Albumentations: Fast and Flexible Image Augmentations", Information. vol. 11/Iss. 2, p. 125, Feb. 24, 2020.

Wang et al. "Image quality assessment: from error visibility to structural similarity", IEEE Transactions on Image Processing, vol. 13/Iss. 4, pp. 600-612, Apr. 13, 2004.

Isola, P. et al. "Image-to-Image Translation with Conditional Adversarial Networks", Proceedings of the 2017 IEEE Conference on Computer Vision and Pattern Recognition, pp. 5967-5976, Jul. 26, 2017.

Johnson, J. et al. "Perceptual Losses for Real:Time Style Transfer and Super-Resolution", Proceedings of the European Conference on Computer Vision, pp. 694-711, arXiv:1603.08155, Mar. 27, 2016.

Kingma, D.P. et al. "Auto-Encoding Variational Bayes", Proceedings of the 2nd International Conference on Learning Representations, Dec. 2020.

Ververas et al., "Synthesizing Expressive Face Images by Sliding 3D Blendshape Parameters", Jun. 11, 2020.

Damer et al., "ReGenMorph: Visibly Realistic GAN Generated Face Morphing Attacks by Attack Re-generation", Sep. 24, 2021.

Bahri et al., "Shape My Face: Registering 3D Face Scans by Surface-to-Surface Translation", Dec. 16, 2020.

Cole et al., "Synthesizing Normalized Faces From Facial Identity Features", Jul. 21, 2017.

Wu et al., "F3 A-GAN: Facial Flow for Face Animation With Generative Adversarial Networks", Sep. 23, 2021.

\* cited by examiner

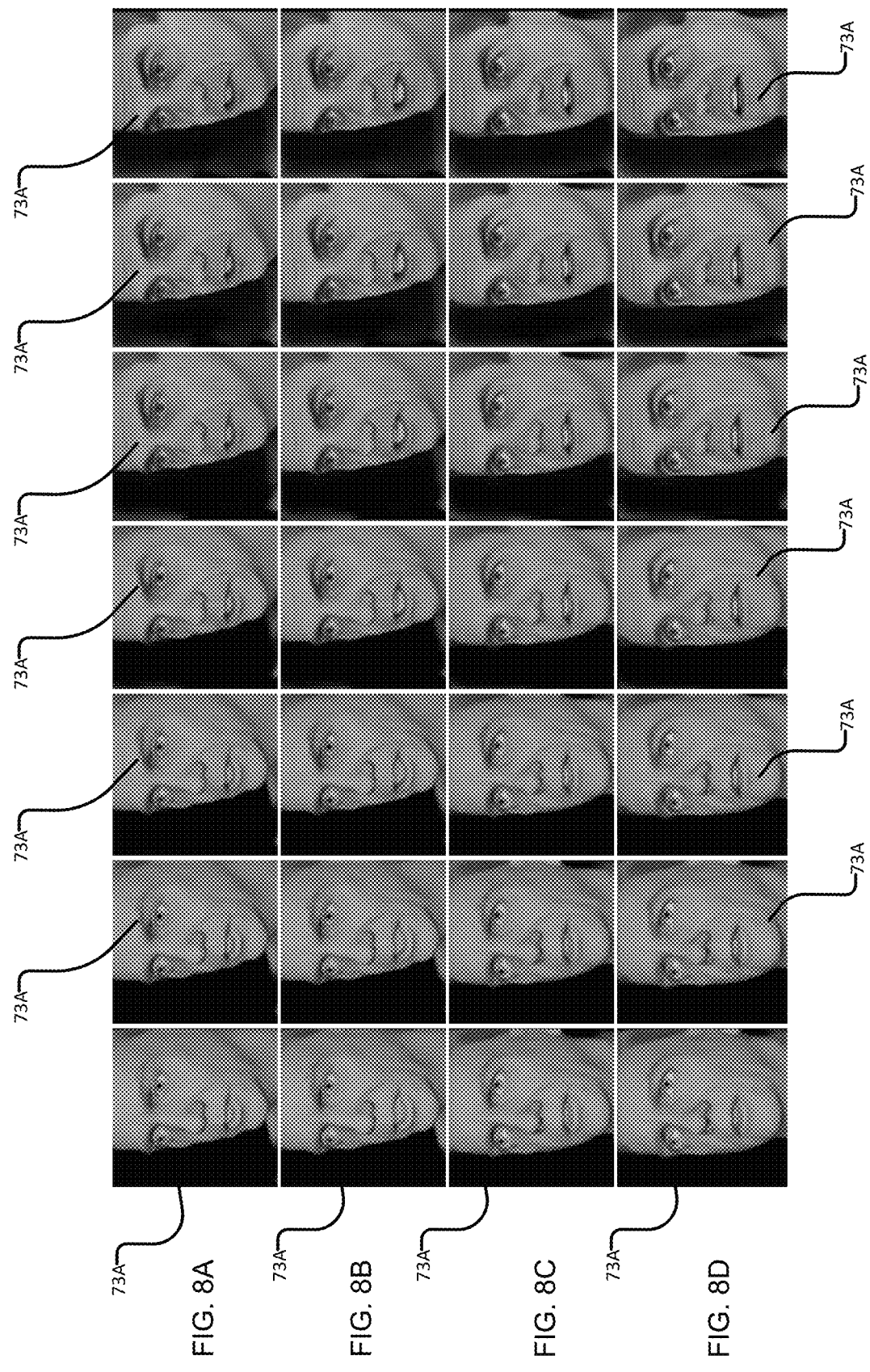

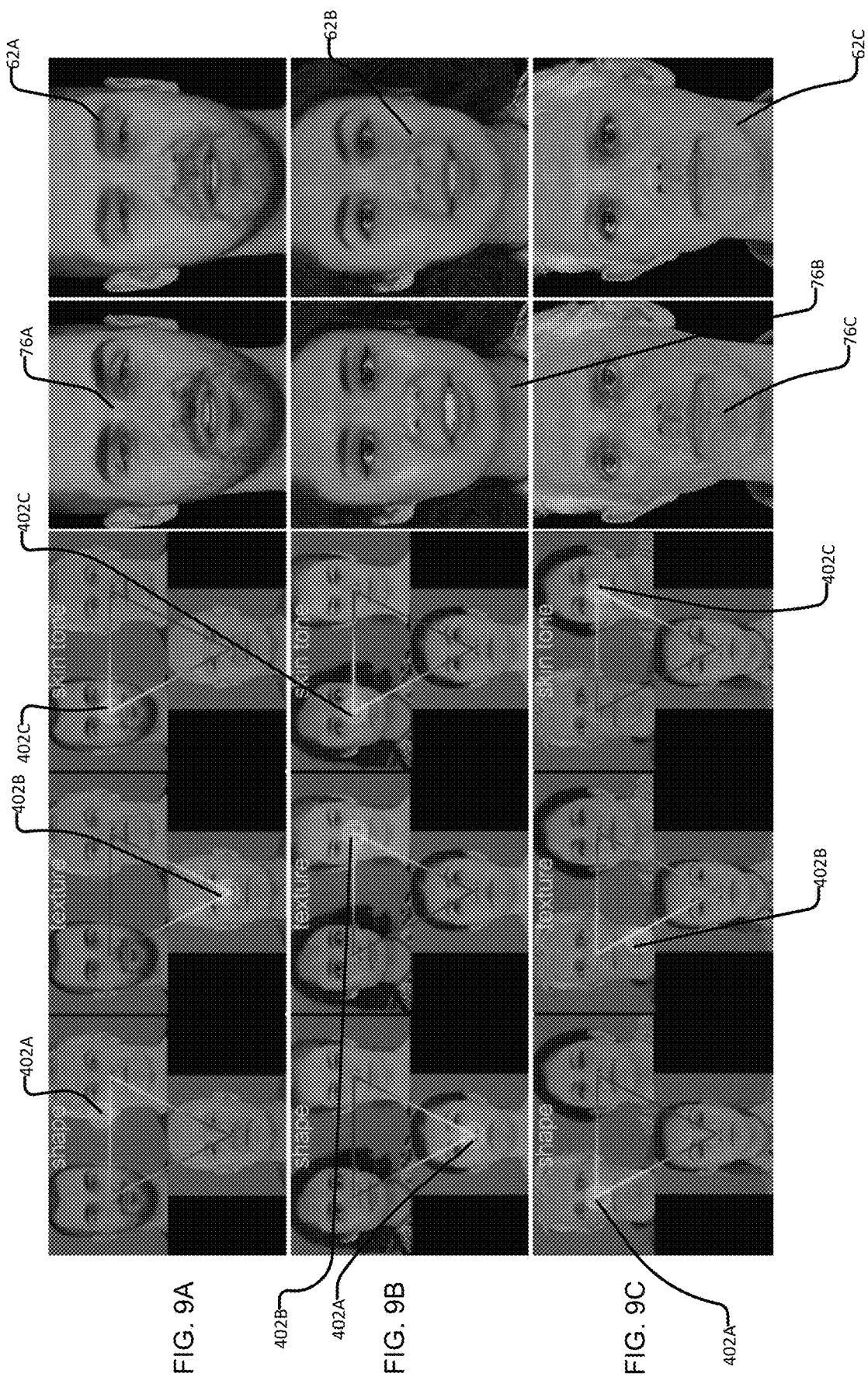

SYSTEM AND METHOD FOR DYNAMIC NEURAL FACE MORPHING

REFERENCE TO RELATED APPLICATIONS

This application is a continuation of Patent Cooperation Treaty (PCT) application No. PCT/CA2022/051478 having an international filing date of 6 Oct. 2022 which in turn claims priority from, and for the purposes of the United States the benefit under 35 USC 119 in relation to, U.S. application No. 63/270,546 filed 21 Oct. 2021. All of the applications in this paragraph are hereby incorporated herein by reference.

TECHNICAL FIELD

This application is directed to systems and methods for computer animation of faces. More particularly, this application is directed to systems and methods for dynamic neural morphing between the faces of pluralities of identities or to morph images of a face in a manner which changes one or more aspects of the original identity but which preserves one or more aspects of the original identity.

BACKGROUND

There is a desire in the field of computer-generated (CG) animation and/or manipulation of facial images to morph images of the face from one identity to another identity and/or to morph images of the face to some form of blend between two or more identities. An identity may comprise a human actor, a CG model that is a likeness of a human character or a CG character generally.

There is also a desire to morph the face of one identity in a manner which changes one or more aspects of the original identity but which preserves one or more aspects of the original identity. For example, it may be desirable to change the gender of an identity, to cause an identity to age and/or the change the ethnicity of an identity.

In some circumstances, there may be desirability that such face morphing occurs smoothly (e.g. over successive frames of video images) to the perception of a viewer.

In some circumstances, it may be desirable that such face morphing be temporally consistent (i.e. without perceptible artifacts) in the context of a series of image frames associated with video or animation.

The foregoing examples of the related art and limitations related thereto are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

One aspect of the invention provides a method, performed on a computer, for morphing an input image depicting a face of one of a plurality of N input identities to an output image depicting a face that is a blend of characteristics of a blending subset of the plurality of N input entities. The method comprises: training a face-morphing model comprising: a shared set of trainable neural-network parameters that are shared between the plurality of N input identities; and for each of the plurality of N input entities, an identity-specific set of trainable neural-network parameters; to thereby obtain a trained face-morphing model comprising: a shared set of trained neural-network parameters that are shared between the plurality of N input identities; and for each of the plurality of N input entities, an identity-specific set of trained neural-network parameters. The method also comprises: receiving an input image depicting a face of one of the plurality of N input identities; receiving a set of interpolation parameters; combining the identity-specific sets of trained neural-network parameters for the blending subset of the plurality of N input identities based on the interpolation parameters, to thereby obtain a blended set of neural-network parameters; and inferring an output image depicting a face that is a blend of characteristics of the blending subset of the N input entities using the shared set of trained neural-network parameters, the blended set of neural-network parameters and the input image.

The blending subset of the plurality of N input entities may comprise a plurality of the input identities which includes one of the plurality of N input identities corresponding to the face depicted in the input image.

The plurality of N input identities may comprise at least one CG character. The plurality of N input identities my comprise at least one human actor.

Training the face-morphing model may comprise: for each of the plurality of N identities: obtaining training images depicting a face of the identity; for each training image depicting the face of the identity: augmenting the training image to obtain an augmented image; inputting the augmented image to a portion of the face-morphing model which includes the shared set of trainable neural-network parameters and the identity-specific set of trainable neural-network parameters corresponding to the identity and thereby generating a reconstructed image depicting the face of the identity; evaluating an image loss based at least in part on the training image and the reconstructed image; training at least some of the identity-specific set of trainable neural-network parameters corresponding to the identity based at least in part on the image loss associated with each training image depicting the face of the identity; and training the shared set of trainable neural-network parameters based at least in part on the image loss associated with each training image depicting the face of the identity, while requiring that the shared set of trainable neural-network parameters be shared across all of the plurality of N identities.

For each of the plurality of N identities and for each training image depicting the face of the identity, evaluating the image loss may comprise comparing the training image and the reconstructed image (e.g. using one or more of: a L1 loss criterion comparing the training image and the reconstructed image; a structural similarity index measure (SSIM) loss criterion comparing the training image and the reconstructed image; and/or a linear combination of these and/or other loss criterion).

Training the face-morphing model may comprise, for each of the plurality of N identities, obtaining a training segmentation mask corresponding to each training image depicting the face of the identity.

For each of the plurality of N identities and for each training image depicting the face of the identity, evaluating the image loss may comprise applying the training segmentation mask corresponding to the training image on a pixel-wise basis to both the training image and the reconstructed image.

The method may comprise: for each of the plurality of N identities and for each training image depicting the face of the identity: inputting the augmented image to the portion of the face-morphing model which includes the shared set of trainable neural-network parameters and the identity-specific set of trainable neural-network parameters corresponding to the identity comprises generating a reconstructed segmentation mask corresponding to the training image depicting the face of the identity; evaluating a mask loss based at least in part on the training segmentation mask and the reconstructed segmentation mask; and for each of the plurality of N identities: training at least some of the identity-specific set of trainable neural-network parameters corresponding to the identity is based at least in part on the mask loss associated with each training image depicting the face of the identity; and training the shared set of trainable neural-network parameters is based at least in part on the mask loss associated with each training image depicting the face of the identity, while requiring that the shared set of trainable neural-network parameters be shared across all of the plurality of N identities.

For each of the plurality of N identities and for each training image depicting the face of the identity, evaluating the mask loss may comprise comparing the training segmentation mask and the reconstructed segmentation mask (e.g. using one or more of: a L1 loss criterion comparing the training segmentation mask and the reconstructed segmentation mask; a structural similarity index measure (SSIM) loss criterion comparing the training segmentation mask and the reconstructed segmentation loss; and/or a linear combination of these and/or other loss criterion).

Training the face-morphing model may comprise: evaluating a regularization loss based on at least a portion of the shared set of trainable neural-network parameters; and training the at least a portion of the shared set of trainable neural-network parameters based on the regularization loss.

Training the face-morphing model may comprise: evaluating a plurality of regularization losses, each regularization loss based on a corresponding subset of the shared set of trainable neural-network parameters; and for each of the plurality of regularization losses, training the corresponding subset of the shared set of trainable neural-network parameters based on the regularization loss.

Evaluating each regularization loss may be based on an L1 loss over the corresponding subset of the shared set of trainable neural-network parameters.

Combining the identity-specific sets of trained neural-network parameters may comprise: determining one or more linear combinations of one or more corresponding subsets of the identity-specific sets of trained neural-network parameters to thereby obtain one or more corresponding subsets of the blended set of neural-network parameters.

The set of interpolation parameters may provide the weights for the one or more linear combinations.

Determining the one or more linear combinations may comprise performing a calculation of the form $w_i^* = \Sigma_{j=1}^{N} \alpha_{ij} w_{ij}$ for each of i=1, 2 . . . I subsets of the identity-specific sets of trained neural-network parameters, where: $w_{ij}$ is a vector whose elements are the $i^{th}$ subset of the identity-specific set of trained neural-network parameters for the $j^{th}$ identity (j∈1, 2 . . . . N), $w_i^*$ is a vector whose elements are the $i^{th}$ subset of the blended set of neural-network parameters and $\alpha_{ij}$ are the interpolation parameters.

Inferring the output image may comprise providing an autoencoder. The autoencoder may comprise: an encoder for encoding images into latent codes; an image decoder for receiving latent codes from the encoder and reconstructing reconstructed images therefrom.

The encoder may be parameterized by parameters from among the shared set of trained neural-network parameters.

Inferring the output image may comprise: constructing the image decoder to be a blended image decoder comprising at least I layers, where each of the I layers of the blended image decoder is parameterized by an $i^{th}$ set of blended decoder parameters (which may be represented by the vector $L_i^*$) which are in turn defined by: the vector $w_i^*$ whose elements are the $i^{th}$ subset of the blended set of neural-network parameters; an $i^{th}$ set of basis vectors (which may be represented by a matrix $A_i$) whose elements are among the shared set of trained neural-network parameters; and an $i^{th}$ bias vector $\mu_i$ whose elements are among the shared set of trained neural-network parameters; inputting the input image into the encoder to generate a latent code corresponding to the input image; and inputting the latent code corresponding to the input image into the blended image decoder to thereby infer the output image depicting the face that is the blend of the characteristics of the blending subset of the N input entities.

Inferring the output image may comprise: constructing the image decoder to be a blended image decoder comprising at least I layers, where each of the I layers of the blended image decoder is parameterized by an $i^{th}$ set of blended decoder parameters by performing a calculation of the form $L_i^* = w_i^* A_i + \mu_i$, where: $L_i^*$ is a vector whose elements represent the $i^{th}$ set of blended decoder parameters that parameterize the $i^{th}$ layer of the blended image decoder; $w_i^*$ is a vector whose elements are the $i^{th}$ subset of the blended set of neural-network parameters; $A_i$ is a matrix comprising an $i^{th}$ set of basis vectors whose elements are among the shared set of trained neural-network parameters (with each row of $A_i$ corresponding to a single basis vector); and $\mu_i$ is a $i^{th}$ bias vector whose elements are among the shared set of trained neural-network parameters; inputting the input image into the encoder to generate a latent code corresponding to the input image; and inputting the latent code corresponding to the input image into the blended image decoder to thereby infer the output image depicting the face that is the blend of the characteristics of the blending subset of the N input entities.

The autoencoder comprises a mask decoder for receiving latent codes from the encoder and reconstructing reconstructed segmentation masks therefrom. Inferring the output image may comprise: constructing the image decoder to be a blended image decoder and the mask decoder to be a blended mask decoder, wherein a combination of parameters of the blended image decoder and the blended mask decoder comprises at least I layers, where each of the I layers of the combination of parameters of the blended image decoder and the blended mask decoder is parameterized by an $i^{th}$ set of blended decoder parameters (which may be represented by the vector $L_i^*$) which are in turn defined by: the vector $w_i^*$ whose elements are the $i^{th}$ subset of the blended set of neural-network parameters; an $i^{th}$ set of basis vectors (which may be represented by a matrix $A_i$) whose elements are among the shared set of trained neural-network parameters; and an $i^{th}$ bias vector $\mu_i$ whose elements are among the shared set of trained neural-network parameters; inputting the input image into the encoder to generate a latent code corresponding to the input image; inputting the latent code corresponding to the input image into the blended image decoder to thereby infer the output image depicting the face that is the blend of the characteristics of the blending subset of the input entities; and inputting the latent code corresponding to the input image into the blended mask decoder to thereby infer an output segmentation mask.

The face-morphing model may comprise, for each of the plurality of N identities, an autoencoder comprising: an encoder for encoding images of the identity into latent codes; and an image decoder for receiving latent codes from the encoder and reconstructing reconstructed images of the identity therefrom.

The encoder may be the same for each of the plurality of N identities and may be parameterized by encoder parameters from among the shared set of trained neural-network parameters.

For each of the N identities (j=1, 2, . . . N): the image decoder may comprise at least I layers. For each of the I layers: the image decoder may be parameterized by an $i^{th}$ set of image decoder parameters (which may be defined by the elements of a vector $L_{i,j}$), wherein the $i^{th}$ set of image decoder parameters is prescribed at least in part by: a corresponding $i^{th}$ subset of the identity-specific set of trained neural-network parameters corresponding to the identity (which may be defined by the elements of a vector $w_{ij}$); and an $i^{th}$ hypernetwork parameterized by hypernetwork parameters defined by the elements of a basis matrix $A_i$ and a bias vector $\mu_i$, wherein the hypernetwork parameters are among the shared set of trained neural-network parameters.

For each of the N identities (j=1, 2, . . . N): the image decoder may comprise at least I layers; and, for each of the I layers: the image decoder may be parameterized by an $i^{th}$ set of image decoder parameters represented by a vector La, whose elements are prescribed according to $L_{i,j}=w_{ij}A_i+\mu_i$ where: $w_{ij}$ is a vector whose elements are among the identity-specific set of trained neural-network parameters for the layer i and the identity j; $A_i$ is a basis matrix for the $i^{th}$ layer, whose rows are basis vectors and whose elements are among the shared set of trained neural-network parameters; and $\mu_i$ is a bias vector for the $i^{th}$ layer, whose elements are among the shared set of trained neural-network parameters.

The autoencoder may comprise a mask decoder for receiving latent codes from the encoder and reconstructing reconstructed segmentation masks of the identity therefrom.

For each of the N identities (j=1, 2, . . . N): a combination of parameters of the image decoder and the mask decoder may comprise at least I layers; and, for each of the I layers: the combination of parameters of the image decoder and the mask decoder may be parameterized by an $i^{th}$ set of combined decoder parameters (which may be defined by the elements of a vector $L_{i,j}$), wherein the $i^{th}$ set of combined decoder parameters is prescribed at least in part by: a corresponding $i^{th}$ subset of the identity-specific set of trained neural-network parameters corresponding to the identity (which may be defined by the elements of a vector $w_{ij}$); and an $i^{th}$ hypernetwork parameterized by hypernetwork parameters defined by the elements of a basis matrix $A_i$ and a bias vector $\mu_i$, wherein the hypernetwork parameters are among the shared set of trained neural-network parameters.

For each of the N identities (j=1, 2, . . . N): a combination of parameters of the image decoder and the mask decoder may comprise at least I layers; and, for each of the I layers: the combination of parameters of the image decoder and the mask decoder may be parameterized by an $i^{th}$ set of combined decoder parameters represented by a vector $L_{i,j}$ whose elements are prescribed according to $L_{i,j}=w_{ij}A_i+\mu_i$ where: $w_{ij}$ is a vector whose elements are among the identity-specific set of trained neural-network parameters for the layer i and the identity j; $A_i$ is a basis matrix for the $i^{th}$ layer, whose rows are basis vectors and whose elements are among the shared set of trained neural-network parameters; and $\mu_i$ is a bias vector for the $i^{th}$ layer, whose elements are among the shared set of trained neural-network parameters.

For each of the N identities (j=1, 2, . . . N): a combination of parameters of the image decoder and the mask decoder may comprises at least I layers; and, for each of the I layers: the combination of parameters of the image decoder and the mask decoder may be parameterized by an $i^{th}$ set of combined decoder parameters represented by a vector $L_{i,j}$ whose elements are prescribed according to $L_{i,j}=w_{ij}A_i+\mu_i$ where: $w_{ij}$ is a vector whose elements are among the identity-specific set of trained neural-network parameters for the layer i and the identity j; $A_i$ is a basis matrix for the $i^{th}$ layer, whose rows are basis vectors and whose elements are among the shared set of trained neural-network parameters; and $\mu_i$ is a bias vector for the $i^{th}$ layer, whose elements are among the shared set of trained neural-network parameters.

Training the face-morphing model may comprise: for each of the plurality of N identities: obtaining training images depicting a face of the identity; for each training image depicting the face of the identity: augmenting the training image to obtain an augmented image; inputting the augmented image to the autoencoder corresponding to the identity and thereby generating a reconstructed image depicting the face of the identity; evaluating an image loss based at least in part on the training image and the reconstructed image; training at least some of the identity-specific set of trainable neural-network parameters corresponding to the identity based at least in part on the image loss associated with each training image depicting the face of the identity; and training the shared set of trainable neural-network parameters based at least in part on the image loss associated with each training image depicting the face of the identity, while requiring that the shared set of trainable neural-network parameters be shared across all of the plurality of N identities.

For each of the plurality of N identities and for each training image depicting the face of the identity, evaluating the image loss may comprise comparing the training image and the reconstructed image (e.g. using one or more of: a L1 loss criterion comparing the training image and the reconstructed image; a structural similarity index measure (SSIM) loss criterion comparing the training image and the reconstructed image; and/or a linear combination of these and/or other loss criterion).

Training the face-morphing model may comprise, for each of the plurality of N identities, obtaining a training segmentation mask corresponding to each training image depicting the face of the identity. For each of the plurality of N identities and for each training image depicting the face of the identity, evaluating the image loss may comprise applying the training segmentation mask corresponding to the training image on a pixel-wise basis to both the training image and the reconstructed image.

Training the face-morphing model may comprise, for each of the plurality of N identities, obtaining a training segmentation mask corresponding to each training image depicting the face of the identity; and, for each of the plurality of N identities and for each training image depicting the face of the identity: inputting the augmented image to the autoencoder comprises generating a reconstructed segmentation mask corresponding to the training image depicting the face of the identity; evaluating a mask loss based at least in part on the training segmentation mask and the reconstructed segmentation mask; and, for each of the plurality of N identities: training at least some of the identity-specific set of trainable neural-network parameters corresponding to the identity is based at least in part on the mask loss associated with each training image depicting the face of the identity; training the shared set of trainable neural-network parameters is based at least in part on the mask loss associated with each training image depicting the face of the identity, while requiring that the shared set of trainable neural-network parameters be shared across all of the plurality of N identities.

For each of the plurality of N identities and for each training image depicting the face of the identity, evaluating the mask loss may comprise comparing the training segmentation mask and the reconstructed segmentation mask (e.g. using one or more of: a L1 loss criterion comparing the training segmentation mask and the reconstructed segmentation mask; a structural similarity index measure (SSIM) loss criterion comparing the training segmentation mask and the reconstructed segmentation loss; and/or a linear combination of these and/or other loss criterion).

Training the face-morphing model may comprise: evaluating a regularization loss based on at least a portion of the shared set of trainable neural-network parameters; and training the at least a portion of the shared set of trainable neural-network parameters based on the regularization loss.

Training the face-morphing model may comprise: evaluating a plurality of regularization losses, each regularization loss based on a corresponding subset of the shared set of trainable neural-network parameters; and, for each of the plurality of regularization losses, training the corresponding subset of the shared set of trainable neural-network parameters based on the regularization loss.

Evaluating each regularization loss may be based on an L1 loss over the corresponding subset of the shared set of trainable neural-network parameters.

Combining the identity-specific sets of trained neural-network parameters may comprise: determining one or more linear combinations of one or more corresponding subsets of the identity-specific sets of trained neural-network parameters to thereby obtain one or more corresponding subsets of the blended set of neural-network parameters.

The set of interpolation parameters may provide the weights for the one or more linear combinations.

Determining the one or more linear combinations may comprise performing a calculation of the form $w_i^* = \sum_{j=1}^{N} \alpha_{ij} w_{ij}$ for each of i=1, 2 ... I subsets of the identity-specific sets of trained neural-network parameters, where: $w_{ij}$ is a vector whose elements are the $i^{th}$ subset of the identity-specific set of trained neural-network parameters for the $i^{th}$ identity (j∈1, 2 .... N), $w_i^*$ is a vector whose elements are the $i^{th}$ subset of the blended set of neural-network parameters and $\alpha_{ij}$ are the interpolation parameters.

Inferring the output image may comprise providing an inference autoencoder, the inference autoencoder comprising: the encoder; and a blended image decoder for receiving latent codes from the encoder and reconstructing reconstructed blended images therefrom.

Inferring the output image may comprise: constructing the blended image to decoder to comprise at least I layers corresponding to the I layers of the identity-specific image decoders, where each of the I layers of the blended image decoder is parameterized by an $i^{th}$ set of blended decoder parameters (which may be represented by the vector $L_i^*$) which are in turn defined by: the vector $w_i^*$ whose elements are the $i^{th}$ subset of the blended set of neural-network parameters; and the $i^{th}$ hypernetwork parameterized by hypernetwork parameters defined by the elements of the basis matrix $A_i$ and the bias vector $\mu_i$; inputting the input image into the encoder to generate a latent code corresponding to the input image; and inputting the latent code corresponding to the input image into the blended image decoder to thereby infer the output image depicting the face that is the blend of the characteristics of the blending subset of the N input entities.

Inferring the output image may comprise: constructing the blended image decoder to comprise at least I layers corresponding to the I layers of the identity-specific image decoders, where each of the I layers of the blended image decoder is parameterized by an $i^{th}$ set of blended decoder parameters by performing a calculation of the form $L_i^* = w_i^* A_i + \mu_i$, where: $L_i^*$ is a vector whose elements represent the $i^{th}$ set of blended decoder parameters that parameterize the $i^{th}$ layer of the blended image decoder; $w_i^*$ is a vector whose elements are the $i^{th}$ subset of the blended set of neural-network parameters; $A_i$ is the basis matrix of the $i^{th}$ hypernetwork; and $\mu_i$ is the bias vector of the $i^{th}$ hypernetwork; inputting the input image into the encoder to generate a latent code corresponding to the input image; and inputting the latent code corresponding to the input image into the blended image decoder to thereby infer the output image depicting the face that is the blend of the characteristics of the blending subset of the N input entities.

The inference autoencoder may comprise a blended mask decoder for receiving latent codes from the encoder and reconstructing reconstructed segmentation masks therefrom. Inferring the output image may comprise: constructing the blended image decoder and the blended mask decoder, wherein a combination of parameters of the blended image decoder and the blended mask decoder comprises at least I layers, where each of the I layers of the combination of parameters of the blended image decoder and the blended mask decoder is parameterized by an $i^{th}$ set of blended decoder parameters (which may be represented by the vector $L_i^*$) which are in turn defined by: the vector $w_i^*$ whose elements are the $i^{th}$ subset of the blended set of neural-network parameters; and the $i^{th}$ hypernetwork parameterized by hypernetwork parameters defined by the elements of the basis matrix $A_i$ and the bias vector $\mu_i$; inputting the input image into the encoder to generate a latent code corresponding to the input image; inputting the latent code corresponding to the input image into the blended image decoder to thereby infer the output image depicting the face that is the blend of the characteristics of the blending subset of the N input entities; and inputting the latent code corresponding to the input image into the blended mask decoder to thereby infer an output segmentation mask.

Training the face-morphing model may comprise training a face-swapping model to thereby train the encoder parameters.

Training the face-swapping model my comprise: for each of the plurality of N identities: obtaining training images depicting a face of the identity; for each training image depicting the face of the identity: augmenting the training image to obtain an augmented image; inputting the augmented image to the autoencoder corresponding to the identity and thereby generating a reconstructed image depicting the face of the identity; evaluating an image loss based at least in part on the training image and the reconstructed image; training the encoder parameters based at least in part on the image loss associated with each training image depicting the face of the identity, while requiring that the encoder parameters be shared across all of the plurality of N identities.

Fr each of the plurality of N identities and for each training image depicting the face of the identity, evaluating the image loss may comprise comparing the training image and the reconstructed image (e.g. using one or more of: a L1 loss criterion comparing the training image and the reconstructed image; a structural similarity index measure (SSIM) loss criterion comparing the training image and the reconstructed image; and/or a linear combination of these and/or other loss criterion).

Training the face-swapping model may comprise, for each of the plurality of N identities, obtaining a training segmentation mask corresponding to each training image depicting the face of the identity; and, for each of the plurality of N identities and for each training image depicting the face of the identity, evaluating the image loss may comprise applying the training segmentation mask corresponding to the training image on a pixel-wise basis to both the training image and the reconstructed image.

Training the face-swapping model may comprise, for each of the plurality of N identities, obtaining a training segmentation mask corresponding to each training image depicting the face of the identity; and, for each of the plurality of N identities and for each training image depicting the face of the identity: inputting the augmented image to the autoencoder comprises generating a reconstructed segmentation mask corresponding to the training image depicting the face of the identity. The method may comprises evaluating a mask loss based at least in part on the training segmentation mask and the reconstructed segmentation mask; and, for each of the plurality of N identities: training the encoder parameters based at least in part on the mask loss associated with each training image depicting the face of the identity, while requiring that the encoder parameters be shared across all of the plurality of N identities.

For each of the plurality of N identities and for each training image depicting the face of the identity, evaluating the mask loss may comprise comparing the training segmentation mask and the reconstructed segmentation mask (e.g. using one or more of: a L1 loss criterion comparing the training segmentation mask and the reconstructed segmentation mask; a structural similarity index measure (SSIM) loss criterion comparing the training segmentation mask and the reconstructed segmentation loss; and/or a linear combination of these and/or other loss criterion).

Training the face-morphing model mat comprise: fixing the encoder parameters (and, optionally, decoder parameters of one or more shared decoder layers) with values obtained from training the face-swapping model; for each of the plurality of N identities: obtaining training images depicting a face of the identity; for each training image: augmenting the training image to obtain an augmented image; inputting the augmented image to the autoencoder corresponding to the identity and thereby generating a reconstructed image depicting the face of the identity; evaluating an image loss based at least in part on the training image and the reconstructed image; for each of the plurality of N identities and for each of the at least I layers of the image decoder: training the corresponding $i^{th}$ subset of the identity-specific set of trained neural-network parameters corresponding to the identity (which may be defined by the elements of a vector $w_{ij}$) based at least in part on the image loss associated with each training image depicting the face of the identity; and training the $i^{th}$ hypernetwork parameterized by hypernetwork parameters defined by the elements of a basis matrix $A_i$ and a bias vector $\mu_i$ based at least in part on the image loss associated with each training image depicting the face of the identity, while requiring that the hypernetwork parameters be shared across all of the plurality of N identities.

For each of the plurality of N identities and for each training image depicting the face of the identity, evaluating the image loss may comprise comparing the training image and the reconstructed image (e.g. using one or more of: a L1 loss criterion comparing the training image and the reconstructed image; a structural similarity index measure (SSIM) loss criterion comparing the training image and the reconstructed image; and/or a linear combination of these and/or other loss criterion).

Training the face-morphing model may comprise, for each of the plurality of N identities, obtaining a training segmentation mask corresponding to each training image depicting the face of the identity. For each of the plurality of N identities and for each training image depicting the face of the identity, evaluating the image loss may comprise applying the training segmentation mask corresponding to the training image on a pixel-wise basis to both the training image and the reconstructed image.

Training the face-morphing model may comprise: training a face-swapping model to thereby train the encoder parameters; fixing the encoder parameters (and, optionally, decoder parameters of one or more shared decoder layers) with values obtained from training the face-swapping model; for each of the plurality of N identities: obtaining training images depicting a face of the identity; obtaining a training segmentation mask corresponding to each training image; for each training image: augmenting the training image to obtain an augmented image; inputting the augmented image to the autoencoder corresponding to the identity and thereby generating a reconstructed image depicting the face of the identity and a reconstructed segmentation mask corresponding to the training image; evaluating an image loss based at least in part on the training image and the reconstructed image; evaluating a mask loss based at least in part on the training segmentation mask and the reconstructed segmentation mask; for each of the plurality of N identities and for each of the at least I layers of the combination of the parameters of the image decoder and the mask decoder: training the corresponding $i^{th}$ subset of the identity-specific set of trained neural-network parameters corresponding to the identity (which may be defined by the elements of a vector $w_{ij}$) based at least in part on the image loss and the mask loss associated with each training image depicting the face of the identity; and training the $i^{th}$ hypernetwork parameterized by hypernetwork parameters defined by the elements of a basis matrix $A_i$ and a bias vector $\mu_i$ based at least in part on the image loss and the mask loss associated with each training image depicting the face of the identity, while requiring that the hypernetwork parameters be shared across all of the plurality of N identities.

For each of the plurality of N identities and for each training image depicting the face of the identity, evaluating the image loss may comprise comparing the training image and the reconstructed image (e.g. using one or more of: a L1 loss criterion comparing the training image and the reconstructed image; a structural similarity index measure (SSIM) loss criterion comparing the training image and the reconstructed image; and/or a linear combination of these and/or other loss criterion).

For each of the plurality of N identities and for each training image depicting the face of the identity, evaluating the image loss may comprise applying the training segmentation mask corresponding to the training image on a pixel-wise basis to both the training image and the reconstructed image.

For each of the plurality of N identities and for each training image depicting the face of the identity, evaluating the mask loss may comprise comparing the training segmentation mask and the reconstructed segmentation mask (e.g. using one or more of: a L1 loss criterion comparing the training segmentation mask and the reconstructed segmentation mask; a structural similarity index measure (SSIM) loss criterion comparing the training segmentation mask and the reconstructed segmentation loss; and/or a linear combination of these and/or other loss criterion).

Training the face-morphing model may comprise: for each of the at least I layers: evaluating a regularization loss based on by the elements of the basis matrix $A_i$; and training the hypernetwork parameters defined by the elements of the basis matrix $A_i$ based on the regularization loss.

Evaluating each regularization loss may be based on an L1 loss over the corresponding subset of the shared set of trainable neural-network parameters.

Combining the identity-specific sets of trained neural-network parameters may comprise: determining one or more linear combinations of one or more corresponding subsets of the identity-specific sets of trained neural-network parameters to thereby obtain one or more corresponding subsets of the blended set of neural-network parameters.

The set of interpolation parameters may provide the weights for the one or more linear combinations.

Determining the one or more linear combinations may comprise performing a calculation of the form $w_i^* = \sum_{j=1}^{N} \alpha_{ij} w_{ij}$ for each of $i=1, 2 \ldots I$ subsets of the identity-specific sets of trained neural-network parameters, where: $w_{ij}$ is a vector whose elements are the $i^{th}$ subset of the identity-specific set of trained neural-network parameters for the $j^{th}$ identity ($j \in 1, 2 \ldots N$), $w_i^*$ is a vector whose elements are the $i^{th}$ subset of the blended set of neural-network parameters and ay are the interpolation parameters.

Inferring the output image may comprise providing an inference autoencoder. The inference autoencoder may comprise: the encoder; a blended image decoder for receiving latent codes from the encoder and reconstructing reconstructed blended images therefrom.

Inferring the output image may comprise: constructing the blended image to decoder to comprise at least I layers corresponding to the I layers of the identity-specific image decoders, where each of the I layers of the blended image decoder is parameterized by an $i^{th}$ set of blended decoder parameters (which may be represented by the vector $L_i^*$) which are in turn defined by: the vector $w_i^*$ whose elements are the $i^{th}$ subset of the blended set of neural-network parameters; and the $i^{th}$ hypernetwork parameterized by hypernetwork parameters defined by the elements of the basis matrix $A_i$ and the bias vector $\mu_i$; inputting the input image into the encoder to generate a latent code corresponding to the input image; and inputting the latent code corresponding to the input image into the blended image decoder to thereby infer the output image depicting the face that is the blend of the characteristics of the blending subset of the N input entities.

Inferring the output image may comprise: constructing the blended image decoder to comprise at least I layers corresponding to the I layers of the identity-specific image decoders, where each of the I layers of the blended image decoder is parameterized by an $i^{th}$ set of blended decoder parameters by performing a calculation of the form $L_i^* = w_i^* A_i + \mu_i$, where: $L_i^*$ is a vector whose elements represent the $i^{th}$ set of blended decoder parameters that parameterize the $i^{th}$ layer of the blended image decoder; $w_i^*$ is a vector whose elements are the $i^{th}$ subset of the blended set of neural-network parameters; $A_i$ is the basis matrix of the $i^{th}$ hypernetwork; and $\mu_i$ is the bias vector of the $i^{th}$ hypernetwork; inputting the input image into the encoder to generate a latent code corresponding to the input image; and inputting the latent code corresponding to the input image into the blended image decoder to thereby infer the output image depicting the face that is the blend of the characteristics of the blending subset of the N input entities.

The inference autoencoder may comprise a blended mask decoder for receiving latent codes from the encoder and reconstructing reconstructed segmentation masks therefrom. Inferring the output image may comprise: constructing the blended image decoder and the blended mask decoder, wherein a combination of parameters of the blended image decoder and the blended mask decoder comprises at least I layers, where each of the I layers of the combination of the parameters of the blended image decoder and the blended mask decoder is parameterized by an $i^{th}$ set of blended decoder parameters (which may be represented by the vector $L_i^*$) which are in turn defined by: the vector $w_i^*$ whose elements are the $i^{th}$ subset of the blended set of neural-network parameters; and the $i^{th}$ hypernetwork parameterized by hypernetwork parameters defined by the elements of the basis matrix $A_i$ and the bias vector $\mu_i$; inputting the input image into the encoder to generate a latent code corresponding to the input image; inputting the latent code corresponding to the input image into the blended image decoder to thereby infer the output image depicting the face that is the blend of the characteristics of the blending subset of the N input entities; and inputting the latent code corresponding to the input image into the blended mask decoder to thereby infer an output segmentation mask.

The plurality of N input identities may comprise N=2 identities and the blending subset of the N input identities may comprise two identities. Training the face-morphing model may comprise: training a first face-swapping model comprising, for each of the N=2 identities, a first face-swapping autoencoder comprising: an encoder for encoding identity images into latent codes and a first image decoder for receiving latent codes from the encoder and reconstructing identity images therefrom; wherein training the first face-swapping model comprises: for the first (j=1) identity, training the first face-swapping autoencoder using training images of the first (j=1) identity and, for the second (j=2) identity, training the first face-swapping autoencoder using training images of the second (j=2) identity; forcing parameters of the encoder to be the same for both of (e.g. shared between) the N=2 identities; training a second face-swapping model comprising, for each of the N=2 identities, a second face-swapping autoencoder comprising: the encoder for encoding identity images into latent codes and a second image decoder for receiving latent codes from the encoder and reconstructing identity images therefrom; wherein training the second face-swapping model comprises: fixing the parameters of the encoder (and, optionally, decoder parameters of one or more shared decoder layers) for both of the N=2 identities and to have parameter values obtained from training the first face-swapping model; for the first (j=1) identity, training the second image decoder using training images of the second (j=2) identity and, for the second (j=2) identity, training the second image decoder using training images of the first (j=1) identity.

The encoder may be shared between both of the N=2 identities and both of the first and second face-swapping models and may be parameterized by encoder parameters from among the shared set of trained neural-network parameters.

For each of the N=2 identities, the first and second image decoders may be parameterized by decoder parameters from among the identity-specific set of trained neural-network parameters.

Training the second face-swapping model may comprise: for the first (j=1) identity: initializing parameters of the second image decoder using values obtained from training the first image decoder for the first (j=1) identity; and training the second image decoder using training images of the second (j=2) identity; and, for the second (j=2) identity: initializing parameters of the second image decoder using values obtained from training the first image decoder for the second (j=2) identity; and training the second image decoder using training images of the first (j=1) identity.

Training the first face-swapping model may comprise: for the first (j=1) identity: obtaining training images depicting a face of the first (j=1) identity; for each training image depicting the face of the first (j=1) identity: augmenting the training image to obtain an augmented image; inputting the augmented image to the first face-swapping autoencoder corresponding to the first (j=1) identity and thereby generating a reconstructed image depicting the face of the first (j=1) identity; evaluating an image loss based at least in part on the training image and the reconstructed image; training at least some parameters of the first image decoder for the first (j=1) identity based at least in part on the image loss associated with each training image depicting the face of the first (j=1) identity; training the encoder parameters based at least in part on the image loss associated with each training image depicting the face of the first (j=1) identity, while requiring that the encoder parameters be shared across the plurality of N=2 identities; and, for the second (j=2) identity: obtaining training images depicting a face of the second (j=2) identity; for each training image depicting the face of the second (j=2) identity: augmenting the training image to obtain an augmented image; inputting the augmented image to the first face-swapping autoencoder corresponding to the second (j=2) identity and thereby generating a reconstructed image depicting the face of the second (j=2) identity; evaluating an image loss based at least in part on the training image and the reconstructed image; training at least some parameters of the first image decoder for the second (j=2) identity based at least in part on the image loss associated with each training image depicting the face of the second (j=2) identity; training the encoder parameters based at least in part on the image loss associated with each training image depicting the face of the second (j=2) identity, while requiring that the encoder parameters be shared across the plurality of N=2 identities.

Training the second face-swapping model may comprise: for the first (j=1) identity: obtaining training images depicting a face of the second (j=2) identity; for each training image depicting the face of the second (j=2) identity: augmenting the training image to obtain an augmented image; inputting the augmented image to the second face-swapping autoencoder corresponding to the first (j=1) identity and thereby generating a reconstructed image depicting the face of the second (j=2) identity; evaluating an image loss based at least in part on the training image and the reconstructed image; maintaining the encoder parameters fixed with values obtained during training of the first face-swapping model; training at least some parameters of the second image decoder for the first (j=1) identity based at least in part on the image loss associated with each training image depicting the face of the second (j=2) identity; for the second (j=2) identity: obtaining training images depicting a face of the first (j=1) identity; for each training image depicting the face of the first (j=1) identity: augmenting the training image to obtain an augmented image; inputting the augmented image to the first face-swapping autoencoder corresponding to the second (j=2) identity and thereby generating a reconstructed image depicting the face of the first (j=1) identity; evaluating an image loss based at least in part on the training image and the reconstructed image; maintaining the encoder parameters fixed with values obtained during training of the first face-swapping model; training at least some parameters of the second image decoder for the second (j=2) identity based at least in part on the image loss associated with each training image depicting the face of the first (j=1) identity.

Combining the identity-specific sets of trained neural-network parameters may comprise: determining one or more linear combinations of one or more corresponding subsets of trained parameters for the first image decoder for the first (j=1) identity and one or more corresponding subsets of the trained parameters for the second image decoder for the first (j=1) identity to thereby obtain one or more corresponding subsets of the blended set of neural-network parameters.

The set of interpolation parameters may provide the weights for the one or more linear combinations.

Determining the one or more linear combinations may comprise performing a calculation of the form: $B_i=\alpha_{i1} M_{i,A-1}+\alpha_{i2}M_{i,B-1}$ for each of i=1, 2 ... I subsets of the trained parameters, where: $M_{i,A-1}$ is a vector whose elements are the $i^{th}$ subset of the first image decoder for the first (j=1) identity, $M_{i,B-1}$ is a vector whose elements are the $i^{th}$ subset of the second image decoder for the first (j=1) identity, $B_i$ is a vector whose elements are the $i^{th}$ subset of the blended set of neural-network parameters and $\alpha_{i1}$, $\alpha_{i2}$ are the interpolation parameters; or $B_i=\alpha_{i1}M_{i,A-2}+\alpha_{i2}M_{i,B-2}$ for each of i=1, 2 ... I subsets of the trained parameters, where: $M_{i,A-2}$ is a vector whose elements are the $i^{th}$ subset of the first image decoder for the second (j=2) identity, $M_{i,B-2}$ is a vector whose elements are the $i^{th}$ subset of the second image decoder for the second (j=2) identity, $B_i$ is a vector whose elements are the $i^{th}$ subset of the blended set of neural-network parameters and $\alpha_{i1}$, $\alpha_{i2}$ are the interpolation parameters.

Inferring the output image may comprise providing an inference autoencoder. The inference autoencoder may comprise: the encoder; and a blended image decoder for receiving latent codes from the encoder and reconstructing reconstructed blended images therefrom.

The encoder of the inference autoencoder may have parameter values obtained from training the first face-swapping model.

Inferring the output image may comprise: constructing the blended image to decoder to comprise at least I layers, where each of the I layers of the blended image decoder is parameterized by an $i^{th}$ subset of the blended set of neural-network parameters represented by the vector $B_i$; inputting the input image into the encoder to generate a latent code corresponding to the input image; and inputting the latent code corresponding to the input image into the blended image decoder to thereby infer the output image depicting the face that is the blend of the characteristics of the N=2 entities.

Combining the identity specific sets of trained neural network parameters may comprise: for each of i=1, 2 ... I layers the first image decoder for the first (j=1) identity and i=1, 2 ... I corresponding layers of the second image decoder for the first (j=1) identity, defining an $i^{th}$ subset of blended set of neural-network parameters according to $L_i^*=w_i^*A_i+\mu_i$, where: $L_i^*$ is a vector whose elements are the $i^{th}$ subset of blended set of neural-network parameters; $\mu_i$ is a bias vector whose elements comprise parameters of the $i^{th}$ layer of the first image decoder for the first (j=1) identity, $A_i$ is a basis vector whose elements are a difference (see equation (13B) above) between: parameters of $i^{th}$ layer of the second image decoder for the first (j=1) identity and the parameters of the $i^{th}$ layer of the first image decoder for the first (j=1) identity; and $w_i^*$ is a scalar corresponding to an $i^{th}$ one of the set of interpolation parameters; or, for each of i=1, 2 . . . I layers the first image decoder for the first (j=1) identity and i=1, 2 . . . I corresponding layers of the second image decoder for the first (j=1) identity, defining an $i^{th}$ subset of blended set of neural-network parameters according to $L_i^* = w_i^* A_i + \mu_i$ where: $L_i^*$ is a vector whose elements are the $i^{th}$ subset of blended set of neural-network parameters; $\mu_i$ is a bias vector whose elements comprise parameters of the $i^{th}$ layer of the first image decoder for the second (j=2) identity, $A_i$ is a basis vector whose elements are a difference (see equation (14B) above) between: parameters of $i^{th}$ layer of the second image decoder for the second (j=2) identity and the parameters of the $i^{th}$ layer of the first image decoder for the second (j=2) identity; and $w_i^*$ is a scalar corresponding to an $i^{th}$ one of the set of interpolation parameters.

Inferring the output image may comprise providing an inference autoencoder. The inference autoencoder may comprise: the encoder; and a blended image decoder for receiving latent codes from the encoder and reconstructing reconstructed blended images therefrom.

The encoder of the inference autoencoder may have parameter values obtained from training the first face-swapping model.

Inferring the output image may comprise: constructing the blended image to decoder to comprise at least I layers, where each of the I layers of the blended image decoder is parameterized by an $i^{th}$ subset of the blended set of neural-network parameters represented by the vector $L_i^*$; inputting the input image into the encoder to generate a latent code corresponding to the input image; and inputting the latent code corresponding to the input image into the blended image decoder to thereby infer the output image depicting the face that is the blend of the characteristics of the N=2 entities.

The first and second face-swapping autoencoders may comprise first and second mask decoders for receiving latent codes from the encoder and reconstructing segmentation masks therefrom.

Training the mask decoders may involve techniques analogous to training the image decoders, combining the identity-specific sets of trained neural-network parameters may involve combining the mask decoder parameters and/or inferring the output image may comprise constructing a blended mask decoder.

Another aspect of the invention provides a method, performed on a computer, for morphing an input image depicting a face of one of a plurality of N=2 input identities to an output image depicting a face that is a blend of characteristics of the N=2 input entities. The method comprises training a first face-swapping model comprising, for each of the N=2 identities, a first face-swapping autoencoder comprising: an encoder for encoding identity images into latent codes and a first image decoder for receiving latent codes from the encoder and reconstructing identity images therefrom. Training the first face-swapping model comprises: for the first (j=1) identity, training the first face-swapping autoencoder using training images of the first (j=1) identity and, for the second (j=2) identity, training the first face-swapping autoencoder using training images of the second (j=2) identity; forcing parameters of the encoder to be the same for both of (e.g. shared between) the N=2 identities. The method also comprises training a second face-swapping model comprising, for each of the N=2 identities, a second face-swapping autoencoder comprising: the encoder for encoding identity images into latent codes and a second image decoder for receiving latent codes from the encoder and reconstructing identity images therefrom. Training the second face-swapping model comprises: fixing the parameters of the encoder (and, optionally, decoder parameters of one or more shared decoder layers) for both of the N=2 identities and to have parameter values obtained from training the first face-swapping model; for the first (j=1) identity, training at least a portion of the second image decoder using training images of the second (j=2) identity and, for the second (j=2) identity, training at least a portion of the second image decoder using training images of the first (j=1) identity. The method also comprises: receiving a set of interpolation parameters; combining trained neural-network parameters of the first and second image decoders for at least one of the N=2 identities to thereby obtain a blended set of neural-network parameters; and inferring an output image depicting a face that is a blend of characteristics of the N=2 input entities using the parameters of the encoder, the blended set of neural-network parameters and the input image.

The method may comprise any of the features, combinations of features and/or sub-combinations of features of any of the methods described above.

Another aspect of the invention provides a method, performed on a computer, for training a face-morphing model to morph an input image depicting a face of one of a plurality of N input identities to an output image depicting a face that is a blend of characteristics of a blending subset of the plurality of N input entities based on a received set of interpolation parameters. The method comprises: providing a face-morphing model comprising: a shared set of trainable neural-network parameters that are shared between the plurality of N input identities; and for each of the plurality of N input entities, an identity-specific set of trainable neural-network parameters; training the face-morphing model to thereby obtain a trained face-morphing model comprising: a shared set of trained neural-network parameters that are shared between the plurality of N input identities; and for each of the plurality of N input entities, an identity-specific set of trained neural-network parameters.

The method may comprise any of the features, combinations of features and/or sub-combinations of features of any of the methods described above.

Other aspects of the invention provide a system comprising one or more processors, the one or more processors configured to perform any of the methods described above.

It is emphasized that the invention relates to all combinations of the above features, even if these are recited in different claims or aspects.

In addition to the exemplary aspects and embodiments described above, further aspects and embodiments will become apparent by reference to the drawings and by study of the following detailed descriptions.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

FIGS. 8A-8D (collectively, FIG. 8) show experimental results obtained by the inventors for the case N=2, where the identity #1 is an actor and identity #2 is a CG character constructed in the likeness of the actor.

FIGS. 9A-9C (collectively, FIG. 9) show experimental results obtained by the inventors where the user interface permits blending images between 3 identities and each identity is a different actor.

DESCRIPTION

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

One aspect of the invention provides a method, performed on a computer, for morphing an input image depicting a face to an output image depicting a face that is a blend of characteristics of a plurality of input entities. The method comprises training a face-morphing model comprising: a shared set of parameters shared between the input identities; and, for each of the input entities, an identity-specific set of parameters. The method also comprises: receiving an input image depicting a face of one of the plurality of input identities; receiving a set of interpolation parameters; combining the identity-specific sets of trained neural-network parameters for the plurality input identities based on the interpolation parameters, to thereby obtain a blended set of neural-network parameters; and inferring an output image depicting a face that is a blend of characteristics of the input entities using the shared set of trained neural-network parameters, the blended set of neural-network parameters and the input image.

Figure 1A:
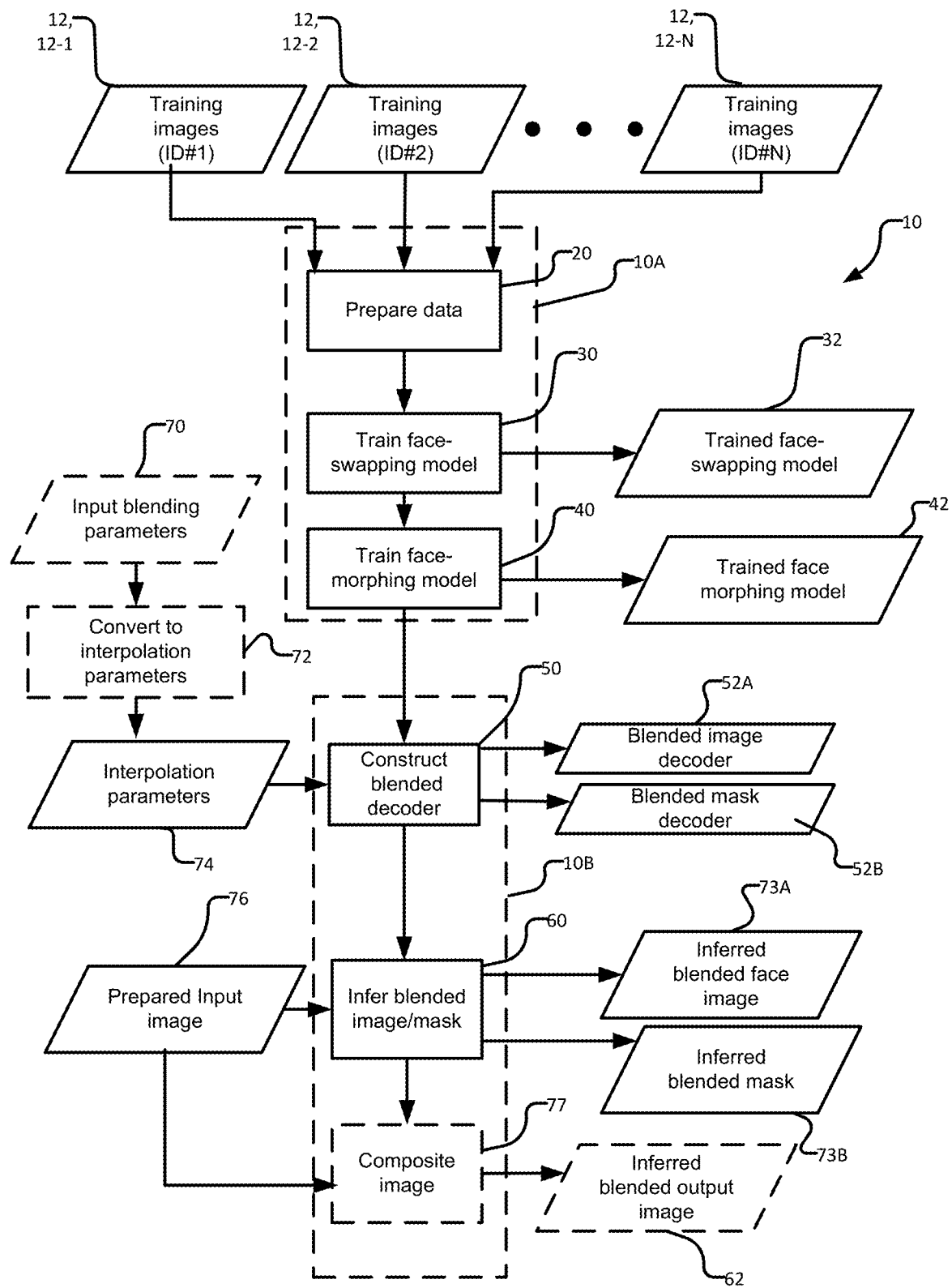
FIG. 1A is a broad schematic depiction of a method for neural face morphing according to a particular embodiment.

FIG. 1A is a broad schematic depiction of a method 10 for neural face morphing according to a particular embodiment. Method 10 may be logically divided into a training portion 10A and an inference portion 10B. Training portion 10A starts with training image sets 12-1, 12-2, . . . 12-N, where N is a number of different identities input into method 10 and N≥2. Each set of training images 12-1, 12-2, . . . 12-N (collectively, training images 12 or sets of training images 12) corresponds to a different identity. In the context of method 10, each identity may comprise a human actor, a CG model that is a likeness of a human character or a CG character generally. Each set of training images 12 may comprise a plurality of images (e.g. frames of video) that exhibit the face of their corresponding identity. By way of non-limiting example, a set of training images may comprise video footage of an actor executing a performance, a set of disjoint images of an actor executing a performance, rendered CG animation images corresponding to a CG character in the form of successive animation frames or disjoint images, and/or the like. Training images 12 may be obtained using any suitable technique.

Referring back to FIG. 1A, method 10 involves training a number of neural-network-based models. Consequently, it is currently preferable (but not necessary) that each set of training images 12 have somewhat similar distributions. Such similar distributions can be obtained by asking the actor (from whom each set of images 12 is obtained) to perform particular range of motion (ROM) exercises and/or visemes and by generating corresponding ROM poses (frames) using each CG character from which images 12 are obtained.

Training portion 10A of method 10 comprises training a number of neural-network-based models including face-swapping model 32 and face-morphing model 42. Method 10 starts in block 20 which may involve data preparation. As described in more detail below, data preparation in block 20 may comprise processing input training image sets 12 to provide an aligned face image and face segmentation (mask) corresponding to each image of training image sets 12 that will be used during training.

Method 10 then proceeds to block 30 which involves unsupervised training of face-swapping model 32. Face-swapping model 32 (once trained in block 30) can be used to perform so-called face swapping between the different identities of different training image sets 12. That is, a trained face-swapping model 32 can translate an image of one identity's face (e.g. once prepared in accordance with block 20) into a corresponding image of another one of the input identities. As explained in more detail below, face-swapping model 32 may comprise a shared component that has the same trainable parameters for all N identities and N identity-specific portions (i.e. an identity-specific portion for each of the N identities). The identity-specific portions of face-swapping model 32 may have the same structure/architecture as one another and trainable parameters specific to their corresponding identity. As explained in more detail below, face-swapping model 32 may comprise an autoencoder for each identity, the shared component of face-swapping model 32 may comprise the encoder of each autoencoder and, optionally, one or more shared decoder layers and the identity-specific portions of face-swapping model 32 may comprise identity-specific decoders.

Method 10 then proceeds to block 40 which involves training face-morphing model 42. As explained in more detail below, face-morphing model 42 may comprise a number of shared components that have the same trainable parameters for all N identities and a number of identity-specific components for each of the N identities. As discussed in more detail below, the shared components of face-morphing model 42 may comprise the shared encoder and optional one or more shared decoder layers from the face-swapping model and a number of hypernetworks of trainable parameters. Because face-morphing model 42 includes the shared encoder from face-swapping model 32, the block 30 training of face-swapping model 32 may be considered to be a part of, or a sub-step of, the block 40 training of face-morphing model 42. Each hypernetwork may comprise single fully connected linear layer network which learns a mapping from a vector of layer-specific and identity-specific weights to the parameters of a corresponding layer of the identity-specific portion of face-swapping model 32. Each hypernetwork may be considered to be specific to a corresponding one of the layers of the identity-specific portion of the corresponding face-swapping model 32. It may be convenient to describe the union of all layer-specific and identity-specific weights for one identity as ID weights. As described in more detail below, face-morphing model 42 (by its structure) may define a linear basis for each layer of the identity-specific portions of face-swapping model 32. The elements of these linear bases (which may be embodied in the corresponding hypernetworks) are the shared trainable parameters learned during the block 40 training and the ID weights are the identity-specific parameters learned for each identity during the block 40 training.

Method 10 then proceeds to inference portion 10B. Inference portion 10B is performed once for each prepared input image 76. That is, video input comprising a plurality of image frames, inference portion 10B may be performed once for each of the plurality of image frames. Inference portion 10B receives, as input, a number of interpolation parameters 74 corresponding to the ID weights and a prepared input image 76 (which, could be one prepared image frame of an input video sequence). Prepared input image 76 may comprise an input image (including the face) of one of the N identities used in training portion 10A that is prepared, for example, in a manner similar to that of the block 20 data preparation. The preparation of prepared input image 76 in a manner similar to that of block 20 is not expressly shown in FIG. 1A. While prepared input image 76 corresponds to one of the N identities used in training portion 10A, prepared input image 76 need not correspond to one of the specific images used in training portion 10A. Interpolation parameters 74 may comprise layer-specific blending parameters that interpolate (e.g. linearly) between the ID weights of two or more identities. While interpolation parameters 74 may be input directly into inference portion 10B of method 10, interpolation parameters 74 may optionally be determined (in optional block 72) based on input (e.g. user-input) blending parameters 70, where input blending parameters 70 may be obtained from a user interface (e.g. a graphical user interface). In some embodiments, input blending parameters 70 may comprise some parameterization of interpolation parameters 74 that may be easier for a user (typically an artist) to understand.

Inference portion 10B starts in block 50 which receives, as input, interpolation parameters 74 and constructs a blended decoders 52A, 52B. As will be explained in more detail below, blended decoders 52A, 52B may comprise a structure/architecture that is similar to that of the identity-specific portions of face-swapping model 32. However, blended decoders 52A, 52B differ from any of the identity-specific portions of face-swapping model 32 in that blended decoders 52 comprise parameters specified by interpolation parameters 74 together with the parameters of face-morphing model 42 which allow blended decoders 52A, 52B to blend characteristics of two or more of the N input identities.

Inference portion 10B then proceeds to block 60 which receives, as input, prepared input image 76 and uses a combination of the shared component of face-swapping model 32 and blended decoders 52A, 52B to infer an inferred blended face image 73A and an inferred blended mask 73B, which are blends of two or more of the N input identities. Because face-morphing model 42 is layer-specific (i.e. specific to layers of the identity-specific portions of face-swapping model 32), interpolation parameters 74 can be different for each layer and, consequently, blended decoders 52A, 52B inferred blended face image 73A and inferred blended mask 73B can have different amounts of blending between identities for different layers of the identity-specific portions of face-swapping model 32. In some embodiments, method 10 concludes with the output of inferred blended face image 73A and an inferred blended face mask 73B (block 60). The block 60 inferred blended face image 73A and an inferred blended face mask 73B may be output to off-the-shelf image compositor software and used to construct an inferred output image 62.

Compositing an inferred output image 62 is an optional aspect of method 10 (FIG. 1A) that may be performed in optional block 77. Optional block 77 which comprises applying inferred blended mask 73B to inferred blended face image 73A to obtain a masked inferred blended image 86 and compositing masked inferred blended image 86 into prepared input 76 to thereby generate inferred blended output image 62.

Figure 1B:
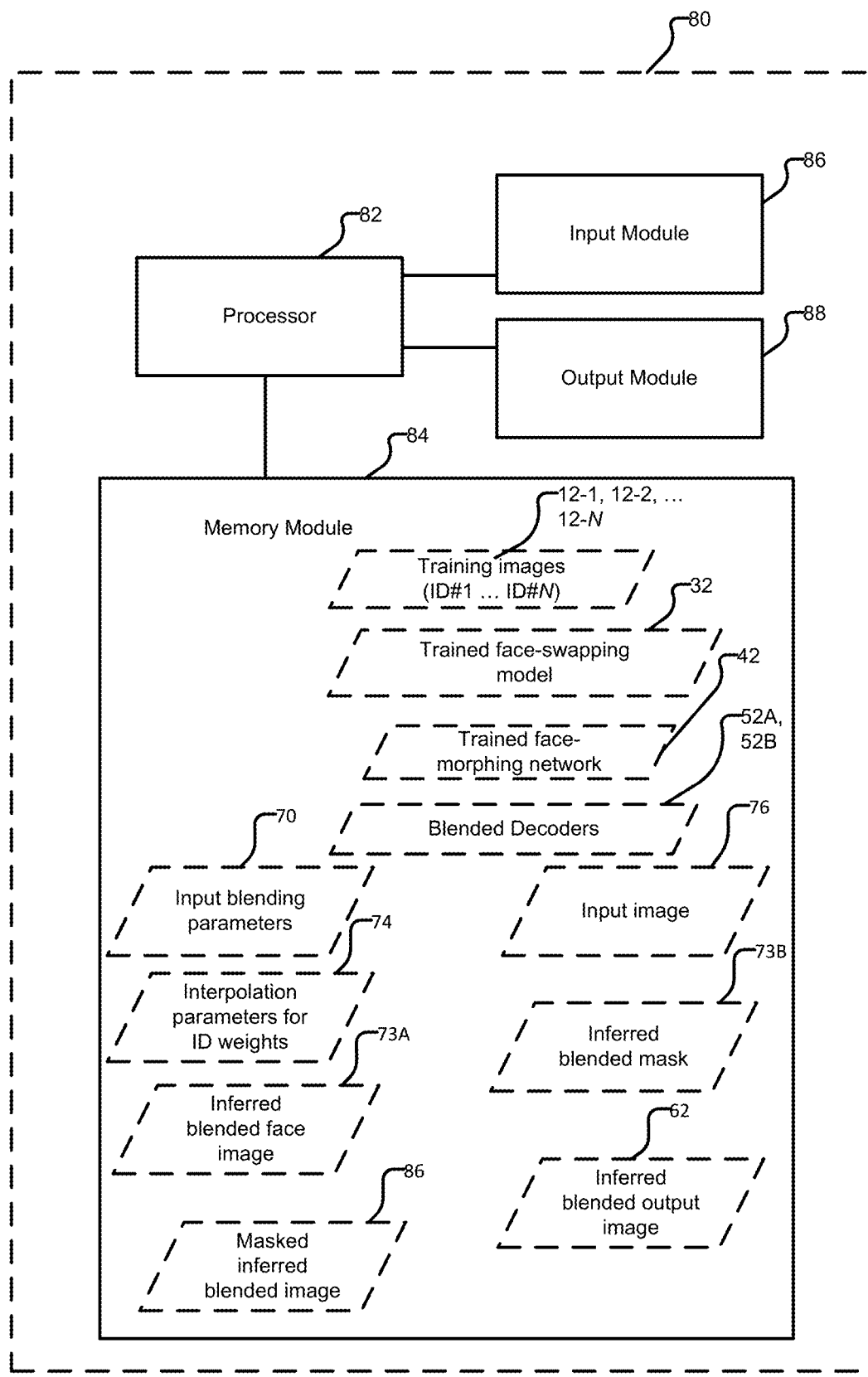
FIG. 1B depicts an exemplary system for performing one or more methods described herein (e.g. the method of FIG. 1A) according to a particular embodiment.

Some aspects of the invention provide a system 80 (an example embodiment of which is shown in FIG. 1B) for performing one or more of the methods described herein (e.g. method 10 of FIG. 1A) or portions thereof. System 80 may comprise a processor 82, a memory module 84, an input module 86, and an output module 88. Memory module 84 may store one or more of the networks and/or representations described herein. Processor 82 may receive (via input module 86) one or more sets of training images 12 and may store these inputs in memory module 84. Processor 82 may perform method 10 to train face-swapping model 32 face-swapping training block 30 and face-morphing model 42 in face-morphing training block 40 as described herein, and store these models 32, 42 in memory module 84. Processor 82 may receive interpolation parameters 74 or precursors (e.g. input blending parameters 70) to interpolation parameters 74 (via input module 86) for example and may store such data in memory module 84. Processor 82 may receive prepared input image 76 or a precursor to prepared input image 76 (in which case processor 82 may prepare prepared input image 76) via input module 86, for example, and may store such data in memory module 84. Processor 82 may use interpolation parameters 74 to construct blended decoders 52A, 52B which may be stored in memory module 84 and may use blended decoders 52A, 52B together with prepared input image 76 to infer inferred blended face image 73A and inferred blended mask 73B. Processor 82 may implement an image compositor which may apply inferred blended mask 73B to inferred blended face image 73B to obtain masked inferred blended image 86 and may then composite masked inferred blended image 86 into prepared input image 76 to generate inferred blended output image 62. Processor 82 may output blended output image 62 via output module 88.

Figure 2:
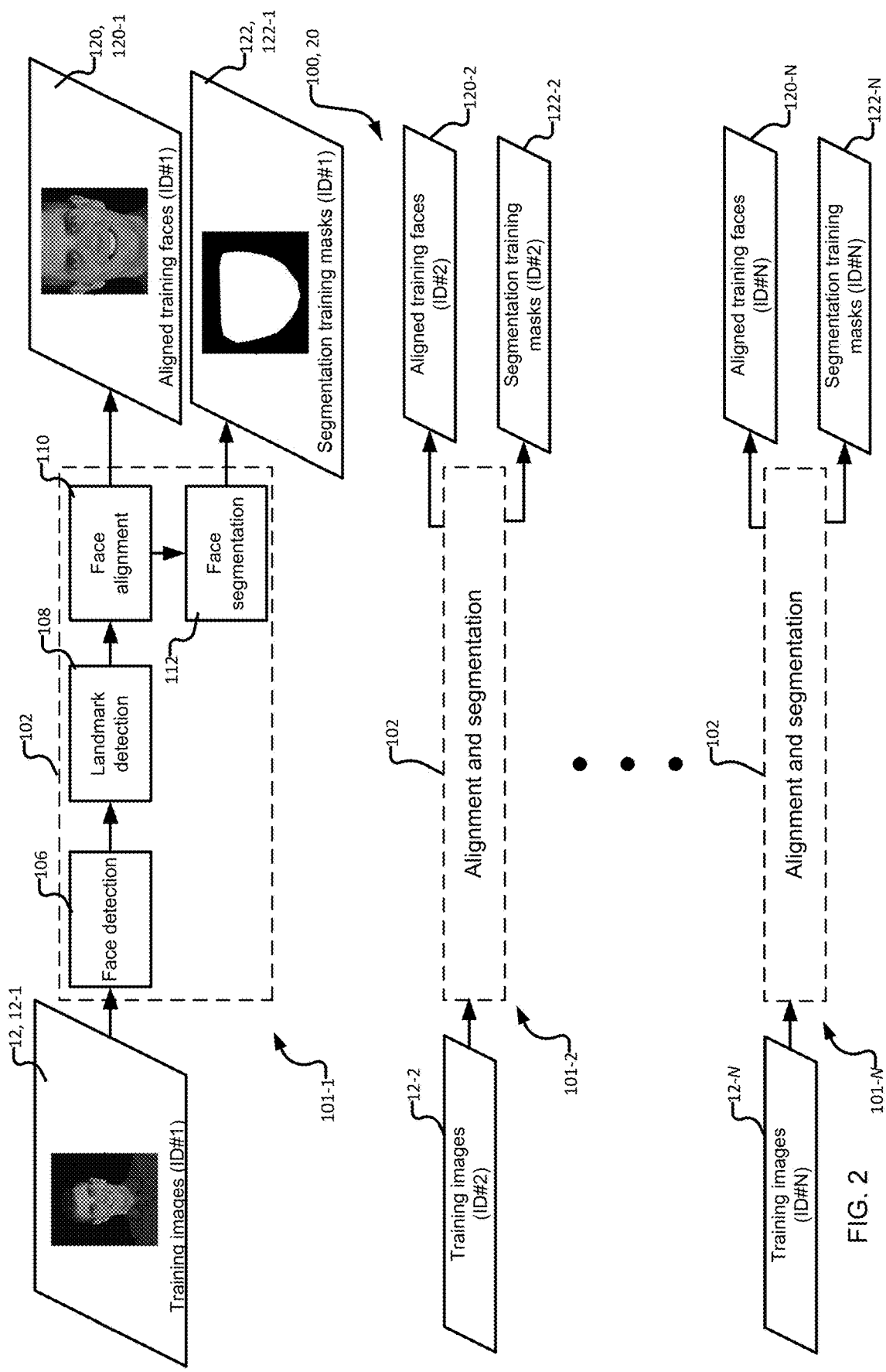
FIG. 2 is a schematic depiction of a method for preparing the input data for the FIG. 1A face morphing method according to a particular embodiment.

FIG. 2 is a schematic depiction of a method 100 that may be used to implement the block 20 input data preparation for the FIG. 1A face morphing method 10 according to a particular embodiment. Method 100 may be performed in an automated manner by processor 82 of system 80 (FIG. 1B). Method 100 may be understood to have one branch 101-1, 101-2, ... 101-N for each of the N input identities of method 10. Each branch 101 of method 100 receives, as input, a corresponding set of training images 12 and produces, as output, corresponding aligned face images 120 and corresponding segmentation masks 122 (i.e. one aligned face image 120 and one corresponding segmentation mask 122 for each input training image 12). For brevity, branch 101-1 of method 100 (corresponding to identity #1 and corresponding training images 12-1) is described in detail and the corresponding data preparation branches 101-2, ... 101-N for other identities and other sets of training images 12 will be understood to be analogous.

Branch 101-1 comprises an alignment and segmentation block 102 which is performed once for each image in its corresponding set of input training images 12 to generate corresponding aligned face images 120-1 and corresponding segmentation masks 122-1 (i.e. one aligned face image 120-1 and one corresponding segmentation mask 122-1 for each input training image 12-1). For each frame/image of input training images 12-1, alignment and segmentation block 102 starts in block 106 which comprises performing a face detection operation to determine a bounding box in the current frame which includes the identity's face. There are numerous face detection techniques known in the art that may be used in block 106. One suitable non-limiting technique, is that disclosed by Bulat et al. 2017. How far are we from solving the 2D & 3D Face Alignment problem? (and a dataset of 230,000 3D facial landmarks). In *International Conference on Computer Vision*, which is hereby incorporated herein by reference.

Alignment and segmentation block 102 then proceeds to block 108 which involves applying a 2D landmark detection process within the bounding box determined in block 106 to find fiducial points on the face. There are numerous facial landmark detection techniques known in the art that may be used in block 108. One suitable non-limiting technique, is that disclosed by Bulat et al. discussed above. In some embodiments, the 2D landmarks (fiducial points) of interest in block 108 include landmarks from the eyebrows, eyes and/or nose.

Alignment and segmentation block 102 then proceeds to block 110 which involves computing and applying a 2D affine transformation that will align the face to a canonical front head pose. Suitable non-limiting techniques for this block 110 process are described in: Shinji Umeyama. 1991. Least-Squares Estimation of Transformation Parameters Between Two Point Patterns. *IEEE Trans. Pattern Anal. Mach. Intell.* 13, 4 (1991), 376-380; and Naruniec et al. 2020. High-Resolution Neural Face Swapping for Visual Effects. *Computer Graphics Forum* 39, 4 (2020), 173-184; both of which are hereby incorporated herein by reference. The output of the block 110 process is a cropped canonical front head pose (referred to herein as aligned training face 120-1) corresponding to the current frame/image of input training images 12-1.

The block 108 detected landmarks and the block 110 aligned face coordinates may be used in block 112 to build an face segmentation training mask 122-1 corresponding to the current frame/image of input training images 12-1. One suitable non-limiting technique for performing this block 112 face segmentation process to generate face segmentation training masks 122-1 is described in Naruniec et al. cited above. There are other techniques known to those skilled in the art for generating facial segmentation training masks 122-1, some of which do not rely on detected landmarks. Some such techniques include, without limitation, training machine learning models to predict labels per pixel for generation of semantic face segmentation masks on labelled regions of the face as described, for example, by Chen et al. (2017). Rethinking Atrous Convolution for Semantic Image Segmentation. arXiv:1706.05587 [cs.CV], which is hereby incorporated herein by reference. A segmentation mask 122 (or any other masks described herein) may comprise a 2-dimensional array (e.g. 256×256) of pixels and may have a single value m in a range of [0,1] for each pixel. Where an image has the same dimensionality (e.g. a 256×256 array of pixels) a mask may be applied to the image by pixel-wise multiplication of the mask pixel values by the RGB values of the image pixels. It will be appreciated that, where the mask value is m=0 for a particular pixel, application of the mask to that pixel mutes the image entirely at that pixel, where the mask value is m=1 for a particular pixel, application of the mask to that pixel does not impact the image at that pixel and that where 0<m<1 for a particular pixel, application of the mask to that pixel attenuates various amounts of the image depending on the value of m.

FIG. 2 explicitly shows branches 101-1, 101-2, ... 101-N corresponding to training images 12-1, 12-2, ... 12-N for generating aligned training faces 120-1, 120-2, ... 120-N and segmentation training masks 122-1, 122-2, ... 122-N. Each branch 101 may be implemented in a manner analogous to that of branch 101-1 described above.

In some embodiments, aligned training faces images 120 may comprise (or may be converted, using suitable upsampling or downsampling techniques, to) 512×512 pixel images of a face of their corresponding identity with three channels (e.g. red (R), green (G), blue (B)) per pixel, although other image resolutions and other numbers of per-pixel channels are possible. In some embodiments, segmentation training masks 122 may comprise (or may be converted, using suitable upsampling or downsampling techniques, to) 512×512 pixel mask images which one floating point channel (e.g. an alpha (a) channel) per pixel, although other image resolutions and other numbers of per-pixel channels are possible. This upsampling or downsampling may be used so that aligned training face images 120 and segmentation training masks 122 have resolutions corresponding to the configurations of face-swapping model 32 and face-morphing model 42.

Figure 3A:
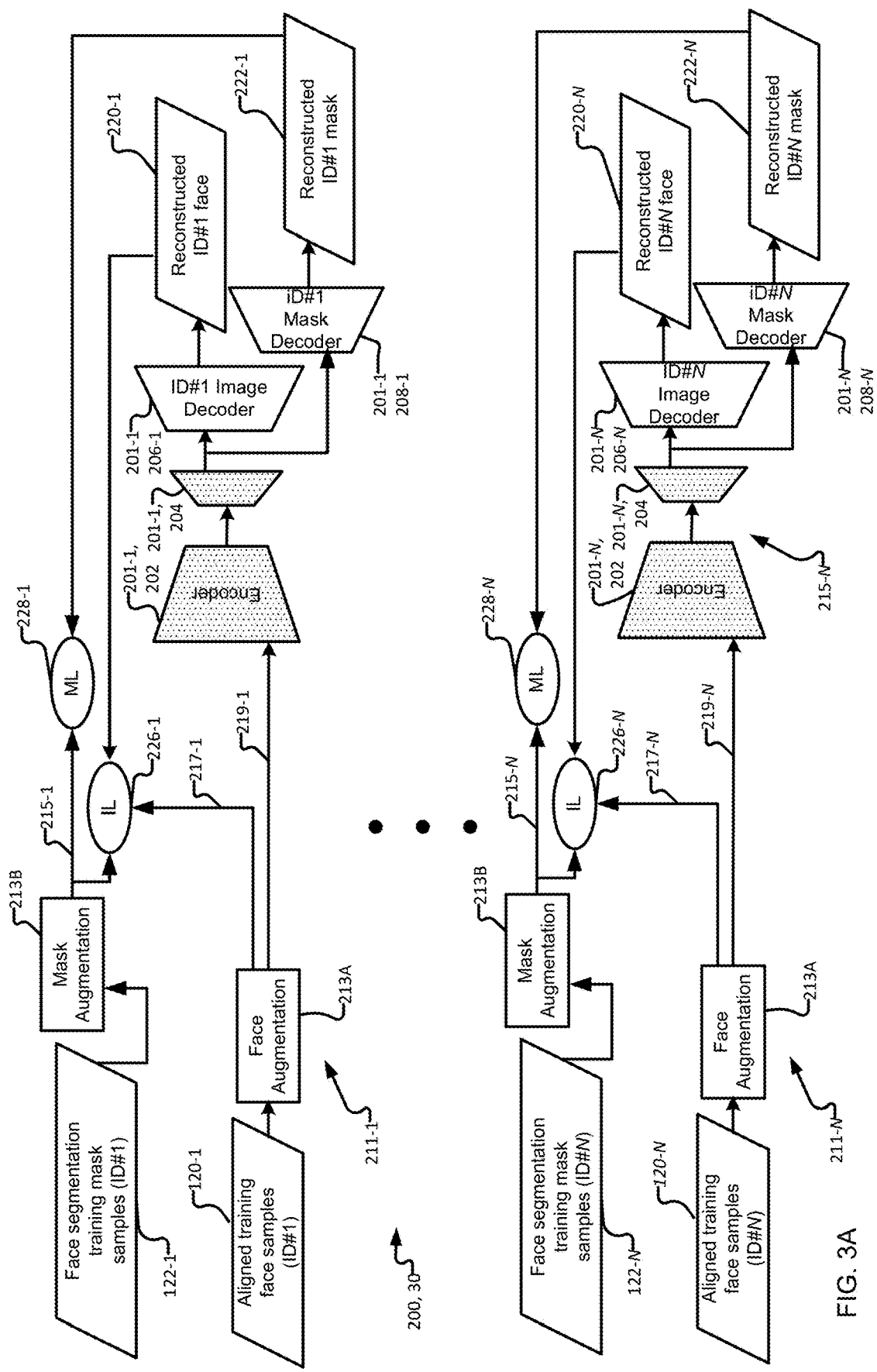
FIG. 3A is a schematic depiction of a training scheme illustrating the computation of loss functions (image loss and mask loss functions) that may be used to implement the training of a face-swapping model for the FIG. 1A face morphing method according to a particular embodiment.

FIG. 3A is a schematic depiction of a training scheme 200 illustrating the computation of loss functions (image loss (IL) and mask loss (ML)) for each of the N identities that may be used to implement the block 30 training of face-swapping model 32 for the FIG. 1A face morphing method 10 according to a particular embodiment. The block 30 training of face-swapping model 32 may be performed by processor 82 of system 80 (FIG. 1B) using training scheme 200. Training scheme 200 uses unsupervised training—that is, there is no a priori pairing of aligned training face samples 120 or face segmentation training masks 122 between the different identities. Training scheme 200 trains autoencoders 201 (described in more detail below) to receive distorted (augmented) input face images and segmentation masks from any one of the N identities and to reconstruct corresponding reconstructed face images (e.g. having the same facial expressions and head poses) and segmentation masks which remove the second order augmentations applied to the input face images. After training, any aligned image (containing a facial expression and head pose) of one of the N identities can be used as input to a corresponding one of the N autoencoders 201 of training scheme 200, and the autoencoder 201 can reconstruct an output image (in the same expression and head pose) and output segmentation mask for the entity corresponding to that autoencoder.

Face-swapping model training scheme 200 receives, as input, the data output from the method 100 (block 20) data preparation. Specifically, face-swapping model training scheme 200 receives aligned training faces 120-1, 120-2, . . . 120-N (collectively, aligned training faces 120) and corresponding segmentation training masks 122-1, 122-2, . . . 122-N (collectively, segmentation training masks 122) for each of the N identities. Face-swapping model training scheme 200 may be conceptually divided into branches 211-1, 211-2, . . . 211-N (collectively, branches 211), where each branch 211 corresponds to one of the N identities.

Face-swapping model training scheme 200, in the FIG. 3A illustrated embodiment, involves training autoencoders 201-1, 201-2, 201, . . . 201-N (collectively, autoencoders 201) i.e. one autoencoder 201 for each of the N identities. In general, autoencoders, like autoencoders 201, are a type of neural network which comprise encoders that compress their input into latent codes and decoders that decompress the latent codes in an effort to reconstruct the original input. Autoencoders 201 depicted in the illustrated embodiment of the FIG. 3A training scheme 200 each comprise an encoder 202 and a pair of decoders—an image decoder and a mask decoder. Specifically, each autoencoder 201-1, 201-2, . . . 201-N comprises an encoder 202 and a corresponding pair of decoders comprising an image decoder 206-1, 206-2, . . . 206-N (collectively, image decoders 206) and a mask decoder 208-1, 208-2, . . . 208-N (collectively, mask decoders 208).

Autoencoders 201 depicted in the illustrated embodiment of the FIG. 3A are constructed such that their encoders 202 and, optionally, one or more initial decoder layers 204 share the same trainable parameters (i.e. are the same) across the N identities. That is, encoders 202 and one or more initial decoder layers 204 of the FIG. 3A embodiment are constrained to be common (share the same trainable parameters) across all N identities. This commonality of encoders 202 and the one or more initial decoder layers 204 across all N identities is shown schematically in FIG. 3A by shading. Further, the data compression of autoencoders 201 is schematically illustrated in FIG. 3A by their shape—that is, encoders 202 are shown in FIG. 3A as getting narrower (in height) from right to left as data is compressed and decoders 206, 208 are shown as getting wider (in height) from right to left as the latent codes are decompressed. In some embodiments, other portions of autoencoders (e.g. only encoders 202) may be constrained to share the same trainable parameters.

Apart from its one or more shared initial layers 204, each image decoder 206-1, 206-2, . . . 206-N and each mask decoder 208-1, 208-2, . . . 208-N is unique (comprises trainable parameters that are unique to) to its corresponding one of the N identities. As described in more detail below, each image decoder 206-1, 206-2, . . . 206-N is trained to reconstruct face images 220-1, 220-2, . . . 220-N (collectively, reconstructed face images 220) of its corresponding identity and each mask decoder 208-1, 208-2, . . . 208-N is trained to reconstruct segmentation masks 222-1, 222-2, . . . 222-N (collectively, reconstructed segmentation masks 222) of its corresponding identity. In some embodiments, reconstructed face images 220 may comprise (and image decoders 206 may output) 512×512 pixel images of a face of their corresponding identity with three channels (e.g. red (R), green (G), blue (B)) per pixel, although other image resolutions and other numbers of per-pixel channels are possible. In some embodiments, reconstructed segmentation masks 222 may comprise (and mask decoders 208 may output) 512×512 pixel mask images which one floating point channel (e.g. an alpha (a) channel) per pixel, although other image resolutions and other numbers of per-pixel channels are possible. In some embodiments, the separation of decoders into image decoders 206 and mask decoders 208 is not necessary and each autoencoder 201 may comprise a single decoder with a different number of output channels and a different number of intermediate learnable kernels to perform the same function as image decoders 206 and mask decoders 208.

Face-swapping model 32 (FIG. 1) may comprise autoencoders 201 (e.g. the combination of encoder 202, image decoders 206 and mask decoders 208, including the shared one or more initial decoder layers 204).

Table 1 shows the architecture of the shared encoder 202 according to a particular example embodiment, where convolutions use a stride of 2 and zero padding of 1 and the network comprises Leaky ReLU activations with a slope of 0.1.

TABLE 1

| | | Encoder Architecture | | |
|---|---|---|---|---|
| Name | Components | Activation | Output Shape | Params |
| Input | | | 3 × 512 × 512 | |
| Branch | Conv5 × 5 | LeakyReLU | 64 × 256 × 256 | 4,864 |
| | Conv5 × 5 | LeakyReLU | 128 × 128 × 128 | 204,928 |
| | Conv5 × 5 | LeakyReLU | 256 × 64 × 64 | 819,456 |
| | Conv5 × 5 | LeakyReLU | 512 × 32 × 32 | 3,277,312 |
| | Conv5 × 5 | LeakyReLU | 512 × 16 × 16 | 6,554,112 |
| | Flatten | | 131072 | |
| Bottleneck | Dense | | 256 | 33,554,688 |

Table 2 shows the architecture of an image decoder 206 according to a particular example embodiment. Leaky ReLU activations use a slope of 0.1 unless otherwise stated in parentheses. PixelShuffle layers (which do not include trainable parameters) upsample by a factor of 2. Pairs of consecutive convolutions are composed as residual blocks.

TABLE 2

Decoder architecture

| Name | Components | Activation | Output shape | Params |
|---|---|---|---|---|
| Input | | | 256 | |
| Shared decoder layers | Dense | — | 65536 | 16,842,752 |
| | Reshape | — | 256 × 16 × 16 | |
| | Conv3 × 3 | LeakyReLU | 1024 × 16 × 16 | 2,360,320 |
| | Pixelshuffle | — | 256 × 32 × 32 | |
| Image_decoder | Conv3 × 3 | LeakyReLU | 2048 × 32 × 32 | 4,720,640 |
| | Pixelshuffle | — | 512 × 64 × 64 | |
| | Conv3 × 3 | LeakyReLU (0.2) | 512 × 64 × 64 | 2,359,808 |
| | Conv3 × 3 | LeakyReLU (0.2) | 512 × 64 × 64 | 2,359,808 |
| | Conv3 × 3 | LeakyReLU | 2048 × 64 × 64 | 9,439,232 |
| | PixelShuffle | — | 512 × 128 × 128 | |
| | Conv3 × 3 | LeakyReLU (0.2) | 512 × 128 × 128 | 2,359,808 |
| | Conv3 × 3 | LeakyReLU (0.2) | 512 × 128 × 128 | 2,359,808 |
| | Conv3 × 3 | LeakyReLU | 1024 × 128 × 128 | 4,719,616 |
| | PixelShuffle | — | 256 × 256 × 256 | |
| | Conv3 × 3 | LeakyReLU (0.2) | 256 × 256 × 256 | 590,080 |
| | Conv3 × 3 | LeakyReLU (0.2) | 256 × 256 × 256 | 590,080 |
| | Conv3 × 3 | LeakyReLU | 512 × 256 × 256 | 1,180,160 |
| | PixelShuffle | — | 128 × 512 × 512 | |
| | Conv3 × 3 | LeakyReLU (0.2) | 128 × 512 × 512 | 147,584 |
| | Conv3 × 3 | LeakyReLU (0.2) | 128 × 512 × 512 | 147,584 |
| | Conv1 × 1 | Sigmoid | 3 × 512 × 512 | 387 |
| mask_decoder | Conv3 × 3 | LeakyReLU | 704 × 32 × 32 | 1,622,720 |
| | PixelShuffle | — | 176 × 64 × 64 | |
| | Conv3 × 3 | LeakyReLU | 704 × 64 × 64 | 1,115,840 |
| | PixelShuffle | — | 176 × 128 × 18 | |
| | Conv3 × 3 | LeakyReLU | 352 × 128 × 128 | 557,920 |
| | PixelShuffle | — | 88 × 256 × 256 | |
| | Conv3 × 3 | LeakyReLU | 176 × 256 × 256 | 139,568 |
| | PixelShuffle | — | 44 × 512 × 512 | |
| | Conv1 × 1 | Sigmoid | 1 × 512 × 512 | 45 |

For brevity, branch 211-1 of training scheme 200 (corresponding to identity #1) is described in detail and the corresponding branches 211-2, . . . 211-N for other identities will be understood to be analogous.

Aligned training face images 120-1 are augmented in block 213A which generates two outputs: first augmented face images 217-1, which are fed to image loss (IL) evaluation 226-1; and second augmented face images 219-1, which are fed to encoder 202. The block 213A augmentation processes may be substantially similar for each of the branches 211-1, 211-2, . . . 211-N. However, because the input training face images 120-1, 120-2, . . . 120-N are different in each branch, the first augmented face images 217-1, 217-2, . . . 217-N (collectively, first augmented face images 217) and second augmented face images 219-1, 219-2, . . . 219-N (collectively, second augmented face images 219) are also different for each branch 211.

Segmentation training masks 122-1 are augmented in block 213B which generates augmented segmentation masks 215-1, which are fed to image loss (IL) evaluation 226-1 and mask loss (ML) evaluation 228-1; The block 213B augmentation processes may be substantially similar for each of the branches 211-1, 211-2, . . . 211-N. However, because the input training segmentation masks 122-1, 122-2, . . . 122-N are different in each branch, the augmented segmentation masks 215-1, 215-2, . . . 215-N (collectively, augmented segmentation masks 215) are also different for each branch 211.

Figure 3B:
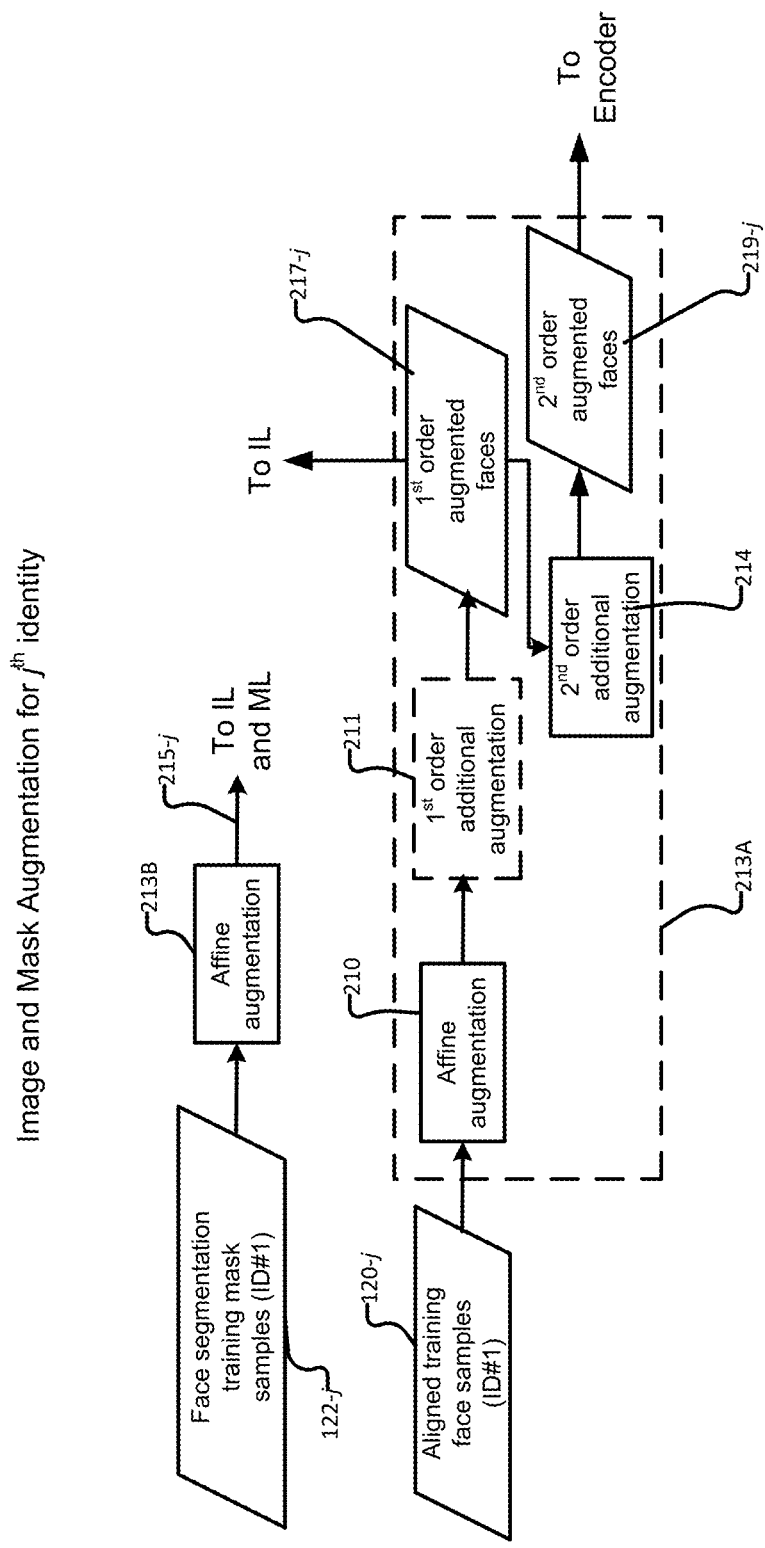
FIG. 3B is a schematic depiction of mask augmentation and face augmentation that may be used in the FIG. 3A training scheme according to a particular embodiment.

FIG. 3B is a schematic depiction of the block 213A image augmentation and the block 213B mask augmentation processes for the $i^{th}$ identity according to a particular embodiment. The block 213A image augmentation starts in block 210, where aligned training face images 120-j are randomly augmented using affine transformations. By way of non-limiting example, the affine transformations applied in block 210 may comprise random translation (e.g. less than a maximum of 5%, 10% some other configurable threshold of image size), rotation (e.g. less than a maximum 5°, 10° or some other configurable threshold of rotation) and/or uniform scaling (e.g. less than 5%, 10% some other configurable threshold in scale).

The outputs of the block 210 affine transformations are then provided to optional first order additional augmentation in block 211. Where the optional block 210 first order additional augmentation is present, one or more additional augmentation(s) may be applied to the output of the block 210 affine augmentation to generate first augmented faces 217-j (which are fed to IL evaluation 226-j as discussed above). Where the optional block 210 first order additional augmentation is not present, the output of the block 210 affine transformation may be the first augmented faces 217-j (which are fed to IL evaluation 226-j as discussed above). Non-limiting examples of additional augmentations that may be applied in the optional block 210 first order additional augmentation include: random color augmentation; random contrast augmentation; random exposure augmentation, random brightness augmentation, random tint augmentation, lighting augmentation, background augmentation, augmentations in clothing and accessories, augmentations in facial hair and/or the like.

First augmented face images 217-*j* may be further augmented in second order additional augmentation block 214 to provide second order augmented face images 219-*j* (which are fed to encoder 202 as discussed above). In some embodiments, the second order additional augmentation in block 214 may comprise grid distortion, wherein the input images are distorted by 2D warp vectors defined for each pixel. The warp vectors may be computed by first creating a grid of coordinates with random number of columns/rows (e.g. 2, 4, 8 or 16), followed by random shifts on the cell coordinates (some percentage (e.g. 24%) of the cell size) and lastly, up-sampling the grid to match the image resolution. These image augmentations are described, for example, in Buslaev A. et al. Albumentations: Fast and Flexible Image Augmentations. *Information*. 2020; 11(2):125, which is hereby incorporated herein by reference.

In some embodiments, other types of additional or alternative image augmentations, such as other types of grid distortions, elastic transforms and piecewise affine transformations could be used in block 210, block 211 and/or block 214. While not expressly an image augmentation and not expressly shown in FIG. 3A, the last step of the image augmentation in blocks 210, 211 and/or 214 may be to scale the input image to match the expected resolution for the face-swapping model 32. In some non-limiting embodiments, images are scaled to 512×512 pixels, which is what autoencoders 201 are designed for. In some embodiments, autoencoders 201 may be designed for other resolutions and this scaling process may scale the images to other resolutions. As discussed above, this scaling may be performed as part of the block 20 (method 100) data preparation, in which case it may not be required as part of augmentation blocks 210, 211, 214.

In the illustrated embodiment, the block 213B mask augmentation involves random affine augmentation of segmentation training mask 122-*j* to obtain augmented segmentation training mask 215-*j* (which is fed to IL evaluation 226-*j* and to ML evaluation 228-*j* as discussed above). The random affine augmentations applied to segmentation training mask 122-*j* in block 213B may start from the same random seed as those applied to aligned training face image 120-*j* in block 210. In some embodiments, the random affine augmentations applied to segmentation training mask 122-*j* in block 213B may be identical to those applied to aligned training face image 120-*j* in block 210.

Returning to FIG. 3A, second order augmented face images 219-1 are fed to encoders 202. For brevity further augmented training face images 219-1 may be referred to as augmented training face images 219-1. Encoders 202 compress augmented training face images 219-1 into latent codes (not expressly shown)—i.e. one latent code for each augmented training face image 219-1. These latent codes are then fed to both image decoder 206-01 and mask decoder 208-1. As alluded to above, image decoder 206-1 attempts to (and is trained to) reconstruct an identity #1 reconstructed face image 220-1 based on each input latent code. Specifically, image decoder 206-1 attempts to (and is trained to) reconstruct an identity #1 reconstructed face image 220-1 based on the latent code corresponding to each augmented training face image 219-1. In an analogous manner, mask decoder 208-1 attempts to (and is trained to) reconstruct an identity #1 reconstructed mask 222-1 based on the latent code corresponding to each augmented training face image 219-1.

In the illustrated embodiment of the FIG. 3A face-swapping model training scheme 200, face-swapping model 32 comprises autoencoders 201-1, 201-2, ... 201-N, which in turn comprise: encoder 202 and one or more optional shared decoder layers 204 (which comprise trainable parameters that are shared between identities); image decoders 206-1, 206-2, ... 206-N (which comprise identity-specific trainable parameters); and mask decoders 208-1, 208-2, ... 208-N (which comprise identity-specific trainable parameters).

Face-swapping model training scheme 200 according to the FIG. 3A embodiment involves the use of a number of loss functions (also known as objective functions and criterion functions) which are minimized during the image-to-image training process to determine the trainable parameters (e.g. weights) for encoder 202 and decoders 206, 208 and to thereby generate trained face-swapping model 32. In the illustrated embodiment, face-swapping model training scheme 200 has two types of loss functions for each branch 211 (i.e. for each of the N identities): image loss (IL) functions 226-1, 226-2, ... 226-N (collectively, IL functions 226), which compare reconstructed images 220 to first order augmented training face images 217-1, 217-2, ... 217-*j* (collectively, first order augmented training face images 217); and mask loss (ML) functions 228-1, 228-2, ... 228-N (collectively, ML functions 228), which compare reconstructed masks 222 to augmented segmentation training masks 215-1, 215-2, ... 215-N (collectively, augmented segmentation training masks 215).

In general, the IL criterion functions and ML criterion functions that are used for IL function evaluations 226 and ML function evaluations 228 may comprise a number of terms that are representative of differences between their respective input images and reconstructed images. In one particular embodiment, IL function evaluations 226 comprise least absolute deviation (L1 norm) and structural similarity index measure (SSIM) criterion functions. Other additional or alternative criterion functions could be included in IL function evaluations 226. In one particular embodiment, ML function evaluations 228 comprise least absolute deviation (L1 norm) and structural similarity index measure (SSIM) criterion functions. Other additional or alternative criterion functions could be included in ML function evaluations 228.

Branches 211-2, ... 211-N of training scheme 200 for the other identities may be analogous to branch 211-1 discussed above for identity #1.

Figure 3C:
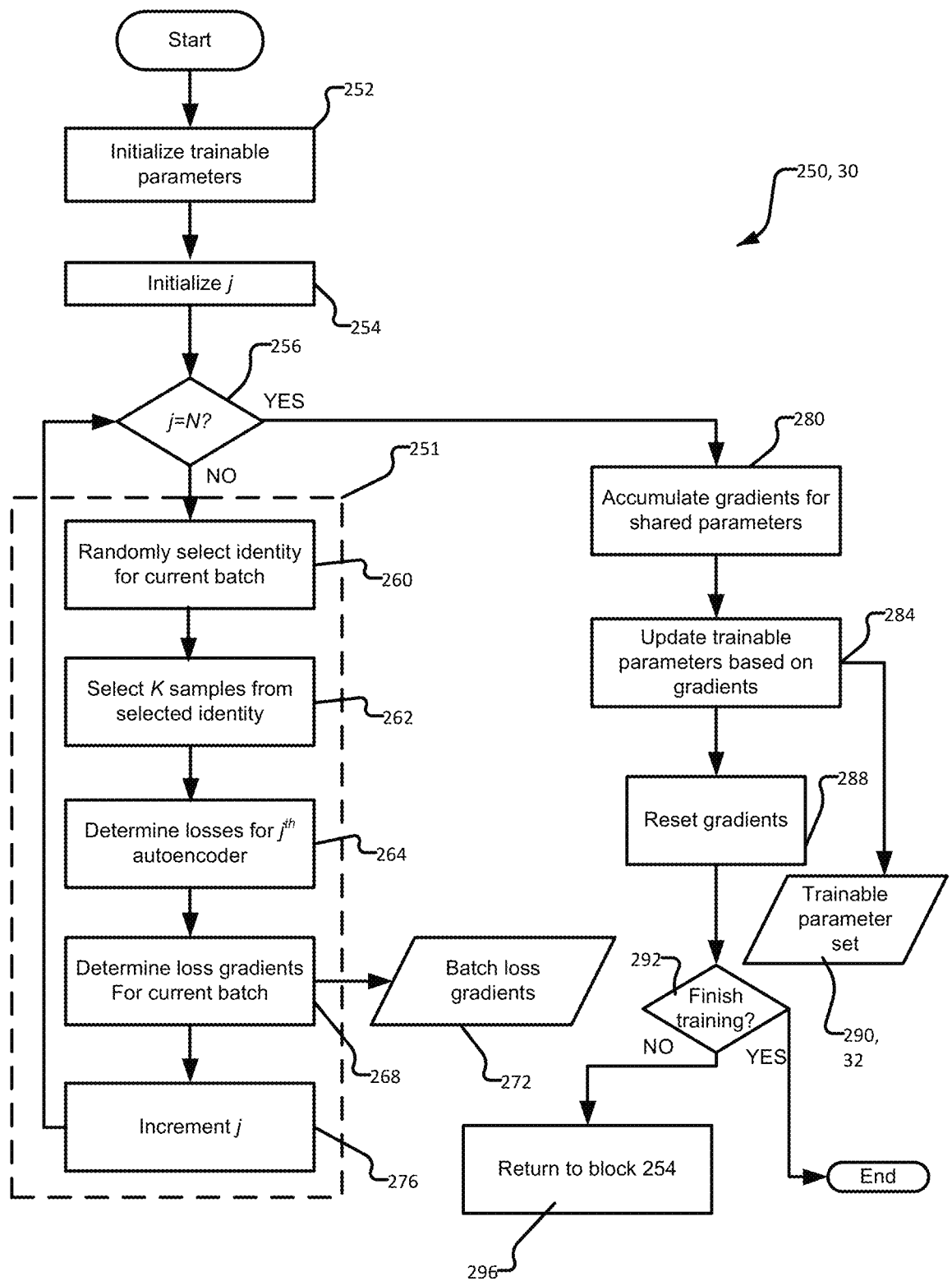
FIG. 3C is a schematic depiction of a method for training a face-swapping model that may be used to implement the face-swapping model training for the FIG. 1A face morphing method having a plurality N of identities according to a particular embodiment.

FIG. 3C is a schematic depiction of a method 250 for training face-swapping model 32 that may be used to implement the block 30 face-swapping model training for the FIG. 1A face morphing method 10 having a plurality N of identities according to a particular embodiment. Method 250 may be performed by processor 62 of system 60 (FIG. 1B). Method 250 may be implemented using the FIG. 3A training scheme 200.

Method 250 starts with the same inputs as discussed above in connection with scheme 200 shown in FIG. 3A. Specifically, the inputs to method 250 comprise: aligned training face images 120 and segmentation training masks 122 for each for each of the N identities. These inputs are not expressly shown in FIG. 3C to avoid over-cluttering the FIG. 3C illustration. The output of method 250 is a set of trainable parameters 290. Parameters 290 may comprise any trainable parameters (e.g. weights, bias parameters and/or the like) of the N autoencoders 201 shown in FIG. 3A. More specifically, parameters 290 may comprise: the trainable parameters of the common encoder 202 and the common one or more decoder layers 204 (which are shared between the N identities) as well as the identity-specific trainable parameters for the remaining layers of the N image decoders 206 and N mask decoders 208 for the N identities (see FIG. 3A). As discussed above, face-swapping model 32 is defined at least in part by these parameters 290 (after they are trained). As explained in more detail below, in the particular case of the illustrated embodiment, method 250 involves separating the training process into batches of a single identity and evaluating the loss for the corresponding autoencoder 201 for each such batch/identity.

Method 250 starts in block 252 which involves initializing the trainable parameters of face-swapping model 32 (i.e. initializing trainable parameter set 290). In some embodiments, block 252 may randomly initialize trainable parameters 290. In some embodiments, other techniques (such as assigning some prescribed values) to trainable parameters 290. Method 250 then proceeds to block 254 which involves initializing a counter variable j. The counter variable j is used to perform N iterations of batch loop 251—one iteration of batch loop 251 for each of the N identities. In the illustrated embodiment, the counter variable j is set to j=0 in block 254. Method 250 then proceeds to the inquiry of block 256. For each set of N successive iterations, the block 256 inquiry will be negative and method 250 performs an iteration of batch loop 251. After the $N^{th}$ iteration of batch loop 251, the block 256 inquiry will be positive and method 250 proceeds to block 280 which is described in more detail below.

Batch loop 251 starts in block 260 which involves selecting (e.g. randomly selecting) one of the N identities and one of the corresponding N autoencoders 201 to work with for the remainder of batch loop 251. As alluded to above, batch loop 251 involves selecting a single identity and evaluating the loss for the corresponding autoencoder 101 in each batch. In some embodiments, the block 260 identity selection is structured such that N iterations of batch loop 251 will cover each of the N identities once in a random order. Method 250 then proceeds to block 262 which involves selecting (e.g. randomly selecting) a number K of samples from within the block 260 identity. For example, if the block 260 selected identity is identity #1, then block 262 may involve selecting K images (frames) from among the identity #1 aligned training face images 120-1 and K corresponding identity #1 segmentation training masks 122-1. The number K of samples processed in each batch loop 251 may be a pre-set or configurable (e.g. user-configurable) parameter of face-swapping training method 250. In some embodiments, the number K of samples processed in each batch loop 251 may be in a range of 4-100 samples.

Method 250 then proceeds to block 264 which involves determining the losses (e.g. IL losses 226 and ML losses 228) for the current autoencoder 201 (i.e. the autoencoder 201 corresponding to the identity selected in block 260) using the face-swapping training scheme 200 (including the block 213A, 213B augmentations) shown in FIG. 3A. The block 264 losses may be accumulated (e.g. added and/or averaged) across the K samples selected in block 262. That is, block 264 may comprise: computing a loss for each of the K samples; and then adding and/or averaging those per-sample losses to ascertain an accumulated loss for the current autoencoder 201. As discussed above, in some embodiments, for each of the K samples (k=1, 2, ... K), the IL loss 226, $\mathcal{L}_{IL,k}$ comprises L1 norm (least absolute deviation) and SSIM (structural similarity index measure) terms, in which case the IL loss $\mathcal{L}_{IL,k}$ for the $k^{th}$ sample may have the form $$\mathcal{L}_{IL,k} = a\mathcal{L}_{IL,L1,k} + b\mathcal{L}_{IL,SSIM,k} \quad (1)$$

where $\mathcal{L}_{IL,L1,k}$ is the image loss L1 norm loss function for the $k^{th}$ sample for the current autoencoder 201, $\mathcal{L}_{IL,SSIM,k}$ is the image loss SSIM loss function for the $k^{th}$ sample for the current autoencoder 201 and a, b are configurable (e.g. user configurable or preconfigured) weight parameters. In some embodiments, the SSIM loss function $\mathcal{L}_{IL,SSIM,k}$ may comprise those described in Wang et al. 2004. Image quality assessment: from error visibility to structural similarity. IEEE Transactions on Image Processing 13, 4 (2004), 600-612, which is hereby incorporated herein by reference. In some embodiments, additional or alternative loss terms may be used as a part of IL loss 226 and or mask loss 228. By way of non-limiting example, such additional or alternative loss terms may include adversarial networks such as PatchGAN (e.g. as disclosed, for example, in Isola et al. 2017. Image-to-Image Translation with Conditional Adversarial Networks. In 2017 IEEE Conference on Computer Vision and Pattern Recognition (CVPR). 5967š5976. https://doi.org/10 (which is hereby incorporated herein by reference) and/or the like, perceptual loss terms (also known as VGG loss terms) as described, for example, in Johnson et al. 2016. Perceptual Losses for Real-Time Style Transfer and Super-Resolution. arXiv:1603.08155 (which is hereby incorporated herein by reference) and/or other types of loss terms. In some embodiments, different loss terms may additionally or alternatively be used for one or more different iterations of method 250.

To encourage autoencoders 201 to focus on the face region, both first order augmented face image 217-j ($x_{j,k}$) and the reconstructed image 220 ($\tilde{x}_{j,k}$), from $k^{th}$ sample from identity j that are input to IL evaluation 226-j, are masked by the corresponding augmented segmentation mask 215-j ($m_{x_j,k}$) using element-wise multiplication for each image channel (e.g. red (R), green (G), blue (B) values for each pixel). The reconstructed image 220-j ($\tilde{x}_{jk}$) is computed with shared encoder 202 and the image decoder 206-j from the same ($j^{th}$) identity according to $\tilde{x}_{j,k}$=ImageDec$_{j,k}$ (Enc($\hat{x}_{j,k}$)) where $\hat{x}_{j,k}$ is the second order augmented face image 219-j. For example, referring to FIGS. 3A and 3B, for the $j^{th}$ identity, the IL loss function may comprise IL function evaluation 226-j, the reconstructed image ($\tilde{x}_{j,k}$) may comprise pixels from reconstructed face 220-j for the $k^{th}$ sample (as reconstructed from the second order augmented face image 219-j ($\hat{x}_{j,k}$), the ground truth image ($x_{j,k}$) may comprise pixel values from first order augmented face image 217-j for the $k^{th}$ sample and mask value ($m_{x_j,k}$) may come from augmented segmentation training mask 215-j for the $k^{th}$ sample.

As discussed above, in some embodiments, for each of the K samples (k=1, 2, ... K), the ML loss 228, $\mathcal{L}_{ML,k}$ comprises L1 norm (least absolute deviation) and SSIM (structural similarity index measure) terms, in which case the ML loss $\mathcal{L}_{ML,k}$ for the $k^{th}$ sample may have the form $$\mathcal{L}_{ML,k} = c\mathcal{L}_{ML,L1,k} + d\mathcal{L}_{ML,SSIM,k} \quad (2)$$

where $\mathcal{L}_{ML,L1,k}$ is the mask loss L1 norm loss function for the $k^{th}$ sample for the current autoencoder 201, $\mathcal{L}_{ML,SSIM,k}$ is the mask loss SSIM loss function for the $k^{th}$ sample for the current autoencoder 201 and c, d are configurable (e.g. user configurable or preconfigured) weight parameters. In some embodiments, the parameter d=0. The reconstructed mask 222-j ($\tilde{m}_{j,k}$) is computed with shared encoder 202 and the mask decoder 208-j from the $i^{th}$ identity according to $\tilde{m}_{j,k}$=MaskDec$_{j,k}$ (Enc($\hat{x}_{j,k}$)) where $\hat{x}_{j,k}$ is the second order augmented face image 219-j. For example, referring to FIGS. 3A and 3B, for the $j^{th}$ identity, the ML loss function may comprise ML function evaluation 228-j, the reconstructed mask ($\tilde{m}_{j,k}$) may comprise pixels from reconstructed mask 222-j for the $k^{th}$ sample (as reconstructed from the second order augmented face image 219-j ($\hat{x}_{j,k}$), the ground truth mask ($m_{j,k}$) may comprise pixel values from augmented segmentation training mask 215-j for the $k^{th}$ sample.

After the image loss $\mathcal{L}_{IL,k}$ is determined for each of the K samples (k=1, 2, ... K) for the current identity/autoencoder 201, the total image loss LIL for the current identity/autoencoder 201 may be determined by accumulating (e.g. adding and/or averaging) the image losses $\mathcal{L}_{IL,k}$ for each of the K samples over the K samples to determine the total image loss $\mathcal{L}_{IL}$ for the current identity/autoencoder 201. Both the L1 norm term $\mathcal{L}_{IL,L1,k}$ and the SSIM term $\mathcal{L}_{IL,SSIM,k}$ can be aggregated and/or averaged over the K samples. Similarly, after the mask loss $\mathcal{L}_{ML,k}$ is determined for each of the K samples (k=1, 2, ... K) for the current identity/autoencoder 201, the total mask loss $\mathcal{L}_{ML}$ for the current identity/autoencoder 201 may be determined by accumulating (e.g. adding and/or averaging) the mask losses $\mathcal{L}_{ML,k}$ for each of the K samples over the K samples to determine the total mask loss $\mathcal{L}_{ML}$ for the current identity/autoencoder 201. Both the L1 norm term $\mathcal{L}_{ML,L1,k}$ and the SSIM term $\mathcal{L}_{ML,SSIM,k}$ can be aggregated and/or averaged over the K samples. Determination of the total image loss $\mathcal{L}_{IL}$ and total mask loss $\mathcal{L}_{ML}$ for the current identity/autoencoder 201 concludes block 264 of method 250.

Method 250 then proceeds to block 268 which involves determining loss gradients (batch loss gradients 272) for the current identity or the current iteration of batch loop 251. Determining batch loss gradients 272 in block 268 comprises computing partial derivatives of the block 264 ML and IL losses for the current identity/autoencoder 201 with respect to each of the trainable parameters 290 of face-swapping model 32 and may comprise the use of a suitable back-propagation algorithm. Batch loss gradients 272 may be determined in block 268 for each of the trainable parameters 290 of the current identity/autoencoder 201. It will be appreciated that batch loss gradients 272 comprise loss gradients for both: the trainable parameters shared between identities (e.g. the parameters of common encoder 202 and common decoder layers 204 (see FIG. 3A)); and the identity-specific trainable parameters that are specific to the current identity (e.g. parameters of the identity-specific portions of decoders 206, 208). Batch loss gradients 272 may be stored as part of block 268 for later accumulation.

Once batch loss gradients 272 are determined and accumulated in block 268, method proceeds to block 276 which involves incrementing the counter j before returning to block 256. Method continues to iterate through batch loop 251 for each of the N identities. As discussed above, block 260 may be structured such that every consecutive N iterations of batch loop 251 will cover each of the N identities once in a random order. The output of each iteration of batch loop 251 is a set of batch loss gradients 272.

When the counter j reaches j=N, then the block 256 inquiry will be positive, in which case method 250 proceeds to block 280 which involves accumulating (e.g. adding and/or averaging) batch loss gradients 272 for the shared trainable parameters 290 across the N identities. As discussed in relation to the FIG. 3A training scheme 200, the shared trainable parameters 290 include those parameters of encoder 202 and optionally those parameters of the one or more initial layers 204 of the N respective decoders 206. It will be observed that each iteration of batch loop 251 will produce a corresponding set of batch loss gradients 272 for the shared trainable parameters 290 and a corresponding set of identity-specific batch loss gradients 272 for identity-specific trainable parameters 290. It is batch loss gradients 272 for the shared parameters 290 that are accumulated (e.g. added and/or averaged) in block 280.

Method 250 then proceeds to block 284 which involves using the gradients (the identity-specific batch loss gradients 272 determined in each iteration of block 268 and the shared gradients 272 accumulated in block 280) together with a learning rate (which is a pre-set or configurable (e.g. user-configurable) parameter of face-swapping training method 250 to update the trainable parameters 290, thereby obtaining updated trainable parameters 290. For a given parameter p, the block 284 gradient update may comprise implementing functionality of the form:

$$p_{new} = p_{old} - \alpha \frac{\partial J}{\partial W} \quad (3)$$

where $p_{new}$ is the updated parameter value, $p_{old}$ is the existing parameter value prior to block 284, $\alpha$ is the learning rate and $\partial j / \partial w$ is the applicable gradient for the parameter p. In some embodiments, block 284 may involve use of a suitable optimization algorithm together with its meta-parameters to update trainable parameters 290. One non-limiting example of such an optimization algorithm is the so-called Adam optimization technique, with its meta-parameters described, for example, in Kingma et al. 2014a. Auto-Encoding Variational Bayes. In $2^{nd}$ International Conference on Learning Representations, ICLR 2014, Banff, AB, Canada, Apr. 14-16, 2014, Conference Track Proceedings, Yoshua Bengio and Yann LeCun (Eds.), which is hereby incorporated herein by reference. In some embodiments, the meta-parameters of this Adam optimization technique may comprise $\beta_1$=0.5, $\beta_2$=0.999 and learning rate of $\alpha$=5e$^{-5}$.

After determining updated parameters 290, method 250 proceeds to block 288 which involves resetting all gradients to zero in preparation for another iteration. Method 250 then proceeds to block 292 which involves an inquiry into whether the training is finished. There are many different loop-exit conditions that could be used to make the block 292 evaluation. Such loop-exit conditions may be user-specified or may be pre-configured. Such loop-exit conditions include, by way of non-limiting example, a number of iterations of branch loop 251, a number of iterations of the main method 250 loop, one or more threshold loss amounts, one or more threshold gradient amounts, one or more threshold changes in trainable parameters 290, user intervention and/or the like. If the block 292 evaluation is negative, then method 250 proceeds to block 296, where method 250 loops back to block 254 and repeats the whole FIG. 3C process again. This process of iterating from blocks 254 through to block 292 continues until the block 292 loop-exit evaluation is positive and method 250 ends.

In some embodiments, the inventors have used a number of iterations of branch loop 251 in a range of $10^5$N-$10^6$N as the loop exit condition for block 292.

Method 250 shown in the illustrated embodiment of FIG. 3C involves separating the training process into batches of a single identity and evaluating the losses for the corresponding autoencoder 201 for each such batch/identity. Those skilled in the art will appreciate that the separation of method 250 into batches is optional and that the particular order of implementation of some method steps and some procedural loops of method 250 can be varied while maintaining the training objectives of method 250. Such procedural variations should be considered to be within the contemplation of this disclosure.

Figure 4A:
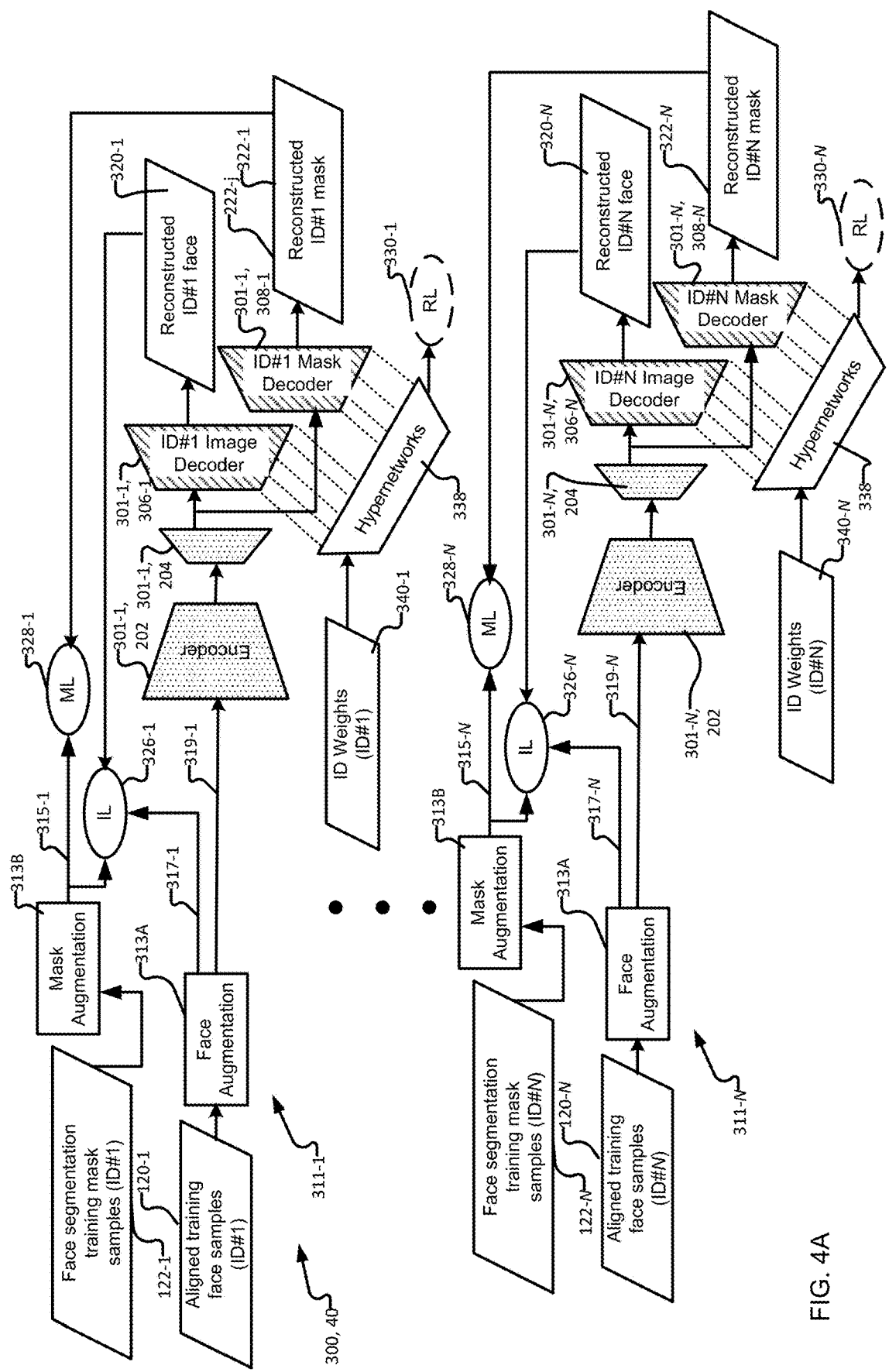
FIG. 4A is a schematic depiction of a training scheme for a face-morphing model that may be used to implement the training of the face-morphing model in the FIG. 1A face morphing method 10 according to a particular embodiment.

FIG. 4A is a schematic depiction of a training scheme 300 for training face-morphing model 42 that may be used to implement the block 40 face-morphing model training procedure for the FIG. 1A face morphing method 10 according to a particular embodiment. In many respects, face-morphing model training scheme 300 is similar to face-swapping model training scheme 200 (FIG. 3A) discussed above. Face-morphing model training scheme 300 uses the same inputs as face-swapping model training scheme 200 (FIG. 3A). Specifically, face-morphing model training scheme 300 of the illustrated embodiment uses, as input, aligned training faces 120-1, 120-2, . . . 120-N and corresponding segmentation training masks 122-1, 122-2, . . . 122-N output from the method 100 data preparation for each of the N identities. Like face-swapping model training scheme 200, face-morphing model training scheme 300 may be conceptually divided into branches 311-1, 311-2, . . . 311-N (collectively, branches 311), where each branch 311 corresponds to one of the N identities.

Like face-swapping model training scheme 200, face-morphing model training scheme 300 of the FIG. 4A illustrated makes use of autoencoders 301-1, 301-2, . . . 301-N (collectively, autoencoders 301), which are analogous to autoencoders 201 of face-swapping model training scheme 200. Like face-swapping model training scheme 200, each branch 311 of face-morphing model training scheme may comprise an image loss (IL) evaluation 326-1, 326-2, . . . 326-N (collectively, IL evaluations 326) which are analogous to IL evaluations 226 and a mask loss (ML) evaluation 328-1, 328-2, . . . 328-N (collectively, ML evaluations 328) which are analogous to ML evaluations 228. Like face-swapping model training scheme 200, face-morphing model training scheme 300 comprises face augmentation block 313A and mask augmentation block 313B which are substantially similar to face augmentation block 213A and mask augmentation block 213B of face-swapping model training scheme 200 (see FIG. 3B). Face augmentation block 313A of the $j^{th}$ channel 311-$j$ outputs first order augmented face image 317-$j$ (which is fed to IL evaluation 326-$j$ in a manner analogous to first order augmented face image 217-$j$) and second order augmented face images 219-$j$ (which is fed to autoencoder 301-$j$ in a manner analogous to second order augmented face image 219-$j$). Mask augmentation block 313B of the $i^{th}$ channel 311-$j$ outputs augmented mask 315-$j$ (which is fed to IL evaluation 326-$j$ and ML evaluation 328-$j$ in a manner analogous to augmented mask 215-$j$).

Autoencoders 301 for each branch/identity 311 are trained to use, as input, second order augmented face images 319 for their corresponding identity to reconstruct corresponding reconstructed face images 320-1, 320-2, . . . 320-N (collectively, reconstructed face images 320) and reconstructed segmentation masks 322-1, 322-2, . . . 322-N (collectively, reconstructed segmentation masks 322) for their corresponding identity. In some embodiments, reconstructed face images 320 may comprise (and image decoders 306 may output) 512×512 pixel images of a face of their corresponding identity with three channels (e.g. red (R), green (G), blue (B)) per pixel, although other image resolutions and other numbers of per-pixel channels are possible. In some embodiments, reconstructed segmentation masks 322 may comprise (and mask decoders 308 may output) 512×512 pixel mask images which one floating point channel (e.g. an alpha (a) channel) per pixel, although other image resolutions and other numbers of per-pixel channels are possible. In some embodiments, the separation of decoders into image decoders 306 and mask decoders 308 is not necessary and each autoencoder 301 may comprise a single decoder with a different number of output channels and a different number of intermediate learnable kernels to perform the same function as image decoders 306 and mask decoders 308.

Face-morphing model training scheme 300 differs from face-swapping model training scheme 200 in that the parameters of autoencoders 301 are not directly trainable parameters. Instead, the trainable parameters of face-morphing model training scheme 300 and face morphing model 42 comprise the identity-specific ID Weights 340-1, 340-2, . . . 340-N (collectively, ID Weights 340) and hypernetworks 338 which are shared across the N identities. ID Weights 340 and hypernetworks 338 are described in more detail below. In general, face-morphing model 42 comprises autoencoders 301, ID Weights 340 and hypernetworks 338, except that only ID Weights 340 and hypernetworks 338 comprise parameters that trainable as part of face-morphing model training scheme 300. More specifically, face-morphing autoencoders 301 comprise: shared encoders 202 and one or more optional shared decoder layers 204 from face-swapping model 32 and the parameters for these encoders 202 and decoder layers 204 are locked (not trainable) for face-morphing model 42; and identity-specific image decoders 306-1, 306-2, . . . 306-N (collectively, image decoders 306) and mask decoders 308-1, 308-2, . . . 308-N (collectively, mask decoders 308) whose parameters are prescribed (dynamically defined) by the parameters of ID Weights 340 and hypernetworks 338 as described in more detail below. In this sense, the parameters of identity-specific image decoders 306 and identity-specific mask decoders 308 may be considered to be indirectly trained in the sense that training ID Weights 340 and hypernetworks 338 prescribe (dynamically define) the parameters of identity-specific image decoders 306 and identity-specific mask decoders 308. Because face-morphing model 42 includes the shared encoder 202 and optional decoder layers 304 from face-swapping model 32, the block 30 training of face-swapping model 32 may be considered to be a part of, or a sub-step of, the block 40 training of face-morphing model 42.

Face-morphing model training scheme 300 also differs from face-swapping model training scheme 200 in that face-morphing model training scheme 300 comprises an optional regularization loss (RL) evaluation 330-1, 330-2, . . . 330-N (collectively, RL 330) which can encourage sparsity in the basis defined by hypernetworks 338, as explained in more detail below.

The output of face-morphing model training scheme 300 comprises face-morphing model 42. However, since encoders 202 and optional decoder layers 204 are part of face-swapping model 32 and because the parameters of identity-specific image decoders 306 and identity-specific mask decoders 308 are prescribed (dynamically defined) by ID Weights 340 and hypernetworks 338, the effective output of face-morphing model training scheme may be considered to be the trainable parameters of ID Weights 340 and hypernetworks 338. Alternatively, because face-morphing model 42 includes the shared encoder 202 and optional shared decoder layers 204 from face-swapping model 32, the block 30 training of face-swapping model 32 may be considered to be a part of, or a sub-step of, the block 40 training of face-morphing model 42.

For brevity, branch 311-1 of training scheme 300 (corresponding to identity #1) is described in detail and the corresponding branches 311-2, . . . 311-N for other identities will be understood to be analogous.

Second order augmented face images 319-1 are provided to encoder 202. Encoder 202 compresses the second order augmented face images 319-1 into latent codes (not expressly shown)—i.e. one latent code for each second order augmented face image 319-1. These latent codes are then fed to both image decoder 306-1 and mask decoder 308-1. As alluded to above, image decoder 306-1 attempts to (and is indirectly trained, via identity-specific ID Weights 340-1 and shared hypernetworks 338, to) reconstruct an identity #1 reconstructed face image 320-1 based on each input latent code. Specifically, image decoder 306-1 attempts to (and is indirectly trained, via ID Weights 340-1 and shared hypernetworks 338, to) reconstruct an identity #1 reconstructed face image 320-1 based on the latent code corresponding to each second order augmented face image 219-1. In an analogous manner, mask decoder 308-1 attempts to (and is indirectly trained, via ID Weights 340-1 and shared hypernetworks 338, to) reconstruct an identity #1 reconstructed mask 322-1 based on the latent code corresponding to each second order augmented face image 319.

As alluded to above, face-morphing model training scheme 300 according to the FIG. 4A embodiment involves the use of a number of loss functions (also known as objective functions and criterion functions) which are minimized during the face-swapping training process to determine the trainable parameters (e.g. identity-specific ID Weights 340 and shared hypernetworks 338) to thereby generate trained face-morphing model 42. ID Weights 340-1, 340-2, . . . 340-N and hypernetworks 338 prescribe (dynamically define) the corresponding parameters for their respective identity-specific image decoders 306-1, 306-2, . . . 306-N and mask decoders 308-1, 308-2, . . . 308-N. In the illustrated embodiment, face-morphing model training scheme 300 has three types of loss functions for each branch 311 (i.e. for each of the N identities): image loss (IL) functions 326-1, 326-2, . . . 326-N (collectively, IL functions 326), which compare reconstructed face images 320-1, 320-2, . . . 320-N (collectively, reconstructed face images 320) to first order augmented face images (see FIG. 3A) 317-1, 317-2, 317-N (collectively, first order augmented face images 317) using augmented segmentation masks 315-1, 315-2, . . . 315-N (collectively, augmented segmentation mask 315); mask loss (ML) functions 328-1, 328-2, . . . 328-N (collectively, ML functions 328), which compare reconstructed masks 322-1, 322-2, . . . 322-N (collectively, reconstructed masks 322) to augmented segmentation masks 315; and optional regularization loss (RL) functions 330-1, 330-2, . . . 330-N (collectively, RL functions 330) which are computed based on the parameters of hypernetworks 338.

In general, the IL criterion functions and ML criterion functions that are used for IL function evaluations 326 and ML function evaluations 328 may comprise a number of terms that are representative of differences between their respective input images/masks and reconstructed images/masks. In one particular embodiment, IL function evaluations 326 and ML function evaluations 328 use the same criterion functions as IL function evaluations 226 and ML function evaluations 328 described above in connection with face-swapping model training scheme 200, although this is not necessary. Other additional or alternative criterion functions could be included in IL function evaluations 326 and/or in ML function evaluations 328. In one particular embodiment, optional RL function evaluations 330 comprise an L1 loss criteria, which each L1 loss criteria computed over the trainable parameters of the basis (see basis matrix $A_i$ described in more detail below) without the bias (see bias vector $\mu_i$ described in more detail below) for a particular hypernetwork 338($i$) responsible for computation of the parameters for the $i^{th}$ decoder layer, although other additional or alternative loss criteria could be used to perform RL function evaluations 330.

Branches 311-2, . . . 311-N of training scheme 300 for the other identities may be analogous to branch 311-1 discussed above for identity #1.

The trainable parameters of face-morphing model training scheme 300 are not the parameters of autoencoders 301, but rather the trainable parameters of face-morphing model training scheme 300 are the identity-specific ID Weights 340 and shared hypernetworks 338 of face-morphing model 42, which in turn prescribe (dynamically define) the parameters of identity-specific image decoders 306 and identity-specific mask decoders 308. While the parameters of shared encoders 202 and optional shared decoder layers 204 may be considered to be part of face-morphing model 42, these parameters are known from the training 200 of face-swapping model 32. Training scheme 300 posits that the parameters of each layer of identity-specific images decoders 306 and identity-specific mask decoders 308 may be defined by a linear basis and that the identity-specific ID weights 340 and hypernetworks 338 may be used to reconstruct the parameters of identity-specific images decoders 306 and identity-specific mask decoders 308.

The manner in which identity-specific ID Weights 340 and hypernetworks 338 prescribe (dynamically define) the parameters image decoders 306 is described in detail below. It will be understood that face-morphing model 42 may also comprise trainable parameters which may be used to prescribe (dynamically define) the parameters of mask decoders 308 in an analogous manner.

Figure 4B:
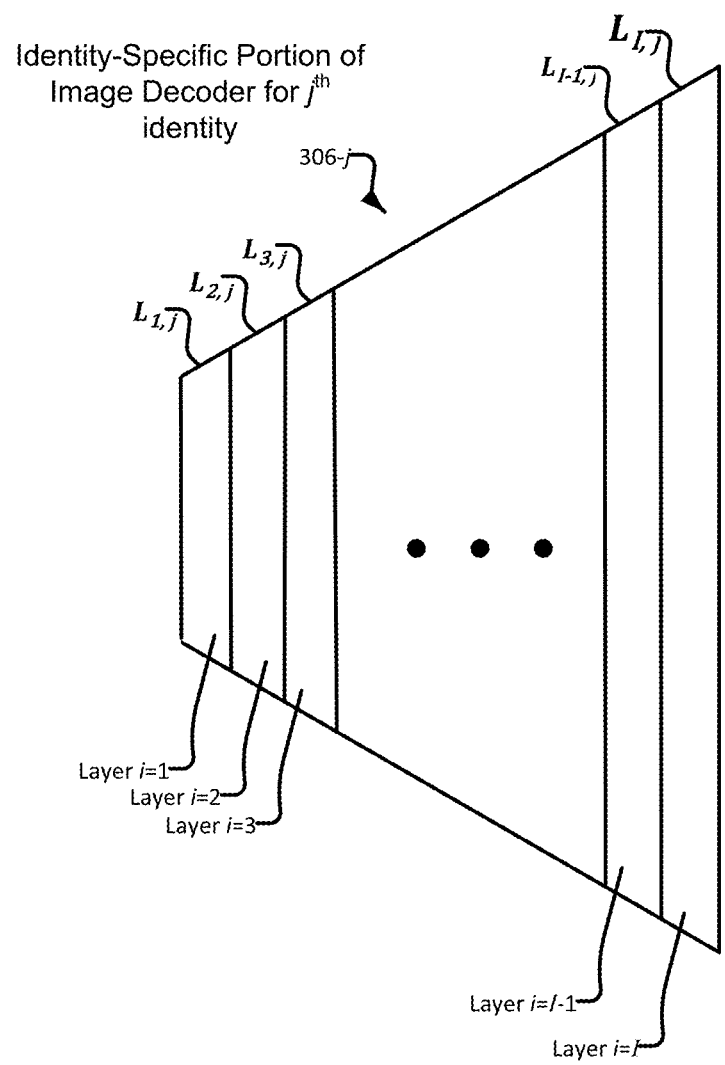
FIG. 4B is a schematic illustration of an identity-specific portion an image decoder for a $j^{th}$ identity.

FIG. 4B is a schematic illustration of a number of layers of the identity-specific image decoder 306-$j$ for the $j^{th}$ identity. Decoder 306-$j$ of the FIG. 4B embodiment is a neural network having layers i=1, 2, 3, . . . I. For ease of description and without limiting the generality of image decoder 306-$j$, FIG. 4B and the following description describes only the layers i of image decoder 306-$j$ having trainable parameters. That is, image decoder 306-$j$ may have additional layers (which may be interposed between, or adjacent to, the illustrated layers i of image decoder 306-$j$) which are not shown in FIG. 4B and not discussed here, because these additional layers do not have trainable parameters. For example, the "PixelShuffle" layers shown in the Table 2 decoder architecture are examples of layers that do not have trainable parameters. The parameters of the $i^{th}$ layer of decoder 306-$j$ may then be defined by a vector $L_{i,j}$. It will be appreciated that each layer of decoder 306-$j$ has a different number of parameters and, consequently, we may define $q_{i,j}$ to be the number of parameters in the $i^{th}$ layer or the $i^{th}$ decoder 306-$j$. In some embodiments, the N identity-specific image decoders 306 are constrained to have the same architecture (i.e. such that their respective layers have the same number of parameters), in which case $q_{i,j}$ is identity independent and may be denoted $q_i$ to represent the number of parameters in the $i^{th}$ layer of each image decoder 306.

Based on these definitions, image decoder 306-$j$ for the $i^{th}$ identity shown in FIG. 4B may be defined by the set of vectors $L_{1,j}, L_{2,j}, L_{3,j} \ldots L_{I-1,j}, L_{I,j}$ as shown in FIG. 4B. We may define a matrix $$L_i = \begin{bmatrix} L_{i,1} \\ L_{i,2} \\ \vdots \\ L_{i,N} \end{bmatrix}$$

to be the matrix that defines the $i^{th}$ layer parameters across all N identities. Training scheme 300 posits that the matrix $L_i$ may be at least approximately defined by a linear basis having $m_i$ components, where the number $m_i$ of components may be user-configurable and can be different for each of the $i=1, 2, 3, \ldots I$ layers. Specifically, training scheme 300 posits that the matrix $L_i$ may be at least approximately reconstructed according to:

$$L_i \approx \tilde{L}_i = W_i A_i + \begin{bmatrix} \mu_i \\ \mu_i \\ \vdots \\ \mu_i \end{bmatrix} \quad (4)$$

where: $A_i$ is a matrix of dimensionality $[m_i, q_i]$ that defines a linear basis for the $i^{th}$ layer parameters of decoders 306 across all N identities, where each row of $A_i$ is a basis vector; $W_i$ is a matrix of dimensionality $[N, m_i]$ of weights for the $i^{th}$ layer of decoders 306 across all N identities, where each row of $W_i$ is a set of $m_i$ weights for a corresponding one of the N identity-specific decoders 306, and $$\begin{bmatrix} \mu_i \\ \mu_i \\ \vdots \\ \mu_i \end{bmatrix}$$

is a matrix of dimensionality $[N, q_i]$ where every row is a vector $\mu_i$ of dimensionality $q_i$ that defines an $i^{th}$ layer bias or offset of the $i^{th}$ layer basis. The trainable parameters of face-morphing model training scheme 300 (of face-morphing model 42) may be considered to be the elements of $A_i$, $W_i$, and $\mu_i$ for the layers $i=1, 2, \ldots I$. That is, face-morphing model training scheme 300 may involve training face-morphing model 42 to define the parameters of $A_i$, $W_i$, and $\mu_i$ for the layers $i=1, 2, \ldots I$, which in turn prescribe (dynamically define) new parameters for identity-specific decoders 306. It will be appreciated that face-morphing model training scheme 300 may additionally involve training face-morphing model 42 to define a similar set of linear basis parameters (e.g. a linear basis, a matrix of weights and a bias for each of the layers) which in turn prescribe (dynamically define) parameters for identity-specific mask decoders 308. In some embodiments, the parameter specification of image decoders 306 and mask decoders 308 may be defined in a concatenated matrix with one linear basis, one bias and one set of weights for each layer that spans the space of the combined matrix.

For the $j^{th}$ identity (one row of the matrix $L_i$), equation (4) may be re-written in the form:

$$L_{i,j} \approx \tilde{L}_{i,j} = w_{ij} A_i + \mu_i \quad (5)$$

where: $w_{ij}$ is a vector of dimensionality $m_i$ that defines a set of $m_i$ weights (one weight for each of the $m_i$ basis vectors in the basis $A_i$) for the $i^{th}$ layer of the decoder 306-$j$ for the $i^{th}$ identity; and $L_{i,j}$, $A_i$, $\mu_i$ have the definitions described above. The vector $w_{ij}$ may be considered the weights for the $i^{th}$ layer of the $i^{th}$ identity. The union of all layer-specific weights $w_{ij}$ for $i=1, 2, \ldots I$ and for the $i^{th}$ identity is referred to herein as the ID Weights 340-$j$ for the $j^{th}$ identity. It will be appreciated, that ID Weights 340-$j$ are identity-specific (i.e. specific to the $i^{th}$ identity). The elements of $A_i$ and $\mu_i$ for all $i=1, 2, \ldots I$ are shared between identities and are referred to herein as hypernetworks 338. It will be understood that elements of $A_i$ and $\mu_i$ for a particular layer i may be referred to as a layer-specific hypernetwork 338($i$) for $i \in \{1, 2, \ldots I\}$.

The trainable parameters of face-morphing model training scheme 300 (face-morphing model 42) may be considered to be the elements of $A_i$ and $\mu_i$ for the layers $i=1, 2, \ldots I$ (hypernetworks 338) and the weights $w_{ij}$ for layers $i=1, 2, \ldots I$ and identities $j=1, 2, \ldots N$ (ID Weights 340-1, 340-2, $\ldots$ 340-N). That is, face-morphing model training scheme 300 may involve training face-morphing model 42 to define the parameters of $A_i$ and $\mu_i$ for the layers $i=1, 2, \ldots I$ (hypernetworks 338) and weights $w_{ij}$ for layers $i=1, 2, \ldots I$ (ID Weights 340-$j$) for the identities $j=1, 2, \ldots N$, which in turn prescribe (dynamically define) the parameters of identity-specific decoders 306.

Face-morphing model training scheme 300 may be accomplished, in some embodiments, by defining a hypernetwork 338($i$) for each of the layers $i=1, 2, \ldots I$ to comprise a single fully-connected linear layer network that learns the mapping from layer specific weights $w_{ij}$ for identities $j=1, 2, \ldots N$ to the parameters of a corresponding layer $L_{i,j}$ of image decoder 306-$j$.

The above-described concepts may be extended to mask decoders 308 by concatenating the parameters of mask decoder 308-$j$ for a particular identity j to the parameters of image decoder 306-$j$ for that decoder for the purposes of representing these parameters with a single set of hypernetworks 338 and layer indices and then considering $i=1, 2, \ldots I$ to be the number of layers in the set of concatenated decoder parameters. In this manner, an $i^{th}$ layer basis $A_i$ with dimensionality $[m_i, q_i]$ and $i^{th}$ layer bias vector $\mu_i$ of dimensionality $q_i$ may be constructed in an analogous manner to define a linear basis for the $i^{th}$ layer parameters of the set of concatenated decoder parameters (both image decoders 306 and mask decoders 308) across all N identities. Similarly, we may construct a weight matrix $W_i$ having dimensionality $[N, m_i]$ of weights for the $i^{th}$ layer of the set of concatenated decoder parameters across all N identities, where each row of $W_i$ is an identity-specific set of $m_i$ weights (a vector $w_{ij}$) for a corresponding $j^{th}$ one of the N identity-specific concatenated decoder parameters. With this construction, the shared hypernetworks 338 shown in FIG. 4A may comprise a hypernetwork 338($i$) for each of the I layers in the set of concatenated decoder parameters and each such hypernetwork 338($i$) includes the trainable parameters of the basis matrix $A_i$ and offset u; and the trainable parameters of identity-specific ID Weights 340-$j$ shown in FIG. 4A may comprise the union of the trainable parameters of the weight vector $w_{ij}$ for the layers $i=1, 2, \ldots I$. In the description that follows and in the accompanying claims, unless the context dictates otherwise, references to ID Weights 340 and/or their trainable parameters (including weight vectors $w_{ij}$) and hypernetworks 338 and/or their trainable parameters (including basis matrix $A_i$ and offset $\mu_i$) should be understood to include the set of trainable parameters corresponding to both image decoders 306 and mask decoders 308.

Table 3 below shows an example architecture for hypernetworks 338 according to a particular embodiment which is suitable for the Table 2 decoder architecture where images and masks have a 512×512 pixel resolution. The parameter NumBasis(i) is a user configurable parameter which defines the number of components (e.g. $m_i$) in the corresponding basis for the $i^{th}$ layer. The Table 3 hypernetworks 338 are a concatenation of the hypernetworks 338 for prescribing image decoders 306 (Hypernetwork(0)-Hypernetwork(12)) and mask decoders 308 (Hypernetwork(13)-Hypernetwork (17)). The identity-specific ID Weights 340 for any particular identity takes the form of a vector having a length that is given by $\Sigma_{i=0}^{I-1}$NumBasis(i), where the number of layers I=18 with trainable parameters from the image and mask decoders in the Table 3 embodiment.

specific weights $w_{ij}$ for the i=1, 2, . . . I layers of decoders 306, 308 and the j=1, 2, . . . N identities. The identity-specific and layer-specific weights $w_{ij}$ for the i=1, 2, . . . I layers of decoders 306, 308 and the j=1, 2, . . . N identities may be grouped together for each identity j and such a group of vectors $w_{ij}$ may be referred to herein as the identity-specific ID weights 340. The shared layer-specific basis parameters $A_i$ and $\mu_i$ for the layers i=1, 2, . . . I of decoders 306, 308 may be referred to herein as hypernetworks 338 and for a specific layer I may be referred to herein as hypernetwork 338(i). Trained face-morphing model parameters 390 may prescribe (dynamically define) the parameters for identity-specific image decoders 306 and mask decoders 308. As explained in more detail below, method 350 involves separating the training process into batches of a single identity and evaluating losses for each such batch/identity.

Method 350 starts in block 352 which involves initializing the trainable parameters of face-morphing model 42 (i.e. initializing trainable parameter set 390). In some embodiments, block 352 may randomly initialize trainable face-morphing model parameters 390. In some embodiments,

| Name | Components | Activation | Input Shape | Output Shape | Params |
|---|---|---|---|---|---|
| Hypernetwork0 | Dense | Linear | NumBasis0 | 4720640 | (1 + NumBasis0)*4720640 |
| Hypernetwork1 | Dense | Linear | NumBasis1 | 2359808 | (1 + NumBasis1)*2359808 |
| Hypernetwork2 | Dense | Linear | NumBasis2 | 2359808 | (1 + NumBasis2)*2359808 |
| Hypernetwork3 | Dense | Linear | NumBasis3 | 9439232 | (1 + NumBasis3)*9439232 |
| Hypernetwork4 | Dense | Linear | NumBasis4 | 2359808 | (1 + NumBasis4)*2359808 |
| Hypernetwork5 | Dense | Linear | NumBasis5 | 2359808 | (1 + NumBasis5)*2359808 |
| Hypernetwork6 | Dense | Linear | NumBasis6 | 4719616 | (1 + NumBasis6)*4719616 |
| Hypernetwork7 | Dense | Linear | NumBasis7 | 590080 | (1 + NumBasis7)*590080 |
| Hypernetwork8 | Dense | Linear | NumBasis8 | 590080 | (1 + NumBasis8)*590080 |
| Hypernetwork9 | Dense | Linear | NumBasis9 | 1180160 | (1 + NumBasis9)*1180160 |
| Hypernetwork10 | Dense | Linear | NumBasis10 | 147584 | (1 + NumBasis10)*147584 |
| Hypernetwork11 | Dense | Linear | NumBasis11 | 147584 | (1 + NumBasis11)*147584 |
| Hypernetwork12 | Dense | Linear | NumBasis12 | 387 | (1 + NumBasis12)*387 |
| Hypernetwork13 | Dense | Linear | NumBasis13 | 1622720 | (1 + NumBasis13)*1622720 |
| Hypernetwork14 | Dense | Linear | NumBasis14 | 1115840 | (1 + NumBasis14)*1115840 |
| Hypernetwork15 | Dense | Linear | NumBasis15 | 557920 | (1 + NumBasis15)*557920 |
| Hypernetwork16 | Dense | Linear | NumBasis16 | 139568 | (1 + NumBasis16)*139568 |
| Hypernetwork17 | Dense | Linear | NumBasis17 | 45 | (1 + NumBasis17)*45 |

Figure 4C:
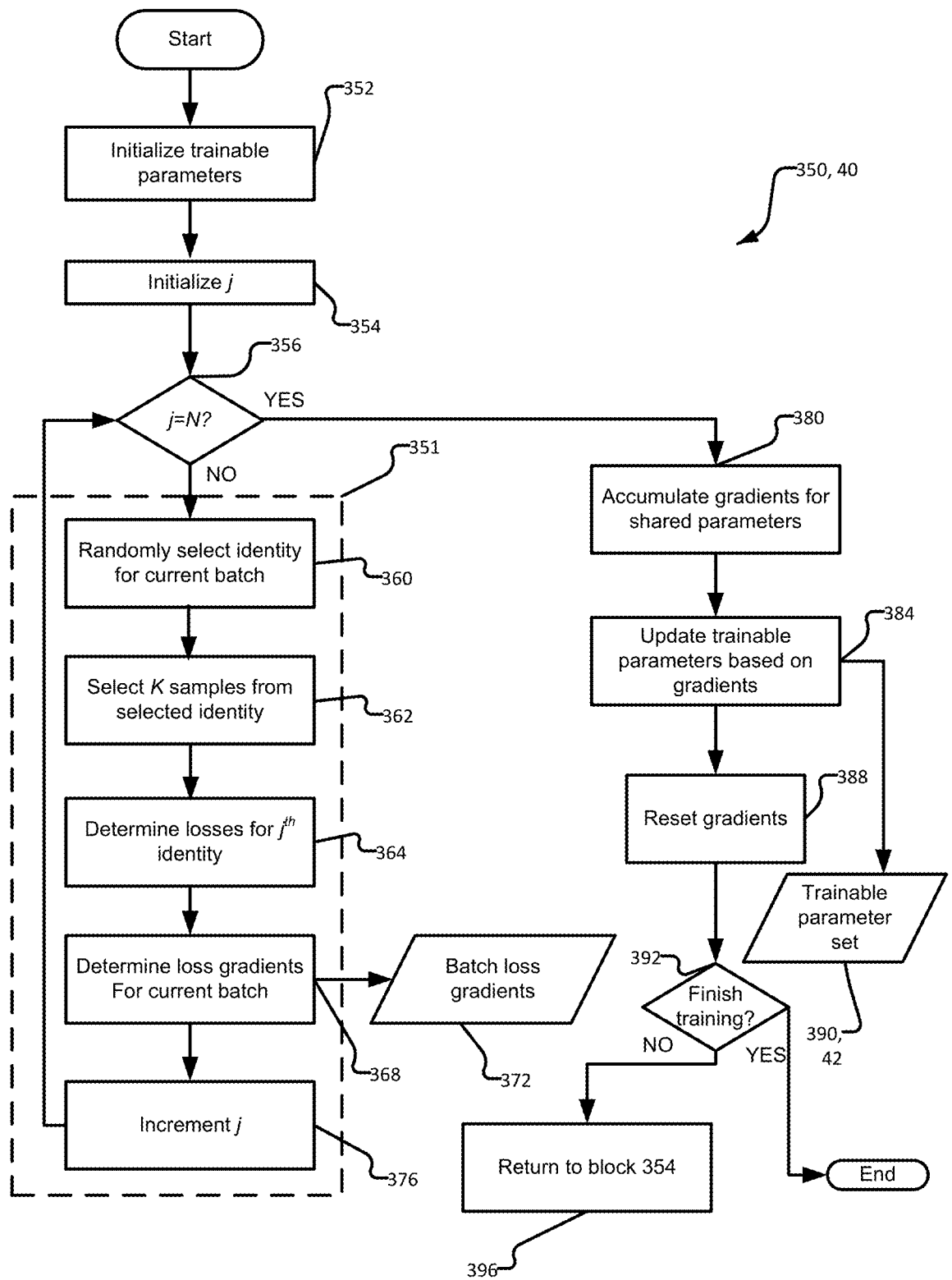
FIG. 4C is a schematic depiction of a method for training a face-morphing model that may be used to implement the face-morphing model network training for the FIG. 1A face morphing method having a plurality N of identities according to a particular embodiment.

FIG. 4C is a schematic depiction of a method 350 for training face-morphing model 42 that may be used to implement the block 40 face-morphing model network training for the FIG. 1A face morphing method 10 having a plurality N of identities according to a particular embodiment. Method 350 may be performed by processor 62 of system 60 (FIG. 1B). Method 350 may be implemented using the FIG. 4A training scheme 300.

Method 350 starts with the same inputs as discussed above in connection with scheme 300 shown in FIG. 4A. Specifically, the inputs to method 350 comprise: aligned training face images 120 and segmentation training masks 122 for each for each of the N identities. These inputs are not expressly shown in FIG. 4C to avoid over-cluttering the FIG. 4C illustration. The output of method 350 is a set of trainable face-morphing model parameters 390. As discussed above, the trainable parameters 390 of face-morphing model comprise the identity-specific parameters of ID Weights 340 for each identity j=1, 2, . . . N and the shared parameters of hypernetworks 338 (in hypernetwork 338(i) for each layer). More specifically, in the context of the discussion presented above, face-morphing model parameters 390 may comprise the shared layer-specific basis parameters $A_i$ and $\mu_i$ for the layers i=1, 2, . . . I of decoders 306, 308 (which are shared across the N identities) and the identity-specific and layer-other techniques (such as assigning some prescribed values) to face-morphing model trainable parameters 390. Method 350 then proceeds to block 354 which involves initializing a counter variable j. The counter variable j is used to perform N iterations of batch loop 351 (shown in dashed lines in FIG. 4C)—one iteration of batch loop 351 for each of the N identities. In the illustrated embodiment, the counter variable j is set to j=0 in block 352. Method 350 then proceeds to the inquiry of block 356. For each set of N successive iterations, the block 356 inquiry will be negative and method 350 performs an iteration of batch loop 351. After the $N^{th}$ iteration of batch loop 351, the block 356 inquiry will be positive and method 350 proceeds to block 380 which is described in more detail below.

Batch loop 351 starts in block 360 which involves selecting (e.g. randomly selecting) one of the N identities and the corresponding one of the N autoencoders 301 to work with for the remainder of batch loop 351. As alluded to above, batch loop 351 involves selecting a single identity and evaluating the loss for the corresponding autoencoder 301 (see FIG. 4A) in each batch. It will be appreciated from the description above and elsewhere herein that each identity-specific autoencoder 301 comprises: shared encoder 202 and shared decoder layers 204 (whose parameters are shared across all N identities and fixed during face-morphing model training method 350); and an identity-specific image decoder 306 and identity-specific mask decoder 308 (whose parameters are prescribed (dynamically defined) by the trainable face-morphing model parameters 390); and that the trainable face-morphing model parameters 390 comprise: per-layer basis and bias parameters of hypernetworks 338 (e.g. the elements of $A_i$ and $\mu_i$ described above), whose parameters are shared across all N identities; and layer-specific and identity-specific weights (e.g. the elements of $w_{ij}$ described above) also referred to as the identity-specific ID Weights 340, whose parameters are specific to each of the N identities. In some embodiments, the block 360 identity selection is structured such that N iterations of batch loop 351 will cover each of the N identities once in a random order. Method 350 then proceeds to block 362 which involves selecting (e.g. randomly selecting) a number K of samples from within the block 360 identity. For example, if the block 360 selected identity is identity #1, then block 362 may involve selecting K images (frames) from among the identity #1 aligned training face images 120-1 and K corresponding identity #1 segmentation training masks 122-1. The number K of samples processed in each batch loop 351 may be a pre-set or configurable (e.g. user-configurable) parameter of face-morphing model training method 350. In some embodiments, the number K of samples processed in each batch loop 351 may be in a range of 4-100 samples.

Method 350 then proceeds to block 364 which involves determining the losses (e.g. IL losses 326, ML losses 328, and optional RL losses 330) for the current autoencoder 301 (i.e. the autoencoder 301 corresponding to the identity selected in block 360 using face-morphing training scheme 300 (including the block 313A, 313B augmentations) shown in FIG. 4A, where the corresponding image decoder 306 and mask decoder 308 parameters are prescribed (dynamically defined) by the current values of the face-morphing model trainable parameters 390). The block 364 losses may be accumulated (e.g. added and/or averaged) across the K samples selected in block 362. That is, block 364 may comprise: computing a loss for each of the K samples; and then adding and/or averaging those per-sample losses to ascertain an accumulated loss for the current identity. As discussed above, in some embodiments, for each of the K samples (k=1, 2, ... K), the IL loss 326, $\mathcal{L}_{IL,k}$ comprises L1 norm (least absolute deviation) and SSIM (structural similarity index measure) terms, in which case the IL loss $\mathcal{L}_{IL,k}$ for the $k^{th}$ sample may have the form $$\mathcal{L}_{IL,k} = a\mathcal{L}_{IL,L1,k} + b\mathcal{L}_{IL,SSIM,k} \tag{6}$$

where $\mathcal{L}_{IL,L1,k}$ is the image loss L1 norm loss function for the $k^{th}$ sample for the current identity, $\mathcal{L}_{IL,SSIM,k}$ is the image loss SSIM loss function for the $k^{th}$ sample for the current identity and a, b are configurable (e.g. user configurable or preconfigured) weight parameters. In some embodiments, the SSIM loss function $\mathcal{L}_{IL,SSIM,k}$ may comprise those described in Wang et al. 2004 (cited above). In some embodiments, additional or alternative loss terms may be used as a part of IL loss 326 and or mask loss 328. By way of non-limiting example, such additional or alternative loss terms may include adversarial networks such as PatchGAN and/or the like, perceptual loss terms (also known as VGG loss terms) and/or other types of loss terms. In some embodiments, different loss terms may additionally or alternatively be used for one or more different iterations of method 350.

To encourage the trainable parameters to focus on the face, both first order augmented face image 317-j ($x_{j,k}$) and the reconstructed image 320 ($\tilde{x}_{j,k}$) from the $k^{th}$ sample from the identity j used in the block 364 IL loss evaluation are masked by the corresponding augmented segmentation mask 215-j ($m_{x_{j,k}}$) using element-wise multiplication for each image channel (e.g. red (R), green (G), blue (B) values for each pixel). The reconstructed image 320-j ($\tilde{x}_{j,k}$) is computed with shared encoder 202 and the image decoder 306-j from the same ($j^{th}$) identity according to $\tilde{x}_{j,k}=\text{ImageDec}_{j,k}(\text{Enc}(\hat{x}_{j,k}))$, where $\hat{x}_{j,k}$ is the second order augmented face image 319-j and where the parameters of the image decoder 306-j for the $i^{th}$ identity are prescribed (dynamically defined) by current values of the corresponding face-morphing model parameters 390 corresponding to the $j^{th}$ identity (i.e. the current values of ID Weights 340-j for the $j^{th}$ identity and the current values of hypernetworks 338). For example, referring to FIG. 4A, for the $j^{th}$ identity, the IL loss function may comprise IL function evaluation 326-j, the reconstructed image ($\tilde{x}_{j,k}$) may comprise pixels from reconstructed face 320-j for the $k^{th}$ sample (as reconstructed from the second order augmented face image 319-j ($\hat{x}_{j,k}$), the ground truth image ($x_{j,k}$) may comprise pixel values from first order augmented face image 317-j for the $k^{th}$ sample and mask value ($m_{x_{j,k}}$) may come from augmented segmentation mask 215-j for the $k^{th}$ sample.

As discussed above, in some embodiments, for each of the K samples (k=1, 2, ... K), the ML loss 328, $\mathcal{L}_{ML,k}$ comprises L1 norm (least absolute deviation) and SSIM (structural similarity index measure) terms, in which case the ML loss $\mathcal{L}_{ML,k}$ for the $k^{th}$ sample may have the form $$\mathcal{L}_{ML,k} = c\mathcal{L}_{ML,L1,k} + d\mathcal{L}_{ML,SSIM,k} \tag{7}$$

where $\mathcal{L}_{ML,L1,k}$ is the mask loss L1 norm loss function for the $k^{th}$ sample for the current identity, $\mathcal{L}_{ML,SSIM,k}$ is the mask loss SSIM loss function for the $k^{th}$ sample for the current identity and c, d are configurable (e.g. user configurable or preconfigured) weight parameters. In some embodiments, the parameter d=0. The reconstructed mask 322-j ($\tilde{m}_{j,k}$) is computed with shared encoder 202 and the mask decoder 308-j from the same ($j^{th}$) identity according to $\tilde{m}_{j,k}=\text{MaskDec}_{j,k}(\text{Enc}(\hat{x}_{j,k}))$ where $\hat{x}_{j,k}$ is the second order augmented face image 319-j and where the parameters of the mask decoder 308-j for the $i^{th}$ identity are prescribed (dynamically defined) by current values of the corresponding face-morphing model parameters 390 corresponding to the $i^{th}$ identity (i.e. the current values of ID Weights 340-j for the $j^{th}$ identity and the current values of hypernetworks 338). For example, referring to FIG. 4A, for the $i^{th}$ identity, the ML loss function may comprise ML function evaluation 328-j, the reconstructed mask ($\tilde{m}_{j,k}$) may comprise pixels from reconstructed mask 322-j for the $k^{th}$ sample (as reconstructed from the second order augmented face image 319-j ($\hat{x}_{j,k}$), the ground truth mask ($m_{j,k}$) may comprise pixel values from augmented segmentation mask 315-j for the $k^{th}$ sample.

In some embodiments, for each of the K samples (k=1, 2, ... K), the RL loss 330, $\mathcal{L}_{RL,k}(i)$ comprises a L1 norm (least absolute deviation) term for each of the i=1, 2, ... I basis matrices $A_i$ for each of the hypernetworks 338(i), in which case the RL loss $\mathcal{L}_{RL}(i)$ for the $i^{th}$ basis matrix $A_i$ of the $i^{th}$ hypernetwork 338($i$) may have the form $$\mathcal{L}_{RL}(i) = e\mathcal{L}_{RL,L1}(i) \tag{7A}$$

where $\mathcal{L}_{RL,L1}(i)$ is the realization loss L1 norm loss function evaluation for the $i^{th}$ basis matrix $A_i$ of the $i^{th}$ hypernetwork 338($i$), and e is a configurable (e.g. user configurable or preconfigured) weight parameter.

After the image loss $\mathcal{L}_{IL,k}$ is determined for each of the K samples (k=1, 2, . . . K) for the current identity, the total image loss LIL for the current identity may be determined by accumulating (e.g. adding and/or averaging) the image losses $\mathcal{L}_{IL,k}$ over the K samples to determine the total image loss $\mathcal{L}_{IL}$ for the current identity. Both the L1 norm term $\mathcal{L}_{IL,L1,k}$ and the SSIM term $\mathcal{L}_{IL,SSIM,k}$ can be aggregated and/or averaged over the K samples. Similarly, after the mask loss $\mathcal{L}_{ML,k}$ is determined for each of the K samples (k=1, 2, . . . K) for the current identity, the total mask loss $\mathcal{L}_{ML}$ for the current identity may be determined by accumulating (e.g. adding and/or averaging) the mask losses $\mathcal{L}_{ML,k}$ over the K samples to determine the total mask loss $\mathcal{L}_{ML}$ for the current identity. Both the L1 norm term $\mathcal{L}_{ML,L1,k}$ and the SSIM term $\mathcal{L}_{ML,SSIM,k}$ can be aggregated and/or averaged over the K samples. Determination of the total image loss $\mathcal{L}_{IL}$ and total mask loss $\mathcal{L}_{ML}$ for the current identity and the total regularization loss $\mathcal{L}_{RL}(i)$ for each of the I basis matrices $A_i$ of the I hypernetworks 338($i$) for the current identity concludes block 264 of method 250.

Method 350 then proceeds to block 368 which involves determining loss gradients (referred to herein as batch loss gradients 372) for the current identity (i.e. the current iteration of batch loop 351). Determining batch loss gradients 372 in block 368 comprises computing partial derivatives of the block 364 ML, IL and RL losses for the current identity with respect to each of the trainable parameters 390 of face-morphing model 42 and may comprise the use of a suitable back-propagation algorithm. Batch loss gradients 372 may be determined in block 368 for each of the trainable parameters 390 of the current identity. It will be appreciated that batch loss gradients 372 comprise loss gradients for both: the trainable parameters of hypernetworks 338 shared between identities (e.g. the layer-specific parameters of the matrix $A_i$ and the vector $\mu_i$ for the layers i=1, 2, . . . I for decoders 306, 308); and the identity-specific trainable parameters of ID Weights 338 that are specific to the current identity (e.g. the identity-specific and layer-specific weights $w_{ij}$ for the ==1, 2, . . . I layers of decoders 306, 308 and the current ($j^{th}$) identity). Batch loss gradients 372 may be stored as part of block 368 for later accumulation.

Once batch loss gradients 372 are determined and accumulated in block 368, method proceeds to block 376 which involves incrementing the counter j before returning to block 356. Method continues to iterate through batch loop 351 for each of the N identities. As discussed above, block 360 may be structured such that every consecutive N iterations of batch loop 351 will cover each of the N identities once in a random order. The output of each iteration of batch loop 351 is a set of batch loss gradients 372.

When the counter j reaches j=N, then the block 356 inquiry will be positive, in which case method 350 proceeds to block 380 which involves accumulating (e.g. adding and/or averaging) batch loss gradients 372 for the shared trainable face-morphing model parameters 390) across the N identities. As discussed in relation to the FIG. 4A training scheme 300, the shared trainable parameters 390 may comprise the parameters of hypernetworks 338 (e.g. the layer-specific parameters of the matrix $A_i$ and the vector $\mu_i$ for the layers i=1, 2, . . . I for decoders 306, 308). It will be observed that each iteration of batch loop 351 will produce a corresponding set of batch loss gradients 372 for the shared trainable face-morphing model parameters 390 (parameters of hypernetworks 338) and a corresponding set of identity-specific batch loss gradients 372 for identity-specific trainable face-morphing model parameters 390 (ID Weights 340). It is batch loss gradients 372 for the shared face-morphing model parameters 390 (parameters of hypernetworks 338) that are accumulated (e.g. added and/or averaged) in block 380.

Method 350 then proceeds to block 384 which involves using the gradients (the identity-specific batch loss gradients 372 determined in each iteration of block 368 and the shared gradients 372 accumulated in block 380) together with a learning rate (which is a pre-set or configurable (e.g. user-configurable) parameter of face-morphing training method 350) to update the trainable face-morphing model parameters 390, thereby obtaining updated trainable face-morphing model parameters 390. For a given parameter p, the block 384 gradient update may comprise implementing functionality of the form:

$$p_{new} = p_{old} - \alpha \frac{\partial J}{\partial W} \tag{8}$$

where $p_{new}$ is the updated parameter value, $p_{old}$ is the existing parameter value prior to block 384, $\alpha$ is the learning rate and $\partial j/\partial w$ is the applicable gradient for the parameter $\rho$. In some embodiments, block 384 may involve use of a suitable optimization algorithm together with its meta-parameters to update trainable face-morphing model parameters 390. One non-limiting example of such an optimization algorithm is the so-called Adam optimization technique, with its meta-parameters described, for example, in Kingma et al. 2014a (cited above). In some embodiments, the meta-parameters of this Adam optimization technique may comprise $\beta_1=0.5$, $\beta_2=0.999$ and learning rate of $\alpha=5e^{-5}$.

After determining updated face-morphing model parameters 390, method 350 proceeds to block 388 which involves resetting all gradients to zero in preparation for another iteration of method 350. Method 350 then proceeds to block 392 which involves an inquiry into whether the training is finished. There are many different loop-exit conditions that could be used to make the block 392 evaluation. Such loop-exit conditions may be user-specified or may be pre-configured. Such loop-exit conditions include, by way of non-limiting example, a number of iterations of branch loop 351, a number of iterations of the main method 350 loop, one or more threshold loss amounts, one or more threshold gradient amounts, one or more threshold changes in trainable parameters 390, user intervention and/or the like. If the block 392 evaluation is negative, then method 350 proceeds to block 396, where method 350 loops back to block 354 and repeats the whole method 350 (FIG. 4C) process again. This process of iterating from blocks 354 through to block 392 continues until the block 392 loop-exit evaluation is positive and method 350 ends.

In some embodiments, the inventors have used a number of iterations of batch loop 351 in a range of $10^5$N-$10^6$N as the loop exit condition for block 392.

Method 350 shown in the illustrated embodiment of FIG. 4C involves separating the training process into batches of a single identity and evaluating the losses for each such batch/identity. Those skilled in the art will appreciate that the separation of method 350 into batches is optional and that the particular order of implementation of some method steps and some procedural loops of method 350 can be varied while maintaining the training objectives of method 350. Such procedural variations should be considered to be within the contemplation of this disclosure.

Returning now to FIG. 1A, training portion 10A of method 10 concludes after the block 40 training of face-morphing model 42. Trained face-morphing model 42 (including the shared encoders 202 and optional one or more shared decoder layers 204 of face-swapping model 32) may be used to perform the inference portion 10B of method 10. Inference portion 10B of method 10 receives as input a set of interpolation parameters 74 and a prepared input image 76 comprising a face of one of the N identities. As will be explained in more detail below, inference portion 10B outputs an inferred output image 62. Input image 76 is used by inference portion 10B to specify which head pose, facial expression lighting and eye gaze that will be present in inferred output image 62. Inferred output image 62 may comprise a blend of any one or more the N identities. The various inputs (interpolation parameters 74 and input image 76) of inference portion 10B may be provided for each frame (image) of video data and the various steps (blocks 50, 60 and optional block 77) of inference portion 10B may be performed for each frame (image) of video data to provide corresponding video frames of inferred blended output images 62.

Prepared input image 76 may comprise an image of any one of the N identities. While not expressly shown in FIG. 1A, it is assumed that prepared input image 76 is prepared in a procedure analogous to that of block 20 or method 100 (e.g. block 102 of FIG. 2 and/or a portion thereof) described above to generate a corresponding aligned face image and that prepared input image 76 is an aligned face image analogous to aligned face images 120 described above. It should be noted, however, that there is no restriction on prepared input image 76 to be part of training images 12—that is, prepared input image 76 can be obtained from a performance of an actor or a rendering of a CG character that is separate from the performance or rendering used to obtain training images 12 or aligned training images 120.

Input interpolation parameters 74 may prescribe how much weight should be used for each of the N identities and for each of the I layers when blending or morphing the N trained entities to provide the inferred output image 62. Specifically, input interpolation parameters 74 are used in block 50 to construct a blended image decoder 52A and a blended mask decoder 52B, where blended image and mask decoders 52A, 52B have the same architecture as image decoders 206, 306 and mask decoders 208, 308 described above, but comprises a blended combination of characteristics from the N trained identities. In some embodiments, the parameters of the $i^{th}$ layer of the blended image decoder 52A or mask decoder 52B may be defined by the vector $L_i^*$, where $L_i^*$ has dimensionality $q_i$ and may be constructed according to:

$$L_i^* = w_i^* A_i + \mu_i \qquad (9)$$

where: $A_i$ and $\mu_i$ have the meanings described above (i.e. the parameters of the shared hypernetwork 338($i$) for the $i^{th}$ layer); and where $w_i^*$ is a vector comprising an interpolated set of $m_i$ weights for the $i^{th}$ layer of the blended image decoder 52A or mask decoder 52B. In some embodiments, the vector $w_i^*$ may have the form:

$$w_i^* = \sum_{j=1}^{N} \alpha_{ij} w_{ij} \qquad (10)$$

where: $w_{ij}$ has the meaning described above (i.e. a vector of length $m_i$ which includes the trained face-morphing model weights for the $i^{th}$ layer and the $j^{th}$ identity); and $\alpha_{ij}$ are the input interpolation parameters 74, which ascribe a weight for the $i^{th}$ layer and the $j^{th}$ identity (i.e. how much influence the $j^{th}$ identity should have on the $i^{th}$ layer of blended image decoder 52A or mask decoder 52B). The interpolation parameters 74 ($\alpha_{ij}$) may be specified directly or indirectly by user input, although this is not necessary. In some embodiments, interpolation parameters 74 ($\alpha_{ij}$) are normalized, such that $\Sigma_{j=1}^{N} \alpha_{ij} = 1$, but this is not necessary. In some embodiments (described in more detail below), interpolation parameters 74 ($\alpha_{ij}$) may be specified (e.g. through a user interface) which may convert some other form of input blending parameters 70 in block 72. It will be appreciated that a blended image decoder 52A and/or mask decoder 52B may be constructed using equations (9) and (10) based on input interpolation parameters 74 ($\alpha_{ij}$) and the parameters of trained face-morphing model 42.

After constructing blended decoders 52A, 52B in block 50, inference portion 10B of method 10 proceeds to block 60 which uses blended decoders 52A, 52B along with the shared portions of face-swapping model 32 (e.g. shared encoder 202 and decoder layers 204) to infer an inferred blended face image 73A and an inferred blended mask 73B. This block 60 process is shown schematically in FIG. 5A. Method 60 may be performed by processor 82 of system 80 (FIG. 1B). The inferred blended face image 73A and an inferred blended mask 73B output from the block 60 (FIG. 5A) inference process is an inferred blended face image 62 which are blends of (or morphs between) any two or more of the N training identities as specified by the interpolation parameters 74 ($\alpha_{ij}$) and the trainable face-morphing model parameters (identity-specific ID Weights 340 and shared hypernetworks 338).

Figure 5A:
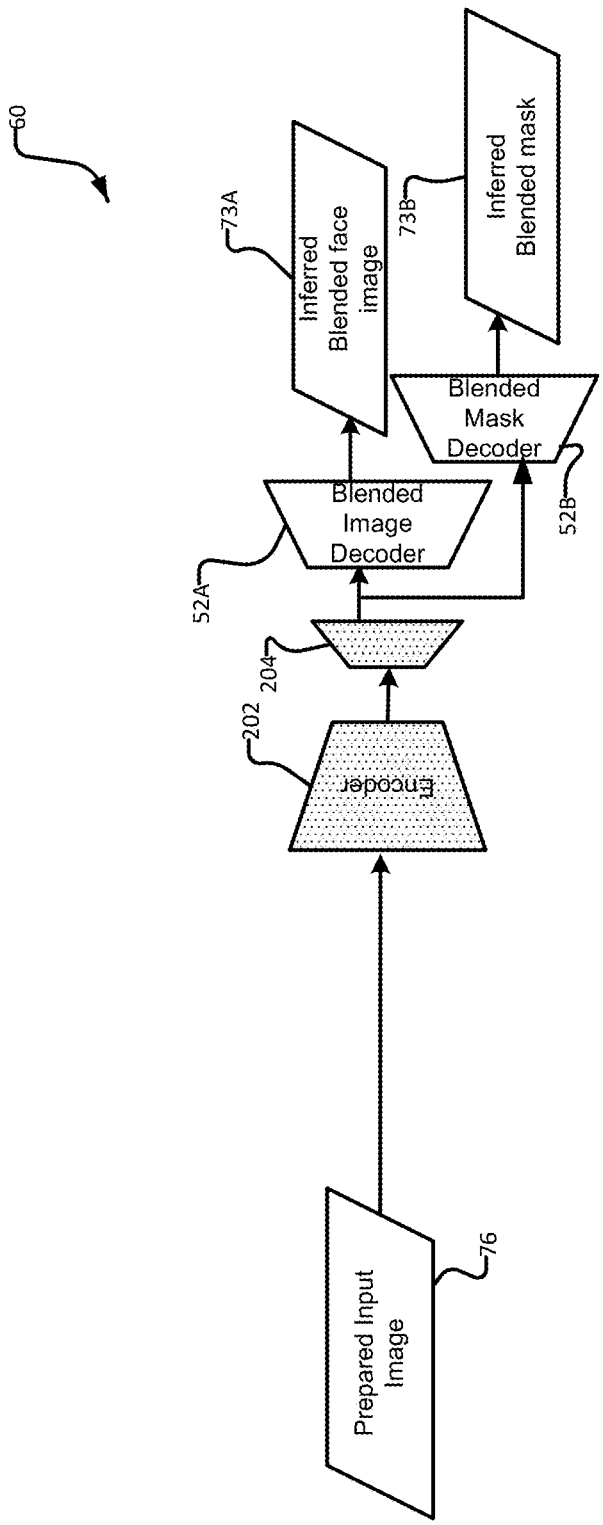
FIG. 5A is a schematic depiction of the FIG. 1A mask/image inference process according to a particular embodiment.

Method 60 shown in FIG. 5A starts with prepared input image 76, shared encoder 202, one or more optional shared decoder layers 204 and the blended image and mask decoders 52A, 52B output from block 50 (FIG. 1A). Together, shared encoder 202, one or more shared decoder layers 204 and blended image and mask decoders 52A, 52B are used to infer an inferred blended face image 73A and an inferred blended face mask 73B. Inferred blended face image 73A and inferred blended face mask 73B are inferred using the blended image and mask decoders 52A, 52B and, consequently, do not to represent any one of the N training identities, but are instead a blend of any two or more of the N training identities as specified by the interpolation parameters 74 ($\alpha_{ij}$) and the trainable face-morphing model parameters (identity-specific ID Weights 340 and shared hypernetworks 338).

Returning to FIG. 1A, in some embodiments, method 10 concludes with the output of inferred blended face image 73A and an inferred blended face mask 73B (block 60). The block 60 inferred blended face image 73A and an inferred blended face mask 73B may be output to off-the-shelf image compositor software and used to construct an inferred output image 62. Compositing an inferred output image 62 is an optional aspect of method 10 (FIG. 1A) that may be performed in optional block 77.

Figure 5B:
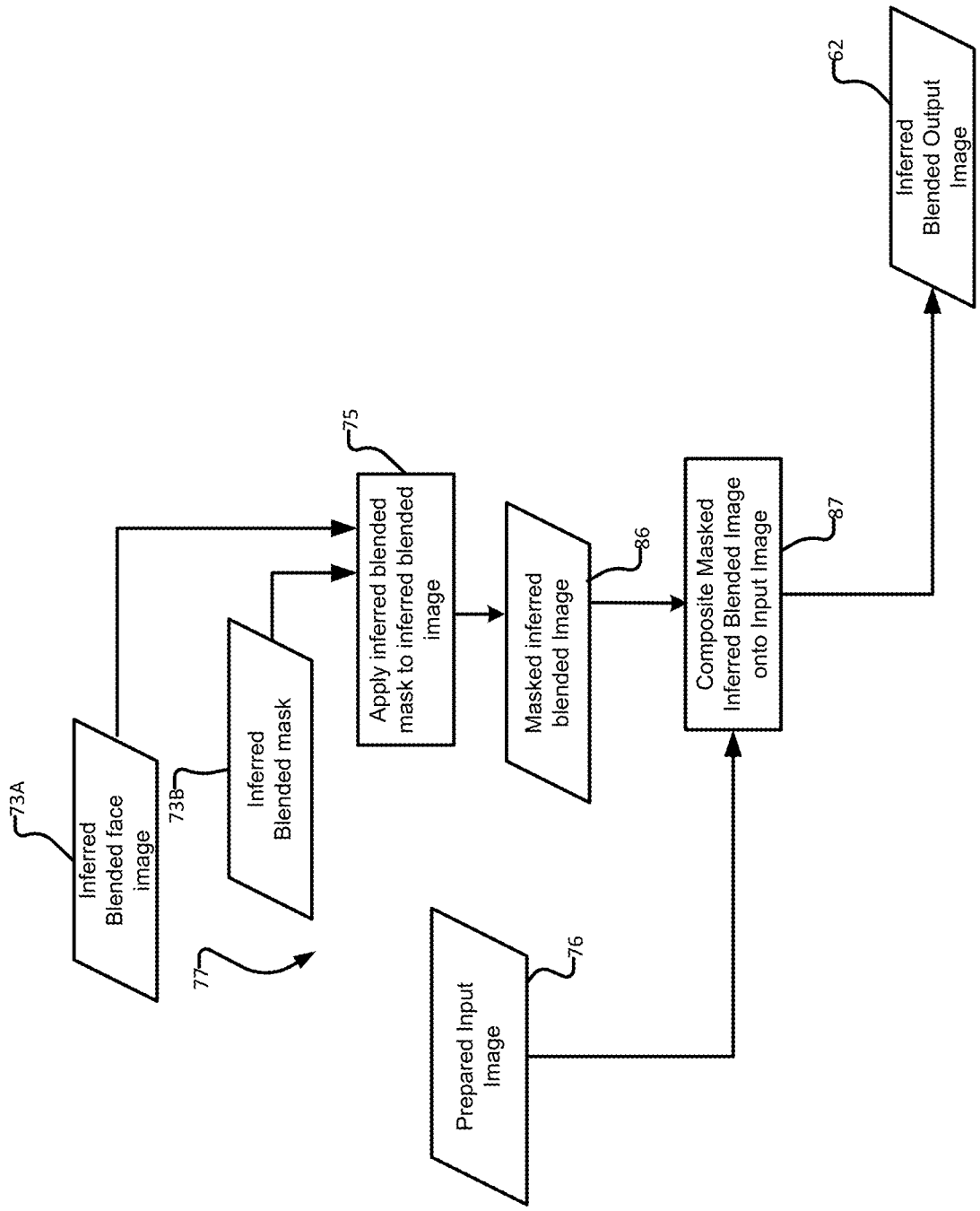
FIG. 5B is a schematic depiction of the FIG. 1A image compositing process according a particular embodiment.

After inferring of inferred blended face image 73A and inferred blended face mask 73B, method 10 may proceed to optional block 77. A non-limiting example embodiment of optional block 77 is illustrated in FIG. 5B. Method 77 of FIG. 5B may be performed by processor 82 of system 80 (FIG. 1B). Method 77 starts in block 75 which involves applying inferred blended mask 73B to inferred blended face image 73A to obtain masked inferred blended image 86. Specifically, the pixels of inferred blended face image 73A may be multiplied by the pixel values of inferred blended mask 73B using element-wise multiplication for each image channel (e.g. red (R), green (G), blue (B) values for each pixel).

The output of the block 75 masking process is masked inferred blended image 86. Masked inferred blended image 86 may then be provided to an image compositor in block 87 which composites masked inferred blended image 86 onto prepared input image 76 to generate inferred blended output image 62. The block 87 image composition may use any of a number of known image compositors or image composition techniques to composite masked inferred blended image 86 onto prepared input image 76 by blending and/or replacing the pixel values of prepared input image 76 with those of masked inferred blended image 86. Non-limiting examples of such image compositing software include Nuke™ produced by Foundry (www.foundry.com) and Flame™ produced by Autodesk (www.autodesk.com). In some embodiments, method 77 may comprise further processing of inferred blended output image 62 (not shown) to undo any "preparation" procedures performed to obtain prepared input image 76 from a native image. For example, as discussed above, prepared input image 76 may be output from an alignment process similar to that of method 100 (e.g. block 102 or portions thereof)—see FIG. 2. In some such embodiments, inferred blended output image 62 may be subject to further processing wherein the alignment procedures used to prepare prepared input image 76 may be undone. Such further processing may involve the application of inverse affine transformations used to prepare prepared input image 76.

In experimenting with face morphing method 10, the inventors have determined that groups of decoder layers may be relatively more closely aligned to (or contribute in a relatively greater amount to) some categories of observable facial features when compared to other decoder layers. In some embodiments, the inventors have classified a plurality (e.g. three) categories of observable facial features which are relatively understandable to artists: shape, texture and skin tone. Each of these observable categories of facial features may be associated with a corresponding group of one or more (typically, a plurality) of layers of image and mask decoders 306, 308 (see FIG. 4A) with parameters prescribed (dynamically defined) by corresponding parameters of face-morphing model 42, based on such associated layers contributing in a greater amount to their corresponding feature category. For example, where the number of decoder layers is I=7, then it may be the case that layers i=1, 2 and 3 contribute most to facial shape (and thus may be assigned to the observable shape category), layers i=4 and 5 contribute most to facial texture (and thus may be assigned to the observable texture category) and i=6 and 7 contribute most to facial skin tone (and thus may be assigned to the observable skin tone category). In some embodiments, a decoder layer is assigned to only one category of observable facial features, but this is not necessary and, in some embodiments, a single decoder layer may be assigned to more than one category of observable facial features.

Figure 6:
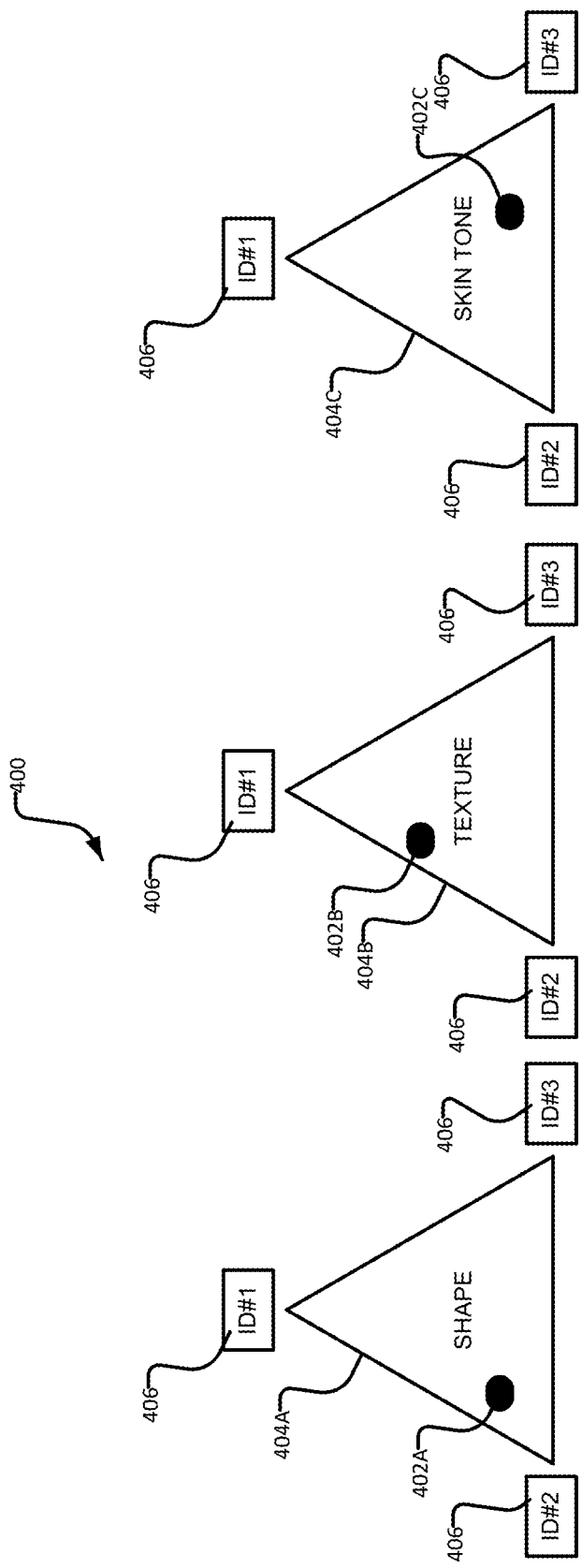
FIG. 6 is a schematic depiction of a portion user interface that may be used by an artist to interact with the FIG. 1A method which permits blending of images between 3 identities according to a particular embodiment.

FIG. 6 is a schematic depiction of a portion user interface 400 that may be used by an artist to interact with method 100 for blending between 3 identities according to a particular embodiment. Note that the number of identities that may be chosen for user interface 400 (3 in the case of the illustrated FIG. 6 embodiment) is not necessarily the same as the number N of identities for which face-swapping model 32 and face-morphing model 42 are trained. In general, the number of entities which may be blended may be any number up to N. User interface 400 provides a graphical slider (or other form of pointer) 402A, 402B, 402C (collectively sliders 402) for each of three observable facial features (shape, texture and skin tone). In the illustrated embodiment, each of sliders 402A, 402B, 402C is moveable within a corresponding region 404A, 404B, 404C (collectively, regions 404), which may be triangles in the case of 3 identities. Icons or other graphical indicia 406 corresponding to each of the identities may be spaced apart around regions 404, such that a user (artist) may move a slider 402 within a corresponding region 404 and the location of the slider 402 in the region 404 (e.g. the proximity of the slider to the icons 406 of each identity) will determine the amount that each identity contributes to the corresponding observable facial feature.

So, in the case of the FIG. 6 illustration, slider 402A (for the shape category) is relatively close to the icon 406 corresponding to ID #2 and relatively far from the icons 406 corresponding to ID #1 and ID #3. Consequently, ID #1 should dominate the blending for the shape category. Similarly, for the case of the FIG. 6 illustration, slider 402B is relatively close to the icons 406 for both ID #1 and ID #2 and relatively distal from the icon 406 corresponding to ID #3 and, consequently, ID #1 and ID #2 should share the dominance for blending in the texture category while ID #3 should have a relatively low representation in the texture category.

For each observable facial feature category (e.g. shape, texture and skin tone), the amount of blending from each identity may be related to the proximity of the corresponding slider 402 to the corresponding identity icon 406. In the specific case of 3 identities, the proximity of each slider 402 to each corresponding identity icon 406 may be specified, for example, by barycentric coordinates. That is, user interface 400 may output a set of barycentric coordinates for each observable facial feature category and those barycentric coordinates may correspondingly specify how much influence each identity should have on the blending for the corresponding observable facial feature category. These outputs from user interface 400 may be referred to as input blending parameters 70 (see FIG. 1A). In other embodiments, which may have different numbers of identities, other parameterizations may be used to generate input blending parameters 70. For example, icons 406 corresponding to any subset of the N training identities may be spaced apart evenly (e.g. at even angular intervals) around a circular region 404 and the distance of a slider 402 to the corresponding may be used to provide input blending parameters 70.

Returning now to FIG. 1, method 10 may optionally comprise receiving input blending parameters 70. Input blending parameters 70 may be received, for example, from a user interface of the type shown in FIG. 6. Input blending parameters 70 may comprise a set of M blending parameters for each of a set of C observable facial feature categories. So, for the case of the FIG. 6 example, where the number M of identities for which blending may occur in the user interface 400 is M=3 and the number C of observable facial feature categories is C=3 (shape, texture, skin tone), there are 3 blending parameters 70 for each of shape, texture and skin tone, which specify how much influence each identity should have on shape, texture and skin tone respectively. For example, blending parameters may have the form: $\beta_{shape,j}$, $\beta_{texture,j}$, $\beta_{skin\ tone,j}$ for j=1, ... M, where $\beta_{shape,j}$ is the weight of the $j^{th}$ identity on the shape category, $\beta_{texture,j}$ is the weight of the $j^{th}$ identity on the texture category and $\beta_{skin\ tone,j}$ is the weight of the $j^{th}$ identity on the skin tone category.

Where method 10 receives blending parameters 70, method 10 comprises block 72 which involves converting blending parameters 70 into interpolation parameters 74 (e.g. interpolation parameters $\alpha^{ij}$ as discussed above). Block 72 may make use of the relationship between the observable facial feature categories and corresponding decoder layers. As discussed above, each observable facial feature category (e.g. shape, texture and skin tone) is associated with a group of one or more decoder layers. In some embodiments, block 72 may involve assigning interpolation parameters ij for each layer i based on this association (between layers and observable facial feature categories) together with the input blending parameters 70. For example, continuing with the above example where the input blending parameters 70 have the form $\beta_{shape,j}$, $\beta_{texture,j}$, $\beta_{skin\ tone,j}$ for j=1, ... M, then block 72 may involve assigning interpolation parameters $\alpha_{ij}$ according to:

$$\alpha_{ij} = \begin{cases} \beta_{shape,j} & \text{for } i \text{ associated with shape category} \\ \beta_{texture,j} & \text{for } i \text{ associated with texture category} \\ \beta_{skin\ tone,j} & \text{for } i \text{ associated with skin tone category} \end{cases} \quad (11)$$

Figures 7A, 7B, 7C, 7D:
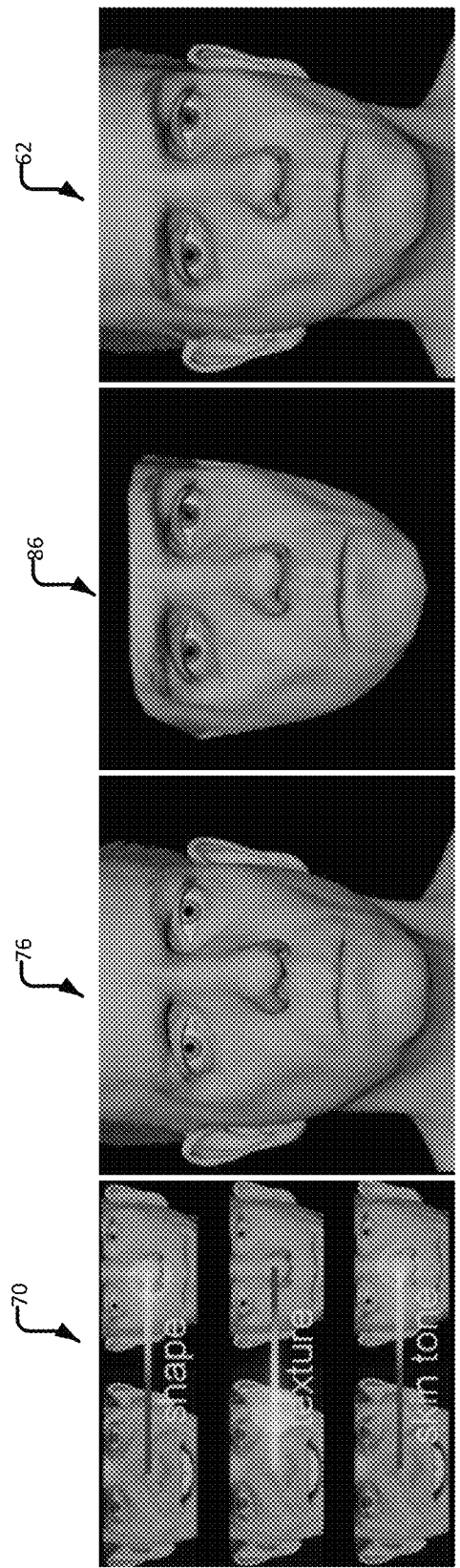
FIGS. 7A-7D (collectively, FIG. 7) shows some experimental results obtained by the inventors for the case N=2, where the identity #1 is an actor and identity #2 is a CG character constructed in the likeness of the actor.
Figures 10A, 10B, 10C, 10D, 10E:
FIGS. 10A-10E (collectively, FIG. 10) show experimental results obtained in different light conditions for an application of a person aging (N=2 with identity #1 being an actor and identity #2 being an older actor).

FIGS. 7A-7D (collectively, FIG. 7) shows some experimental results obtained by the inventors for the case N=2, where the identity #1 is an actor and identity #2 is a CG character constructed in the likeness of the actor. Specifically, FIG. 7A shows the input blending parameters 70 with the shape category assigned 100% to identity #2 (the CG character), the texture category assigned 72% to identity #1 (the actor) and 28% to identity #2, and the skin tone category assigned 100% to identity #2. FIG. 7B shows prepared input image 76, FIG. 7C shows masked inferred blended face 86 after application of inferred blended mask 73B to inferred blended face image 73A in block 75 (see FIG. 5) and FIG. 7D shows inferred blended output image 62 wherein masked inferred blended image 86 is composited over prepared input image 76 (see block 87 of FIG. 5).

FIGS. 8A-8D (collectively FIG. 8) show experimental results obtained by the inventors for the case N=2, where the identity #1 is an actor and identity #2 is a CG character constructed in the likeness of the actor, where each of FIGS. 8A, 8B, 8C and 8D show different poses and inferred blended images 73A for different blending parameters 70 (and interpolation parameters 74 ($\alpha_{ij}$)) in each column, with rightward columns being more heavily weighted to the identity #1 (actor) and leftward columns being more heavily weighted to the identity #2 (CG character).

FIGS. 9A-9C (collectively, FIG. 9) show experimental results obtained by the inventors for the case blending between 3 identities, where each identity is a different actor. Note that for the results shown in FIG. 9, there were N=3 training identities, but only 3 identities were used for the blending. Each of FIGS. 9A, 9B and 9C shows a user interface similar to that of user interface 400 (FIG. 6) with a slider 402 positioned between each of N=3 identities for the observable facial feature categories of shape, texture and skin tone. FIG. 9A shows input image 76A and a corresponding inferred blended output image 62A which exhibits aging by blending the input image identity with an older identity. FIG. 9B shows input image 76B and a corresponding inferred blended output image 62B which exhibits a change in ethnicity by blending the input image identity with an identity of a different ethnicity. FIG. 9C shows input image 76C and a corresponding blended output image 62C which exhibits a change in gender by blending the input image identity with an identity of a different gender.

FIGS. 10A-10E (collectively, FIG. 10) show experimental results for training data where all of the training images for different identities were obtained in different light conditions for an application of a person aging (N=2 with identity #1 being an actor and identity #2 being an older actor). Each of FIGS. 10A-10E shows a different input image 76, a corresponding masked inferred blended image 86 (i.e. inferred blended face image 73A after application of inferred blended mask 73B in block 75 (see FIG. 5)) and a corresponding inferred blended output image 62. FIG. 10 shows that face morphing method 10 is robust to variations in lighting.

Referring back to FIG. 1A, in some embodiments, training a separate face-swapping model 32 (i.e. block 30) is not required and method 10 of FIG. 1A can be modified by eliminating block 30 and the corresponding trained face-swapping model 32. In such embodiments, the face-morphing training (block 40—FIG. 1A), face-morphing training scheme 300 (FIG. 4A) and face-morphing training method 350 (FIG. 4C) can be modified to permit training of the parameters of shared encoders 202 and optional one or more shared decoder layers 204 (see FIG. 4A). That is, the parameters of shared encoders 202 and optional shared decoder layers 204 may be added to the trainable parameter set 390 in the face-morphing training method 350 of FIG. 4C. In such embodiments, because the trainable parameters of shared encoders 202 and optional shared decoder layers 204 are shared between identities, they are treated in face-morphing training method 350 like the other trainable parameters (e.g. hypernetworks 338—parameters $A_i$ and $\mu_i$ for i=1, 2 ... I). That is, the gradients corresponding to the trainable parameters of shared encoders 202 and optional shared decoder layers 204 are stored in each iteration batch loop 351 (in block 368, as batch loss gradients 372) and accumulated in block 380 after batch loop 351 is performed for N identities.

Figure 11:
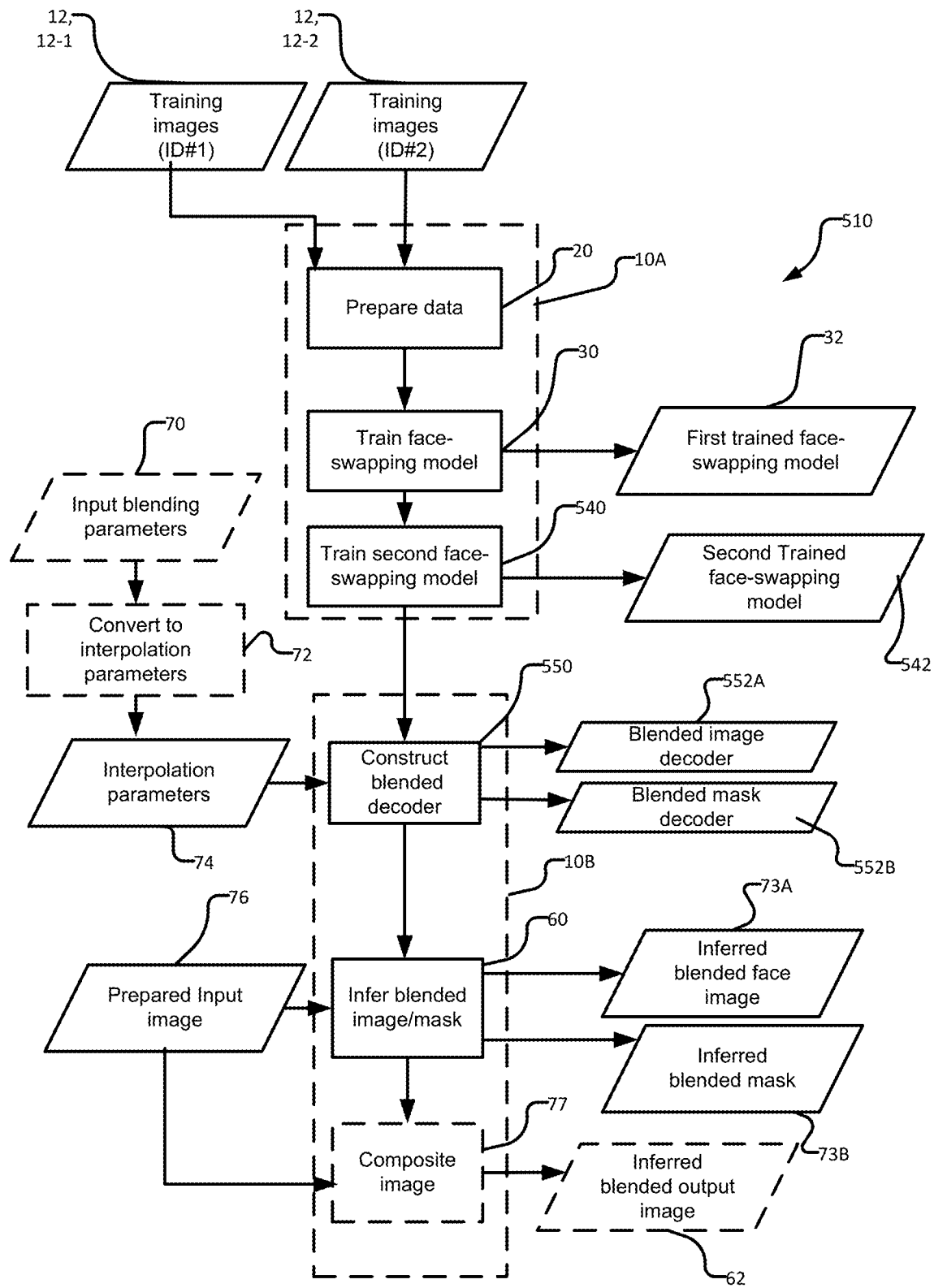
FIG. 11 is a schematic depiction of a method for neural face morphing between N=2 identities according to a particular embodiment.

The inventors have determined experimentally that for the case of N=2 (i.e. morphing between 2 identities), the general method of FIG. 1A can be simplified to some extent. FIG. 11 is a schematic depiction a method 510 for neural face morphing between N=2 identities according to a particular embodiment. In many respects, method 510 is similar to method 10 (FIG. 1A) described above and similar steps are shown using the same reference or similar reference numerals. As explained in more detail below, method 510 differs from method 10 primarily in that rather than training a comprehensive face-morphing model (block 40 and model 42 of the FIG. 1A method 10), method 510 involves training a second face-swapping model 542 in block 540 and positing that the decoders of the first and second trained face-swapping models 32, 542 are sufficiently close to one another in weight-space, that blended image decoder 552A and blended mask decoder 552B may be constructed by interpolating between the weights of the two face-swapping models 31, 542. In this sense, the first and second face-swapping models 32, 542 and the procedures for training the first and second face-swapping models (blocks 30 and 540) of the FIG. 11 embodiment may respectively be considered to be a face-morphing model and a procedure for training a face-morphing model for the case where N=2.

Method 510 starts with N=2 sets of training images 12-1 and 12-2. Blocks 20 and 30 of method 510 are substantially similar to blocks 20 and 30 of method 10 (FIG. 1A) described above. The block 20 data preparation may be performed in accordance with method 100 (FIG. 2) to generate aligned training images 120-1, 120-2 and segmentation training masks 122-1, 122-2 for the N=2 identities. Similarly, the training of the first face-swapping model 32 in block 30 may be performed in accordance with training scheme 200 (FIGS. 3A, 3B) and training method 250 (FIG. 3C) and results in: encoder 202 and one or more optional decoder layers 204 which are shared between the N=2 identities; and identity-specific image decoders 206-1, 206-2 and mask decoders 208-1, 208-2. For ease of reference, when discussing the FIG. 11 method 510, the first identity-specific image and mask decoders of the first face-swapping model 32 will be referenced using reference numerals 206A-1, 206A-2 (for image decoders) and 208A-1, 208A-2 (for mask decoders), where, the "−1" and "−2" correspond to the identities j=1 (ID #1) and j=2 (ID #2) and the additional "A" is added to the reference numeral to reflect that these image and mask decoders are part of the first face-swapping model 32.

Method 510 then proceeds to block 540 which involves training a second face-swapping model 542. In the second face-swapping model 542 and during its training in block 540, the parameters of shared encoder 202 and one or more optional shared decoder layers 204 are fixed with the values obtained in the block 30 training of first face-swapping model 32. In addition to shared encoder 202 and one or more shared decoder layers 204, second face-swapping model 542 comprises second identity-specific image decoders 206B-1, 206B-2 and second identity-specific mask decoders 208B-1, 208B-2, where the additional "B" is added to the reference numeral to reflect that these image and mask decoders are part of second face-swapping model 542. Second identity-specific image decoders 206B-1, 206B-2 and second identity-specific mask decoders 208B-1, 208B-2 may have the same architectures as corresponding first image decoders 206A-1, 206A-2 and first mask decoders 208A-1, 208A-2. The training of second face-swapping model 542 in block 540 may involve a training scheme similar to training scheme 200 (FIG. 3A) and a training method similar to training method 250 (FIG. 3B) except that:

(i) the parameters of shared encoder 202 and one or more optional shared decoder layers 204 are fixed during block 540 with the values obtained in the block 30 training of first face-swapping model 32;

(ii) the trainable parameters of second identity-specific image decoders 206B-1, 206B-2 and second identity-specific mask decoders 208B-1, 208B-2 are respectively initialized with the trained parameters of first identity-specific image decoders 206A-1, 206A-2 and first identity-specific mask decoders 208A-1, 208B-1; and (iii) the trainable parameters of second identity-specific image decoders 206B-1, 206B-2 and second identity-specific mask decoders 208B-1, 208B-2 are trained with opposite datasets—i.e. the second decoders 206B-1, 208B-1 initialized with parameters for the first identity (ID #1) are trained with input data (aligned face images 120-2 and segmentation masks 122-2) from the second identity (ID #2) and are asked to reconstruct reconstructed face images 220-2 and reconstructed masks 222-2 for the second identity (ID #2) and the second decoders 206B-2, 208B-2 initialized with parameters for the second identity (ID #2) are trained with input data (aligned face images 120-1 and segmentation masks 122-1) from the first identity (ID #1) and are asked to reconstruct reconstructed face images 220-1 and reconstructed masks 222-1 for the first identity (ID #1).

At the conclusion of block 540, there are two face-swapping models 32, 542, which include: encoder 202 and optional one or more decoder layers 204 having parameters that are shared between the N=2 identities; a first identity (ID #1) first image decoder 206A-1 (trained with first identity (ID #1) data), second image decoder 206B-1 (trained with second identity (ID #2) data), first identity (ID #1) first mask decoder 208A-1 (trained with first identity (ID #1) data), and second mask decoder 208B-1 (trained with second identity (ID #2) data); and second identity (ID #2) first image decoder 206A-2 (trained with second identity (ID #2) data), second image decoder 206B-2 (trained with first identity (ID #1) data), second identity (ID #2) first mask decoder 208A-2 (trained with second identity (ID #2) data), and second mask decoder 208B-2 (trained with first identity (ID #1) data).

Method 510 then proceeds to block 550 which involves constructing blended image decoder 552A and blended mask decoder 552B. In addition to face-swapping models 32, 542, block 550 receives interpolation parameters 74. Interpolation parameters 74 may have the same format ($\alpha_{ij}$) discussed above in connection with method 10 (FIG. 1A), where each $\alpha_{ij}$ ascribes a weight for the $i^{th}$ layer and the $i^{th}$ identity (i.e. how much influence the $i^{th}$ identity should have on the $i^{th}$ layer of blended image decoder 552A or blended mask decoder 552B), except that in the case of method 510, the index j can only take on the values j=1 or j=2, since there are only N=2 identities. In some embodiments, interpolation parameters 74 ($\alpha_{ij}$) are normalized, such that $\Sigma_{j=1}^{2}\alpha_{ij}=1$, but this is not necessary. Like method 10 described above, interpolation parameters 74 ($\alpha_{ij}$) may be specified (e.g. through a user interface) which may convert some other form of input blending parameters 70 in block 72.

In block 550, the parameters of the $i^{th}$ layer of blended image decoder 552A or blended mask decoder 552B may be defined by the vector $B_i$ and may be constructed according to a linear combination of the parameters of the $i^{th}$ layer of the decoders 206A-1, 206B-1, 206A-2, 206B-2, 208A-1, 208B-1, 208A-2, 208B-2 from first and second trained face-swapping models:

$$B_i = \alpha_{i1}M_{i,A-1} + \alpha_{i2}M_{i,B-1} \quad (12A)$$

where: $M_{i,A-1}$ is a vector representing the parameters of the $i^{th}$ layer of the image decoder 206A-1 or mask decoder 208A-1 (as the case may be) of first face-swapping model 32; and $M_{i,B-1}$ is a vector representing the $i^{th}$ layer of the image decoder 206B-1 or mask decoder 208B-1 (as the case may be) of second face swapping model 542; or $$B_i = \alpha_{i1}M_{i,A-2} + \alpha_{i2}M_{i,B-2} \quad (12B)$$

here: $M_{i,A-2}$ is a vector representing the parameters of the $i^{th}$ layer of the image decoder 206A-2 or mask decoder 208A-2 (as the case may be) of first face-swapping model 32; and $M_{i,B-2}$ is a vector representing the $i^{th}$ layer of the image decoder 206B-2 or mask decoder 208B-2 (as the case may be) of second face-swapping model 542.

It will be appreciated that either equation (12A) or (12B) could be used in block 550, because there are two-face swapping models 32, 542, which are trained with opposite objectives. In some embodiment, block 550 may involve taking an average of the equation (12A) and (12B) parameters in each layer. It will be appreciated that blended image decoder 552A and blended mask decoder 552B are defined by the vector B; for each of the layers i=1, 2, . . . I.

Once blended image decoder 552A and blended mask decoder 552B are constructed in block 550, method 510 proceeds to block 60 which involves inferring inferred blended face image 73A and inferred blended mask 73B. Other than for using blended image decoder 552A and blended mask decoder 552B (in the place of blended image decoder 52A and blended mask decoder 52B), the block 70 inference in method 510 may be the same as that of method 10. Method 510 may also optionally involve compositing inferred blended face image 73A onto prepared input image 76 in block 77 to obtain inferred blended output image 62 in a manner similar to block 77 of method 10 described above. In other respects, method 510 may be the same as (or analogous to) method 10 described herein.

Figure 12:
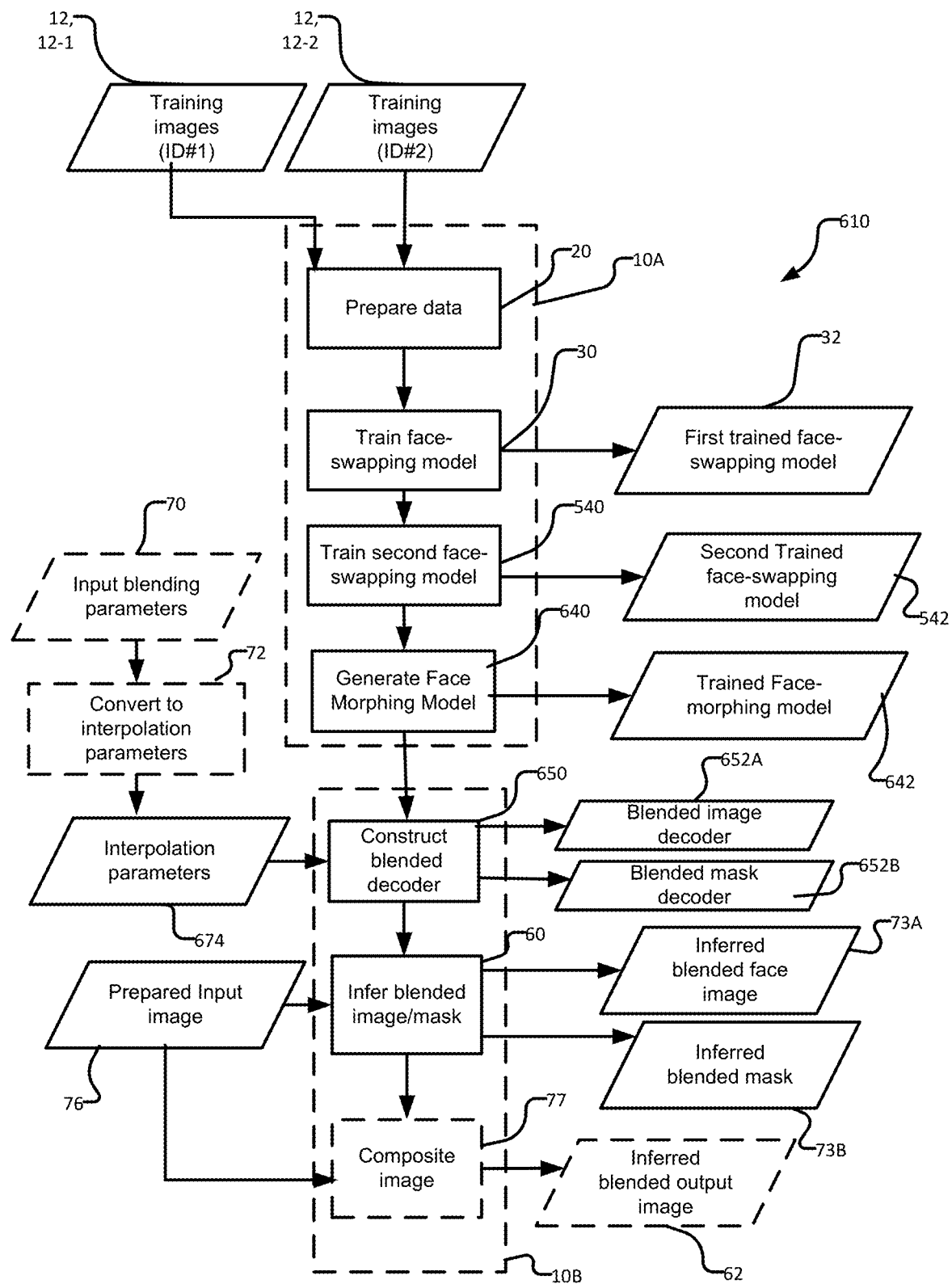
FIG. 12 is a schematic depiction of a method for neural face morphing between N=2 identities according to another particular embodiment.

FIG. 12 is a schematic depiction a method 610 for neural face morphing between N=2 identities according to another particular embodiment. In many respects, method 610 is similar to methods 10 (FIG. 1A) and 510 (FIG. 11) described above and similar steps are shown using the same reference or similar reference numerals. As explained in more detail below, method 610 incorporates the training of a second face-swapping model 542 (like method 510) but differs from method 510 primarily in that method 610 comprises using the two face-training models 32, 542 to define a face-morphing model 642 in block 640.

Method 610 starts with N=2 sets of training images 12-1 and 12-2. Blocks 20, 30 and 540 of method 610 are substantially similar to blocks 20, 30 and 540 of method 510 (FIG. 11) described above. The block 20 data preparation may be performed in accordance with method 100 (FIG. 2) to generate aligned training images 120-1, 120-2 and segmentation training masks 122-1, 122-2 for the N=2 identities. Similarly, the training of the first face-swapping model 32 in block 30 may be performed in accordance with training scheme 200 (FIGS. 3A, 3B) and training method 250 (FIG. 3C) and results in: encoder 202 and one or more optional decoder layers 204 which are shared between the N=2 identities; and identity-specific image decoders 206-1, 206-2 and mask decoders 208-1, 208-2. For ease of reference, when discussing the FIG. 12 method 610, the first identity-specific image and mask decoders of the first face-swapping model 32 will be referenced using reference numerals 206A-1, 206A-2 (for image decoders) and 208A-1, 208A-2 (for mask decoders), where, the "−1" and "−2" correspond to the identities j=1 (ID #1) and j=2 (ID #2) and the additional "A" is added to the reference numeral to reflect that these image and mask decoders are part of the first face-swapping model 32.

Training the second face-swapping model 542 in block 540 may be substantially similar to block 540 of method 510 (described above) and results in trained identity-specific image decoders 206B-1, 206B-2 and trained identity-specific mask decoders 208B-1, 208B-2.

At the conclusion of block 540, there are two face-swapping models 32, 542, which include: encoder 202 and optional one or more decoder layers 204 having parameters that are shared between the N=2 identities; a first identity (ID #1) first image decoder 206A-1 (trained with first identity (ID #1) data), second image decoder 206B-1 (trained with second identity (ID #2) data), first identity (ID #1) first mask decoder 208A-1 (trained with first identity (ID #1) data), and second mask decoder 208B-1 (trained with second identity (ID #2) data); and second identity (ID #2) first image decoder 206A-2 (trained with second identity (ID #2) data), second image decoder 206B-2 (trained with first identity (ID #1) data), second identity (ID #2) first mask decoder 208A-2 (trained with second identity (ID #2) data), and second mask decoder 208B-2 (trained with first identity (ID #1) data).

Method 610 then proceeds to block 640 which involves training (or configuring) a face-morphing model 642. Like the training of face-morphing model 42 described above (FIG. 1A), face-morphing training scheme 300 (FIG. 4A) and face-morphing training method 350 (FIG. 4C), block 640 involves generating a shared hypernetwork (defined by a basis matrix $A_i$ and an offset vector $\mu_i$) for each layer i=1, 2, . . . I and a set of identity-specific ID Weights which, for each identity (j=1 and j=2), include the union of the weights $w_{ij}$ for the layers i=1, 2, . . . I. Like face-morphing model 42 described above, the hypernetwork and ID Weights of face-morphing model 642 may be used to reconstruct image decoders and mask decoders and the ID Weights of face-morphing model 642 may be interpolated to reconstruct a blended image decoder and mask decoder.

In the case of block 640 and face-morphing model 642, there is only one basis vector per layer and so, the basis matrix $A_i$ degenerates to a vector of dimensionality $q_i$, where $q_i$ is the number of elements in the $i^{th}$ decoder layer. The offset vector $\mu_i$ has this same dimensionality. Further, in the case of face-morphing model 642, the weight vector $w_{ij}$ degenerates into a scalar for each i, j pair. More specifically, the shared hypernetwork of face-morphing model 642 for the $i^{th}$ layer may be defined according to:

$$\mu_i \equiv L_i(\text{decoder } 206A\_1, 208A\_1) \tag{13A}$$

$$A_i \equiv L_i(\text{decoder } 206B\_1, 208B\_1) - L_i(\text{decoder } 206A\_1, 208A\_1) \tag{13B}$$

where: $L_i$ (decoder 206A_1, 208A_1) is a vector representing the trained parameters of the $i^{th}$ layer of the image decoder 206A-1 or mask decoder 208A-1 (as the case may be) of first image-swapping model 32 for the first identity (ID #1); $L_i$ (decoder 206B_1, 208B_1) is a vector representing the trained parameters of the $i^{th}$ layer of the image decoder 206B-1 or mask decoder 208B-1 (as the case may be) of second image-swapping model 542 for the first identity (ID #1); and the ID Weights are $w_{i1} \rightarrow w_{i1}=0$ and $w_{i2} \rightarrow w_{i2}=1$; or the shared hypernetwork of face-morphing model 642 for the $i^{th}$ layer may be defined according to:

$$\mu_i \equiv L_i(\text{decoder } 206A\_2, 208A\_2) \tag{14A}$$

$$A_i \equiv L_i(\text{decoder } 206B\_2, 208B\_2) - L_i(\text{decoder } 206A\_2, 208A\_2) \tag{14B}$$

where: $L_i$ (decoder 206A_2, 208A_2) is a vector representing the trained parameters of the $i^{th}$ layer of the image decoder 206A-2 or mask decoder 208A-2 (as the case may be) of first image-swapping model 32 for the second identity (ID #2); $L_i$ (decoder 206B_2, 208B_2) is a vector representing the trained parameters of the $i^{th}$ layer of the image decoder 206B-2 or mask decoder 208B-2 (as the case may be) of second image-swapping model 542 for the second identity (ID #2); and where the ID Weights are $w_{i1} \rightarrow w_{i1}=1$ and $w_{i2} \rightarrow w_{i2}=0$. It will be appreciated that the various image and mask decoders of first and second face-swapping models may be reconstructed according to equation (5) above, having regard to the definitions of equations (13A), (13B) or (14A), (14B).

After generating face-morphing model 642 in block 640, method proceeds to block 650 which involves constructing a blended image decoder 652A and a blended mask decoder 652B based on face-morphing model 642 and interpolation parameters 674. As discussed in more detail below, interpolation parameters 674 may be different than interpolation parameters 74 of method 10 (FIG. 1A). In a manner similar to the construction of blended decoders in block 50 of method 10 (FIG. 1A), constructing blended decoders 652A, 652B in block 650 may involve determining the parameters of the $i^{th}$ layer of the blended image decoder 652A or mask decoder 652B (which may be defined by the vector $L_i^*$, where $L_i^*$ has dimensionality $q_i$) according to:

$$L_i^* = w_i^* A_i + \mu_i \qquad (15)$$

where: $A_i$ and $\mu_i$ have the meanings described in equation (13A), (13B) or in equation (14A), (14B); and where $w_i^*$ is a scalar interpolation parameter 674 in a range [0, 1] for the $i^{th}$ layer of the blended image decoder 652A or mask decoder 652B.

As discussed above, in connection with equations (13A), (13B), $w_{i1} \rightarrow w_{i1}=0$ and $w_{i2} \rightarrow w_{i2}=1$, and so selecting $w_i^*$ relatively close to $w_i^*=0$ will mean that the $i^{th}$ layer of the blended decoder 652A, 652B is relatively close to that of the first identity (ID #1) and selecting $w_i^*$ relatively close to $w_i^*=1$ will mean that the $i^{th}$ layer of the blended decoder 652A, 652B is relatively close to that of the second identity (ID #2). Similarly, as discussed above in connection with equations (14A), (14B), $w_{i1} \rightarrow w_{i1}=1$ and $w_{i2} \rightarrow w_{i2}=0$, and so selecting $w_i^*$ relatively close to $w_i^*=0$ will mean that the $i^{th}$ layer of the blended decoder 652A, 652B is relatively close to that of the second identity (ID #2) and selecting $w_i^*$ relatively close to $w_i^*=1$ will mean that the $i^{th}$ layer of the blended decoder 652A, 652B is relatively close to that of the first identity (ID #2).

Like method 10 (FIG. 1A), in some embodiments, interpolation parameters 674 ($w_i^*$) may be specified (e.g. through a user interface) which may convert some other form of input blending parameters 70 in block 72. These input blending parameters 70 may be analogous to those described above in connection with method 10, except that they may be converted to interpolation parameters 674.

Once blended image decoder 652A and blended mask decoder 652B are constructed in block 650, method 610 proceeds to block 60 which involves inferring inferred blended face image 73A and inferred blended mask 73B. Other than for using blended image decoder 652A and blended mask decoder 652B (in the place of blended image decoder 52A and blended mask decoder 52B), the block 70 inference in method 610 may be the same as that of method 10. Method 610 may also optionally involve compositing inferred blended face image 73A onto prepared input image 76 in block 77 to obtain inferred blended output image 62 in a manner similar to block 77 of method 10 described above. In other respects, method 610 may be the same as (or analogous to) method 10 described herein.

Interpretation of Terms

Unless the context clearly requires otherwise, throughout the description and the claims:
"comprise", "comprising", and the like are to be construed in an inclusive sense, as opposed to an exclusive or exhaustive sense; that is to say, in the sense of "including, but not limited to";
"connected", "coupled", or any variant thereof, means any connection or coupling, either direct or indirect, between two or more elements; the coupling or connection between the elements can be physical, logical, or a combination thereof;
"herein", "above", "below", and words of similar import, when used to describe this specification, shall refer to this specification as a whole, and not to any particular portions of this specification;
"or", in reference to a list of two or more items, covers all of the following interpretations of the word: any of the items in the list, all of the items in the list, and any combination of the items in the list;
the singular forms "a", "an", and "the" also include the meaning of any appropriate plural forms.

Words that indicate directions such as "vertical", "transverse", "horizontal", "upward", "downward", "forward", "backward", "inward", "outward", "vertical", "transverse", "left", "right", "front", "back", "top", "bottom", "below", "above", "under", and the like, used in this description and any accompanying claims (where present), depend on the specific orientation of the apparatus described and illustrated. The subject matter described herein may assume various alternative orientations. Accordingly, these directional terms are not strictly defined and should not be interpreted narrowly.

Embodiments of the invention may be implemented using specifically designed hardware, configurable hardware, programmable data processors configured by the provision of software (which may optionally comprise "firmware") capable of executing on the data processors, special purpose computers or data processors that are specifically programmed, configured, or constructed to perform one or more steps in a method as explained in detail herein and/or combinations of two or more of these. Examples of specifically designed hardware are: logic circuits, application-specific integrated circuits ("ASICs"), large scale integrated circuits ("LSIs"), very large scale integrated circuits ("VLSIs"), and the like. Examples of configurable hardware are: one or more programmable logic devices such as programmable array logic ("PALs"), programmable logic arrays ("PLAs"), and field programmable gate arrays ("FPGAs")). Examples of programmable data processors are: microprocessors, digital signal processors ("DSPs"), embedded processors, graphics processors, math co-processors, general purpose computers, server computers, cloud computers, mainframe computers, computer workstations, and the like. For example, one or more data processors in a control circuit for a device may implement methods as described herein by executing software instructions in a program memory accessible to the processors.

Processing may be centralized or distributed. Where processing is distributed, information including software and/or data may be kept centrally or distributed. Such information may be exchanged between different functional units by way of a communications network, such as a Local Area Network (LAN), Wide Area Network (WAN), or the Internet, wired or wireless data links, electromagnetic signals, or other data communication channel.

For example, while processes or blocks are presented in a given order, alternative examples may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times.

In addition, while elements are at times shown as being performed sequentially, they may instead be performed simultaneously or in different sequences. It is therefore intended that the following claims are interpreted to include all such variations as are within their intended scope.

Software and other modules may reside on servers, workstations, personal computers, tablet computers, image data encoders, image data decoders, PDAs, color-grading tools, video projectors, audio-visual receivers, displays (such as televisions), digital cinema projectors, media players, and other devices suitable for the purposes described herein. Those skilled in the relevant art will appreciate that aspects of the system can be practised with other communications, data processing, or computer system configurations, including: Internet appliances, hand-held devices (including personal digital assistants (PDAs)), wearable computers, all manner of cellular or mobile phones, multi-processor systems, microprocessor-based or programmable consumer electronics (e.g., video projectors, audio-visual receivers, displays, such as televisions, and the like), set-top boxes, color-grading tools, network PCs, mini-computers, mainframe computers, and the like.

The invention may also be provided in the form of a program product. The program product may comprise any non-transitory medium which carries a set of computer-readable instructions which, when executed by a data processor, cause the data processor to execute a method of the invention. Program products according to the invention may be in any of a wide variety of forms. The program product may comprise, for example, non-transitory media such as magnetic data storage media including floppy diskettes, hard disk drives, optical data storage media including CD ROMs, DVDs, electronic data storage media including ROMs, flash RAM, EPROMs, hardwired or preprogrammed chips (e.g., EEPROM semiconductor chips), nanotechnology memory, or the like. The computer-readable signals on the program product may optionally be compressed or encrypted.

In some embodiments, the invention may be implemented in software. For greater clarity, "software" includes any instructions executed on a processor, and may include (but is not limited to) firmware, resident software, microcode, and the like. Both processing hardware and software may be centralized or distributed (or a combination thereof), in whole or in part, as known to those skilled in the art. For example, software and other modules may be accessible via local memory, via a network, via a browser or other application in a distributed computing context, or via other means suitable for the purposes described above.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

Specific examples of systems, methods and apparatus have been described herein for purposes of illustration. These are only examples. The technology provided herein can be applied to systems other than the example systems described above. Many alterations, modifications, additions, omissions, and permutations are possible within the practice of this invention. This invention includes variations on described embodiments that would be apparent to the skilled addressee, including variations obtained by: replacing features, elements and/or acts with equivalent features, elements and/or acts; mixing and matching of features, elements and/or acts from different embodiments; combining features, elements and/or acts from embodiments as described herein with features, elements and/or acts of other technology; and/or omitting combining features, elements and/or acts from described embodiments.

Various features are described herein as being present in "some embodiments". Such features are not mandatory and may not be present in all embodiments. Embodiments of the invention may include zero, any one or any combination of two or more of such features. This is limited only to the extent that certain ones of such features are incompatible with other ones of such features in the sense that it would be impossible for a person of ordinary skill in the art to construct a practical embodiment that combines such incompatible features. Consequently, the description that "some embodiments" possess feature A and "some embodiments" possess feature B should be interpreted as an express indication that the inventors also contemplate embodiments which combine features A and B (unless the description states otherwise or features A and B are fundamentally incompatible).

This application comprises a number of non-limiting aspects. Non-limiting aspects of the invention comprise:

1. A method, performed on a computer, for morphing an input image depicting a face of one of a plurality of N input identities to an output image depicting a face that is a blend of characteristics of a blending subset of the plurality of N input entities, the method comprising:
    training a face-morphing model comprising:
        a shared set of trainable neural-network parameters that are shared between the plurality of N input identities; and
        for each of the plurality of N input entities, an identity-specific set of trainable neural-network parameters;
    to thereby obtain a trained face-morphing model comprising:
        a shared set of trained neural-network parameters that are shared between the plurality of N input identities; and
        for each of the plurality of N input entities, an identity-specific set of trained neural-network parameters;
    receiving an input image depicting a face of one of the plurality of N input identities;
    receiving a set of interpolation parameters;
    combining the identity-specific sets of trained neural-network parameters for the blending subset of the plurality of N input identities based on the interpolation parameters, to thereby obtain a blended set of neural-network parameters;

inferring an output image depicting a face that is a blend of characteristics of the blending subset of the N input entities using the shared set of trained neural-network parameters, the blended set of neural-network parameters and the input image.

2. The method according to aspect 1 or any other aspect herein wherein the blending subset of the plurality of N input entities comprises a plurality of the input identities which includes one of the plurality of N input identities corresponding to the face depicted in the input image.

3. The method according to any one of aspects 1 to 2 or any other aspect herein wherein the plurality of N input identities comprises at least one CG character.

4. The method according to any one of aspects 1 to 3 or any other aspect herein wherein the plurality of N input identities comprises at least one human actor.

5. The method according to any one of aspects 1 to 4 or any other aspect herein wherein training the face-morphing model comprises:
for each of the plurality of N identities:
obtaining training images depicting a face of the identity;
for each training image depicting the face of the identity:
augmenting the training image to obtain an augmented image;
inputting the augmented image to a portion of the face-morphing model which includes the shared set of trainable neural-network parameters and the identity-specific set of trainable neural-network parameters corresponding to the identity and thereby generating a reconstructed image depicting the face of the identity;
evaluating an image loss based at least in part on the training image and the reconstructed image;
training at least some of the identity-specific set of trainable neural-network parameters corresponding to the identity based at least in part on the image loss associated with each training image depicting the face of the identity; and
training the shared set of trainable neural-network parameters based at least in part on the image loss associated with each training image depicting the face of the identity, while requiring that the shared set of trainable neural-network parameters be shared across all of the plurality of N identities.

6. The method according to aspect 5 or any other aspect herein wherein, for each of the plurality of N identities and for each training image depicting the face of the identity, evaluating the image loss comprises comparing the training image and the reconstructed image (e.g. using one or more of: a L1 loss criterion comparing the training image and the reconstructed image; a structural similarity index measure (SSIM) loss criterion comparing the training image and the reconstructed image; and/or a linear combination of these and/or other loss criterion).

7. The method according to any one of aspects 5 to 6 or any other aspect herein, wherein training the face-morphing model comprises, for each of the plurality of N identities, obtaining a training segmentation mask corresponding to each training image depicting the face of the identity.

8. The method according to aspect 7 wherein, for each of the plurality of N identities and for each training image depicting the face of the identity, evaluating the image loss comprises applying the training segmentation mask corresponding to the training image on a pixel-wise basis to both the training image and the reconstructed image.

9. The method according to any one of aspects 7 and 8 or any other aspect herein wherein:
for each of the plurality of N identities and for each training image depicting the face of the identity:
inputting the augmented image to the portion of the face-morphing model which includes the shared set of trainable neural-network parameters and the identity-specific set of trainable neural-network parameters corresponding to the identity comprises generating a reconstructed segmentation mask corresponding to the training image depicting the face of the identity;
the method comprises evaluating a mask loss based at least in part on the training segmentation mask and the reconstructed segmentation mask; and
for each of the plurality of N identities:
training at least some of the identity-specific set of trainable neural-network parameters corresponding to the identity is based at least in part on the mask loss associated with each training image depicting the face of the identity;
training the shared set of trainable neural-network parameters is based at least in part on the mask loss associated with each training image depicting the face of the identity, while requiring that the shared set of trainable neural-network parameters be shared across all of the plurality of N identities.

10. The method according to aspect 9 or any other aspect herein wherein, for each of the plurality of N identities and for each training image depicting the face of the identity, evaluating the mask loss comprises comparing the training segmentation mask and the reconstructed segmentation mask (e.g. using one or more of: a L1 loss criterion comparing the training segmentation mask and the reconstructed segmentation mask; a structural similarity index measure (SSIM) loss criterion comparing the training segmentation mask and the reconstructed segmentation loss; and/or a linear combination of these and/or other loss criterion).

11. The method according to any one of aspects 1 to 10 or any other aspect herein wherein training the face-morphing model comprises: evaluating a regularization loss based on at least a portion of the shared set of trainable neural-network parameters; and training the at least a portion of the shared set of trainable neural-network parameters based on the regularization loss.

12. The method according to any one of aspects 1 to 10 or any other aspect herein wherein training the face-morphing model comprises:
evaluating a plurality of regularization losses, each regularization loss based on a corresponding subset of the shared set of trainable neural-network parameters; and
for each of the plurality of regularization losses, training the corresponding subset of the shared set of trainable neural-network parameters based on the regularization loss.

13. The method according to any one of aspects 11 to 12 or any other aspect herein wherein evaluating each regularization loss is based on an L1 loss over the corresponding subset of the shared set of trainable neural-network parameters.

14. The method according to any one of aspects 1 to 13 or any other aspect herein wherein combining the identity-specific sets of trained neural-network parameters comprises:
    determining one or more linear combinations of one or more corresponding subsets of the identity-specific sets of trained neural-network parameters to thereby obtain one or more corresponding subsets of the blended set of neural-network parameters.

15. The method according to aspect 14 or any other aspect herein wherein the set of interpolation parameters provides the weights for the one or more linear combinations.

16. The method according to any one of aspects 14 and 15 or any other aspect herein wherein determining the one or more linear combinations comprises performing a calculation of the form $w_i^* = \sum_{j=1}^{N} \alpha_{ij} w_{ij}$ for each of $i=1, 2 \ldots I$ subsets of the identity-specific sets of trained neural-network parameters, where: $w_{ij}$ is a vector whose elements are the $i^{th}$ subset of the identity-specific set of trained neural-network parameters for the $j^{th}$ identity ($j \in 1, 2 \ldots N$), $w_i^*$ is a vector whose elements are the $i^{th}$ subset of the blended set of neural-network parameters and $\alpha y$ are the interpolation parameters.

17. The method according to aspect 16 or any other aspect herein wherein inferring the output image comprises providing an autoencoder, the autoencoder comprising:
    an encoder for encoding images into latent codes;
    an image decoder for receiving latent codes from the encoder and reconstructing reconstructed images therefrom.

18. The method according to aspect 17 or any other aspect herein wherein the encoder is parameterized by parameters from among the shared set of trained neural-network parameters.

19. The method according to any one of aspects 17 to 18 or any other aspect herein wherein inferring the output image comprises:
    constructing the image decoder to be a blended image decoder comprising at least I layers, where each of the I layers of the blended image decoder is parameterized by an $i^{th}$ set of blended decoder parameters (which may be represented by the vector $L_i^*$) which are in turn defined by: the vector $w_i^*$ whose elements are the $i^{th}$ subset of the blended set of neural-network parameters; an $i^{th}$ set of basis vectors (which may be represented by a matrix $A_i$) whose elements are among the shared set of trained neural-network parameters; and an $i^{th}$ bias vector $\mu_i$ whose elements are among the shared set of trained neural-network parameters;
    inputting the input image into the encoder to generate a latent code corresponding to the input image; and
    inputting the latent code corresponding to the input image into the blended image decoder to thereby infer the output image depicting the face that is the blend of the characteristics of the blending subset of the N input entities.

20. The method according to any one of aspects 17 to 19 or any other aspect herein wherein inferring the output image comprises:
    constructing the image decoder to be a blended image decoder comprising at least I layers, where each of the I layers of the blended image decoder is parameterized by an $i^{th}$ set of blended decoder parameters by performing a calculation of the form $L_i^* = w_i^* A_i + \mu_i$, where: $L_i^*$ is a vector whose elements represent the $i^{th}$ set of blended decoder parameters that parameterize the $i^{th}$ layer of the blended image decoder; $w_i^*$ is a vector whose elements are the $i^{th}$ subset of the blended set of neural-network parameters; $A_i$ is a matrix comprising an $i^{th}$ set of basis vectors whose elements are among the shared set of trained neural-network parameters (with each row of $A_i$ corresponding to a single basis vector); and $\mu_i$ is a $i^{th}$ bias vector whose elements are among the shared set of trained neural-network parameters;
    inputting the input image into the encoder to generate a latent code corresponding to the input image; and
    inputting the latent code corresponding to the input image into the blended image decoder to thereby infer the output image depicting the face that is the blend of the characteristics of the blending subset of the N input entities.

21. The method according to any one of aspects 17 to 18 or any other aspect herein wherein:
    the autoencoder comprises a mask decoder for receiving latent codes from the encoder and reconstructing reconstructed segmentation masks therefrom;
    inferring the output image comprises:
      constructing the image decoder to be a blended image decoder and the mask decoder to be a blended mask decoder, wherein a combination of parameters of the blended image decoder and the blended mask decoder comprises at least I layers, where each of the I layers of the combination of parameters of the blended image decoder and the blended mask decoder is parameterized by an $i^{th}$ set of blended decoder parameters (which may be represented by the vector $L_i^*$) which are in turn defined by: the vector $w_i^*$ whose elements are the $i^{th}$ subset of the blended set of neural-network parameters; an $i^{th}$ set of basis vectors (which may be represented by a matrix $A_i$) whose elements are among the shared set of trained neural-network parameters; and an $i^{th}$ bias vector u, whose elements are among the shared set of trained neural-network parameters;
      inputting the input image into the encoder to generate a latent code corresponding to the input image;
      inputting the latent code corresponding to the input image into the blended image decoder to thereby infer the output image depicting the face that is the blend of the characteristics of the blending subset of the N input entities; and
      inputting the latent code corresponding to the input image into the blended mask decoder to thereby infer an output segmentation mask.

22. The method according to any one of aspects 1 to 4 or any other aspect herein wherein the face-morphing model comprises, for each of the plurality of N identities, an autoencoder comprising:
    an encoder for encoding images of the identity into latent codes;
    an image decoder for receiving latent codes from the encoder and reconstructing reconstructed images of the identity therefrom.

23. The method according to aspect 22 or any other aspect herein wherein the encoder is the same for each of the plurality of N identities and is parameterized by encoder parameters from among the shared set of trained neural-network parameters.

24. The method according to aspect 23 or any other aspect herein wherein, for each of the N identities (j=1, 2, . . . N):
the image decoder comprises at least I layers; and
wherein, for each of the I layers:
the image decoder is parameterized by an $i^{th}$ set of image decoder parameters (which may be defined by the elements of a vector $L_{i,j}$), wherein the $i^{th}$ set of image decoder parameters is prescribed at least in part by:
a corresponding $i^{th}$ subset of the identity-specific set of trained neural-network parameters corresponding to the identity (which may be defined by the elements of a vector $w_{ij}$); and
an $i^{th}$ hypernetwork parameterized by hypernetwork parameters defined by the elements of a basis matrix $A_i$ and a bias vector $\mu_i$, wherein the hypernetwork parameters are among the shared set of trained neural-network parameters.

25. The method according to any one of aspects 23 to 24 or any other aspect herein wherein, for each of the N identities (j=1, 2, . . . N):
the image decoder comprises at least I layers; and
wherein, for each of the I layers:
the image decoder is parameterized by an $i^{th}$ set of image decoder parameters represented by a vector $L_{i,j}$ whose elements are prescribed according to $L_{i,j} = w_{ij} A_i + \mu_i$ where: $w_{ij}$ is a vector whose elements are among the identity-specific set of trained neural-network parameters for the layer i and the identity j; $A_i$ is a basis matrix for the $i^{th}$ layer, whose rows are basis vectors and whose elements are among the shared set of trained neural-network parameters; and $\mu_i$ is a bias vector for the $i^{th}$ layer, whose elements are among the shared set of trained neural-network parameters.

26. The method according to any one of aspects 24 to 25 or any other aspect herein wherein the autoencoder comprises a mask decoder for receiving latent codes from the encoder and reconstructing reconstructed segmentation masks of the identity therefrom.

27. The method according to aspect 26 or any other aspect herein wherein, for each of the N identities (j=1, 2, . . . N):
a combination of parameters of the image decoder and the mask decoder comprises at least I layers; and
wherein, for each of the I layers:
the combination of parameters of the image decoder and the mask decoder is parameterized by an $i^{th}$ set of combined decoder parameters (which may be defined by the elements of a vector $L_{i,j}$), wherein the $i^{th}$ set of combined decoder parameters is prescribed at least in part by:
a corresponding $i^{th}$ subset of the identity-specific set of trained neural-network parameters corresponding to the identity (which may be defined by the elements of a vector $w_{ij}$); and
an $i^{th}$ hypernetwork parameterized by hypernetwork parameters defined by the elements of a basis matrix $A_i$ and a bias vector $\mu_i$, wherein the hypernetwork parameters are among the shared set of trained neural-network parameters.

28. The method according to any one of aspects 26 to 27 or any other aspect herein wherein, for each of the N identities (j=1, 2, . . . N):
a combination of parameters of the image decoder and the mask decoder comprises at least I layers; and
wherein, for each of the I layers:
the combination of parameters of the image decoder and the mask decoder is parameterized by an $i^{th}$ set of combined decoder parameters represented by a vector $L_{i,j}$ whose elements are prescribed according to $L_{i,j} = w_{ij} A_i + \mu_i$ where: $w_{ij}$ is a vector whose elements are among the identity-specific set of trained neural-network parameters for the layer i and the identity j; $A_i$ is a basis matrix for the $i^{th}$ layer, whose rows are basis vectors and whose elements are among the shared set of trained neural-network parameters; and $\mu_i$ is a bias vector for the $i^{th}$ layer, whose elements are among the shared set of trained neural-network parameters.

29. The method according to any one of aspects 22 to 28 or any other aspect herein wherein training the face-morphing model comprises:
for each of the plurality of N identities:
obtaining training images depicting a face of the identity;
for each training image depicting the face of the identity:
augmenting the training image to obtain an augmented image;
inputting the augmented image to the autoencoder corresponding to the identity and thereby generating a reconstructed image depicting the face of the identity;
evaluating an image loss based at least in part on the training image and the reconstructed image;
training at least some of the identity-specific set of trainable neural-network parameters corresponding to the identity based at least in part on the image loss associated with each training image depicting the face of the identity; and
training the shared set of trainable neural-network parameters based at least in part on the image loss associated with each training image depicting the face of the identity, while requiring that the shared set of trainable neural-network parameters be shared across all of the plurality of N identities.

30. The method according to aspect 29 or any other aspect herein wherein, for each of the plurality of N identities and for each training image depicting the face of the identity, evaluating the image loss comprises comparing the training image and the reconstructed image (e.g. using one or more of: a L1 loss criterion comparing the training image and the reconstructed image; a structural similarity index measure (SSIM) loss criterion comparing the training image and the reconstructed image; and/or a linear combination of these and/or other loss criterion).

31. The method according to any one of aspects 29 to 30 or any other aspect herein, wherein:
training the face-morphing model comprises, for each of the plurality of N identities, obtaining a training segmentation mask corresponding to each training image depicting the face of the identity; and
for each of the plurality of N identities and for each training image depicting the face of the identity, evaluating the image loss comprises applying the training segmentation mask corresponding to the training image on a pixel-wise basis to both the training image and the reconstructed image.

32. The method according to any one of aspects 29 to 31 or any other aspect herein wherein:

training the face-morphing model comprises, for each of the plurality of N identities, obtaining a training segmentation mask corresponding to each training image depicting the face of the identity; and for each of the plurality of N identities and for each training image depicting the face of the identity:
inputting the augmented image to the autoencoder comprises generating a reconstructed segmentation mask corresponding to the training image depicting the face of the identity;
the method comprises evaluating a mask loss based at least in part on the training segmentation mask and the reconstructed segmentation mask; and for each of the plurality of N identities:
training at least some of the identity-specific set of trainable neural-network parameters corresponding to the identity is based at least in part on the mask loss associated with each training image depicting the face of the identity;
training the shared set of trainable neural-network parameters is based at least in part on the mask loss associated with each training image depicting the face of the identity, while requiring that the shared set of trainable neural-network parameters be shared across all of the plurality of N identities.

33. The method according to aspect 32 or any other aspect herein wherein, for each of the plurality of N identities and for each training image depicting the face of the identity, evaluating the mask loss comprises comparing the training segmentation mask and the reconstructed segmentation mask (e.g. using one or more of: a L1 loss criterion comparing the training segmentation mask and the reconstructed segmentation mask; a structural similarity index measure (SSIM) loss criterion comparing the training segmentation mask and the reconstructed segmentation loss; and/or a linear combination of these and/or other loss criterion).

34. The method according to any one of aspects 22 to 33 or any other aspect herein wherein training the face-morphing model comprises: evaluating a regularization loss based on at least a portion of the shared set of trainable neural-network parameters; and training the at least a portion of the shared set of trainable neural-network parameters based on the regularization loss.

35. The method according to any one of aspects 22 to 33 or any other aspect herein wherein training the face-morphing model comprises:
evaluating a plurality of regularization losses, each regularization loss based on a corresponding subset of the shared set of trainable neural-network parameters; and
for each of the plurality of regularization losses, training the corresponding subset of the shared set of trainable neural-network parameters based on the regularization loss.

36. The method according to any one of aspects 34 to 35 or any other aspect herein wherein evaluating each regularization loss is based on an L1 loss over the corresponding subset of the shared set of trainable neural-network parameters.

37. The method according to any one of aspects 24 to 36 or any other aspect herein wherein combining the identity-specific sets of trained neural-network parameters comprises:
determining one or more linear combinations of one or more corresponding subsets of the identity-specific sets of trained neural-network parameters to thereby obtain one or more corresponding subsets of the blended set of neural-network parameters.

38. The method according to aspect 37 or any other aspect herein wherein the set of interpolation parameters provides the weights for the one or more linear combinations.

39. The method according to any one of aspects 37 to 38 or any other aspect herein wherein determining the one or more linear combinations comprises performing a calculation of the form $w_i^* = \Sigma_{j=1}^N \alpha_{ij} w_{ij}$ for each of i=1, 2 ... I subsets of the identity-specific sets of trained neural-network parameters, where: $w_{ij}$ is a vector whose elements are the $i^{th}$ subset of the identity-specific set of trained neural-network parameters for the $j^{th}$ identity (j∈1, 2 .... N), $w_i^*$ is a vector whose elements are the $i^{th}$ subset of the blended set of neural-network parameters and $\alpha_{ij}$ are the interpolation parameters.

40. The method according to aspect 39 or any other aspect herein wherein inferring the output image comprises providing an inference autoencoder, the inference autoencoder comprising:
the encoder;
a blended image decoder for receiving latent codes from the encoder and reconstructing reconstructed blended images therefrom.

41. The method according to aspect 40 or any other aspect herein wherein inferring the output image comprises:
constructing the blended image to decoder to comprise at least I layers corresponding to the I layers of the identity-specific image decoders, where each of the I layers of the blended image decoder is parameterized by an $i^{th}$ set of blended decoder parameters (which may be represented by the vector $L_i^*$) which are in turn defined by: the vector $w_i^*$ whose elements are the $i^{th}$ subset of the blended set of neural-network parameters; and the $i^{th}$ hypernetwork parameterized by hypernetwork parameters defined by the elements of the basis matrix $A_i$ and the bias vector $\mu_i$;
inputting the input image into the encoder to generate a latent code corresponding to the input image; and
inputting the latent code corresponding to the input image into the blended image decoder to thereby infer the output image depicting the face that is the blend of the characteristics of the blending subset of the N input entities.

42. The method according to any one of aspects 40 to 41 or any other aspect herein wherein inferring the output image comprises:
constructing the blended image decoder to comprise at least I layers corresponding to the I layers of the identity-specific image decoders, where each of the I layers of the blended image decoder is parameterized by an $i^{th}$ set of blended decoder parameters by performing a calculation of the form $L_i^* = w_i^* A_i + \mu_i$, where: $L_i^*$ is a vector whose elements represent the $i^{th}$ set of blended decoder parameters that parameterize the $i^{th}$ layer of the blended image decoder; $w_i^*$ is a vector whose elements are the $i^{th}$ subset of the blended set of neural-network parameters; $A_i$ is the basis matrix of the $i^{th}$ hypernetwork; and $\mu_i$ is the bias vector of the $i^{th}$ hypernetwork;
inputting the input image into the encoder to generate a latent code corresponding to the input image; and
inputting the latent code corresponding to the input image into the blended image decoder to thereby infer the output image depicting the face that is the blend of the characteristics of the blending subset of the N input entities.

43. The method according to aspect 40 or any other aspect herein wherein:
the inference autoencoder comprises a blended mask decoder for receiving latent codes from the encoder and reconstructing reconstructed segmentation masks therefrom;
inferring the output image comprises:
constructing the blended image decoder and the blended mask decoder, wherein a combination of parameters of the blended image decoder and the blended mask decoder comprises at least I layers, where each of the I layers of the combination of parameters of the blended image decoder and the blended mask decoder is parameterized by an $i^{th}$ set of blended decoder parameters (which may be represented by the vector $L_i^*$) which are in turn defined by: the vector $w_i^*$ whose elements are the $i^{th}$ subset of the blended set of neural-network parameters; and the $i^{th}$ hypernetwork parameterized by hypernetwork parameters defined by the elements of the basis matrix $A_i$ and the bias vector $\mu_i$;
inputting the input image into the encoder to generate a latent code corresponding to the input image;
inputting the latent code corresponding to the input image into the blended image decoder to thereby infer the output image depicting the face that is the blend of the characteristics of the blending subset of the N input entities; and
inputting the latent code corresponding to the input image into the blended mask decoder to thereby infer an output segmentation mask.

44. The method according to any one of aspects 24 to 28 or any other aspect herein wherein training the face-morphing model comprises training a face-swapping model to thereby train the encoder parameters.

45. The method according to aspect 44 wherein training the face-swapping model comprises
for each of the plurality of N identities:
obtaining training images depicting a face of the identity;
for each training image depicting the face of the identity:
augmenting the training image to obtain an augmented image;
inputting the augmented image to the autoencoder corresponding to the identity and thereby generating a reconstructed image depicting the face of the identity;
evaluating an image loss based at least in part on the training image and the reconstructed image;
training the encoder parameters based at least in part on the image loss associated with each training image depicting the face of the identity,
while requiring that the encoder parameters be shared across all of the plurality of N identities.

46. The method according to aspect 45 or any other aspect herein wherein, for each of the plurality of N identities and for each training image depicting the face of the identity, evaluating the image loss comprises comparing the training image and the reconstructed image (e.g. using one or more of: a L1 loss criterion comparing the training image and the reconstructed image; a structural similarity index measure (SSIM) loss criterion comparing the training image and the reconstructed image; and/or a linear combination of these and/or other loss criterion).

47. The method according to any one of aspects 45 to 46 or any other aspect herein, wherein:
training the face-swapping model comprises, for each of the plurality of N identities, obtaining a training segmentation mask corresponding to each training image depicting the face of the identity; and
for each of the plurality of N identities and for each training image depicting the face of the identity, evaluating the image loss comprises applying the training segmentation mask corresponding to the training image on a pixel-wise basis to both the training image and the reconstructed image.

48. The method according to any one of aspects 45 to 47 or any other aspect herein wherein:
training the face-swapping model comprises, for each of the plurality of N identities, obtaining a training segmentation mask corresponding to each training image depicting the face of the identity; and
for each of the plurality of N identities and for each training image depicting the face of the identity:
inputting the augmented image to the autoencoder comprises generating a reconstructed segmentation mask corresponding to the training image depicting the face of the identity;
the method comprises evaluating a mask loss based at least in part on the training segmentation mask and the reconstructed segmentation mask; and
for each of the plurality of N identities:
training the encoder parameters based at least in part on the mask loss associated with each training image depicting the face of the identity, while requiring that the encoder parameters be shared across all of the plurality of N identities.

49. The method according to aspect 48 or any other aspect herein wherein, for each of the plurality of N identities and for each training image depicting the face of the identity, evaluating the mask loss comprises comparing the training segmentation mask and the reconstructed segmentation mask (e.g. using one or more of: a L1 loss criterion comparing the training segmentation mask and the reconstructed segmentation mask; a structural similarity index measure (SSIM) loss criterion comparing the training segmentation mask and the reconstructed segmentation loss;
and/or a linear combination of these and/or other loss criterion).

50. The method according to any one of aspects 44 to 49 or any other aspect herein wherein training the face-morphing model comprises:
fixing the encoder parameters (and, optionally, decoder parameters of one or more shared decoder layers) with values obtained from training the face-swapping model;
for each of the plurality of N identities:
obtaining training images depicting a face of the identity;
for each training image:
augmenting the training image to obtain an augmented image;
inputting the augmented image to the autoencoder corresponding to the identity and thereby generating a reconstructed image depicting the face of the identity;

evaluating an image loss based at least in part on the training image and the reconstructed image;
for each of the plurality of N identities and for each of the at least I layers of the image decoder:
training the corresponding $i^{th}$ subset of the identity-specific set of trained neural-network parameters corresponding to the identity (which may be defined by the elements of a vector $w_{ij}$) based at least in part on the image loss associated with each training image depicting the face of the identity; and
training the $i^{th}$ hypernetwork parameterized by hypernetwork parameters defined by the elements of a basis matrix $A_i$ and a bias vector $\mu_i$ based at least in part on the image loss associated with each training image depicting the face of the identity, while requiring that the hypernetwork parameters be shared across all of the plurality of N identities.

51. The method according to aspect 50 or any other aspect herein wherein, for each of the plurality of N identities and for each training image depicting the face of the identity, evaluating the image loss comprises comparing the training image and the reconstructed image (e.g. using one or more of: a L1 loss criterion comparing the training image and the reconstructed image; a structural similarity index measure (SSIM) loss criterion comparing the training image and the reconstructed image; and/or a linear combination of these and/or other loss criterion).

52. The method according to any one of aspects 50 to 51 or any other aspect herein, wherein:
training the face-morphing model comprises, for each of the plurality of N identities, obtaining a training segmentation mask corresponding to each training image depicting the face of the identity; and
for each of the plurality of N identities and for each training image depicting the face of the identity, evaluating the image loss comprises applying the training segmentation mask corresponding to the training image on a pixel-wise basis to both the training image and the reconstructed image.

53. The method according to any one of aspects 27 to 28 or any other aspect herein wherein training the face-morphing model comprises:
training a face-swapping model to thereby train the encoder parameters.
fixing the encoder parameters (and, optionally, decoder parameters of one or more shared decoder layers) with values obtained from training the face-swapping model;
for each of the plurality of N identities:
obtaining training images depicting a face of the identity;
obtaining a training segmentation mask corresponding to each training image;
for each training image:
augmenting the training image to obtain an augmented image;
inputting the augmented image to the autoencoder corresponding to the identity and thereby generating a reconstructed image depicting the face of the identity and a reconstructed segmentation mask corresponding to the training image;
evaluating an image loss based at least in part on the training image and the reconstructed image;
evaluating a mask loss based at least in part on the training segmentation mask and the reconstructed segmentation mask;
for each of the plurality of N identities and for each of the at least I layers of the combination of the parameters of the image decoder and the mask decoder:
training the corresponding $i^{th}$ subset of the identity-specific set of trained neural-network parameters corresponding to the identity (which may be defined by the elements of a vector $w_{ij}$) based at least in part on the image loss and the mask loss associated with each training image depicting the face of the identity; and
training the $i^{th}$ hypernetwork parameterized by hypernetwork parameters defined by the elements of a basis matrix $A_i$ and a bias vector u;
based at least in part on the image loss and the mask loss associated with each training image depicting the face of the identity, while requiring that the hypernetwork parameters be shared across all of the plurality of N identities.

54. The method according to aspect 53 or any other aspect herein wherein, for each of the plurality of N identities and for each training image depicting the face of the identity, evaluating the image loss comprises comparing the training image and the reconstructed image (e.g. using one or more of: a L1 loss criterion comparing the training image and the reconstructed image; a structural similarity index measure (SSIM) loss criterion comparing the training image and the reconstructed image; and/or a linear combination of these and/or other loss criterion).

55. The method according to any one of aspects 53 to 54 or any other aspect herein, wherein:
for each of the plurality of N identities and for each training image depicting the face of the identity, evaluating the image loss comprises applying the training segmentation mask corresponding to the training image on a pixel-wise basis to both the training image and the reconstructed image.

56. The method according to any one of aspects 53 to 55 or any other aspect herein wherein, for each of the plurality of N identities and for each training image depicting the face of the identity, evaluating the mask loss comprises comparing the training segmentation mask and the reconstructed segmentation mask (e.g. using one or more of: a L1 loss criterion comparing the training segmentation mask and the reconstructed segmentation mask; a structural similarity index measure (SSIM) loss criterion comparing the training segmentation mask and the reconstructed segmentation loss; and/or a linear combination of these and/or other loss criterion).

57. The method according to any one of aspects 50 to 56 or any other aspect herein wherein training the face-morphing model comprises:
for each of the at least I layers:
evaluating a regularization loss based on by the elements of the basis matrix $A_i$; and
training the hypernetwork parameters defined by the elements of the basis matrix $A_i$ based on the regularization loss.

58. The method according to aspect 57 or any other aspect herein wherein evaluating each regularization loss is based on an L1 loss over the corresponding subset of the shared set of trainable neural-network parameters.

59. The method according to any one of aspects 44 to 58 or any other aspect herein wherein combining the identity-specific sets of trained neural-network parameters comprises:
  determining one or more linear combinations of one or more corresponding subsets of the identity-specific sets of trained neural-network parameters to thereby obtain one or more corresponding subsets of the blended set of neural-network parameters.
60. The method according to aspect 59 or any other aspect herein wherein the set of interpolation parameters provides the weights for the one or more linear combinations.
61. The method according to any one of aspects 59 to 60 or any other aspect herein wherein determining the one or more linear combinations comprises performing a calculation of the form $w_i^* = \sum_{j=1}^{N} \alpha_{ij} w_{ij}$ for each of i=1, 2 ... I subsets of the identity-specific sets of trained neural-network parameters, where: $w_{ij}$ is a vector whose elements are the $i^{th}$ subset of the identity-specific set of trained neural-network parameters for the $j^{th}$ identity (j∈1, 2 .... N), $w_i^*$ is a vector whose elements are the $i^{th}$ subset of the blended set of neural-network parameters and $\alpha_{ij}$ are the interpolation parameters.
62. The method according to aspect 60 or any other aspect herein wherein inferring the output image comprises providing an inference autoencoder, the inference autoencoder comprising:
  the encoder;
  a blended image decoder for receiving latent codes from the encoder and reconstructing reconstructed blended images therefrom.
63. The method according to aspect 62 or any other aspect herein wherein inferring the output image comprises:
  constructing the blended image to decoder to comprise at least I layers corresponding to the I layers of the identity-specific image decoders, where each of the I layers of the blended image decoder is parameterized by an $i^{th}$ set of blended decoder parameters (which may be represented by the vector $L_i^*$) which are in turn defined by: the vector $w_i^*$ whose elements are the $i^{th}$ subset of the blended set of neural-network parameters; and the $i^{th}$ hypernetwork parameterized by hypernetwork parameters defined by the elements of the basis matrix $A_i$ and the bias vector $\mu_i$;
  inputting the input image into the encoder to generate a latent code corresponding to the input image; and
  inputting the latent code corresponding to the input image into the blended image decoder to thereby infer the output image depicting the face that is the blend of the characteristics of the blending subset of the N input entities.
64. The method according to any one of aspects 62 to 63 or any other aspect herein wherein inferring the output image comprises:
  constructing the blended image decoder to comprise at least I layers corresponding to the I layers of the identity-specific image decoders, where each of the I layers of the blended image decoder is parameterized by an $i^{th}$ set of blended decoder parameters by performing a calculation of the form $L_i^* = w_i^* A_i + \mu_i$, where: $L_i^*$ is a vector whose elements represent the $i^{th}$ set of blended decoder parameters that parameterize the $i^{th}$ layer of the blended image decoder; $w_i^*$ is a vector whose elements are the $i^{th}$ subset of the blended set of neural-network parameters; $A_i$ is the basis matrix of the $i^{th}$ hypernetwork; and $\mu_i$ is the bias vector of the $i^{th}$ hypernetwork;
  inputting the input image into the encoder to generate a latent code corresponding to the input image; and
  inputting the latent code corresponding to the input image into the blended image decoder to thereby infer the output image depicting the face that is the blend of the characteristics of the blending subset of the N input entities.
65. The method according to aspect 62 or any other aspect herein wherein:
  the inference autoencoder comprises a blended mask decoder for receiving latent codes from the encoder and reconstructing reconstructed segmentation masks therefrom;
  inferring the output image comprises:
    constructing the blended image decoder and the blended mask decoder, wherein a combination of parameters of the blended image decoder and the blended mask decoder comprises at least I layers, where each of the I layers of the combination of the parameters of the blended image decoder and the blended mask decoder is parameterized by an $i^{th}$ set of blended decoder parameters (which may be represented by the vector $L_i^*$) which are in turn defined by: the vector $w_i^*$ whose elements are the $i^{th}$ subset of the blended set of neural-network parameters; and the $i^{th}$ hypernetwork parameterized by hypernetwork parameters defined by the elements of the basis matrix $A_i$ and the bias vector $\mu_i$;
    inputting the input image into the encoder to generate a latent code corresponding to the input image;
    inputting the latent code corresponding to the input image into the blended image decoder to thereby infer the output image depicting the face that is the blend of the characteristics of the blending subset of the N input entities; and
    inputting the latent code corresponding to the input image into the blended mask decoder to thereby infer an output segmentation mask.
66. The method according to aspect 1 wherein:
  the plurality of N input identities comprises N=2 identities and the blending subset of the N input identities comprises two identities;
  training the face-morphing model comprises:
    training a first face-swapping model comprising, for each of the N=2 identities, a first face-swapping autoencoder comprising: an encoder for encoding identity images into latent codes and a first image decoder for receiving latent codes from the encoder and reconstructing identity images therefrom;
    wherein training the first face-swapping model comprises:
      for the first (j=1) identity, training the first face-swapping autoencoder using training images of the first (j=1) identity and, for the second (j=2) identity, training the first face-swapping autoencoder using training images of the second (j=2) identity;
      forcing parameters of the encoder to be the same for both of (e.g. shared between) the N=2 identities;
    training a second face-swapping model comprising, for each of the N=2 identities, a second face-swapping autoencoder comprising: the encoder for encoding identity images into latent codes and a second image decoder for receiving latent codes from the encoder and reconstructing identity images therefrom;
wherein training the second face-swapping model comprises:
fixing the parameters of the encoder (and, optionally, decoder parameters of one or more shared decoder layers) for both of the N=2 identities and to have parameter values obtained from training the first face-swapping model;
for the first (j=1) identity, training the second image decoder using training images of the second (j=2) identity and, for the second (j=2) identity, training the second image decoder using training images of the first (j=1) identity.

67. The method according to aspect 66 or any other aspect herein wherein the encoder is shared between both of the N=2 identities and both of the first and second face-swapping models and is parameterized by encoder parameters from among the shared set of trained neural-network parameters.

68. The method according to any one of aspects 66 to 67 or any other aspect herein wherein, for each of the N=2 identities, the first and second image decoders are parameterized by decoder parameters from among the identity-specific set of trained neural-network parameters.

69. The method according to any one of aspects 66 to 68 or any other aspect herein wherein training the second face-swapping model comprises:
for the first (j=1) identity: initializing parameters of the second image decoder using values obtained from training the first image decoder for the first (j=1) identity; and training the second image decoder using training images of the second (j=2) identity; and
for the second (j=2) identity: initializing parameters of the second image decoder using values obtained from training the first image decoder for the second (j=2) identity; and training the second image decoder using training images of the first (j=1) identity.

70. The method according to any one of aspects 66 to 69 or any other aspect herein wherein training the first face-swapping model comprises
for the first (j=1) identity:
obtaining training images depicting a face of the first (j=1) identity;
for each training image depicting the face of the first (j=1) identity:
augmenting the training image to obtain an augmented image;
inputting the augmented image to the first face-swapping autoencoder corresponding to the first (j=1) identity and thereby generating a reconstructed image depicting the face of the first (j=1) identity;
evaluating an image loss based at least in part on the training image and the reconstructed image;
training at least some parameters of the first image decoder for the first (j=1) identity based at least in part on the image loss associated with each training image depicting the face of the first (j=1) identity
training the encoder parameters based at least in part on the image loss associated with each training image depicting the face of the first (j=1) identity, while requiring that the encoder parameters be shared across the plurality of N=2 identities; and
for the second (j=2) identity:
obtaining training images depicting a face of the second (j=2) identity;
for each training image depicting the face of the second (j=2) identity:
augmenting the training image to obtain an augmented image;
inputting the augmented image to the first face-swapping autoencoder corresponding to the second (j=2) identity and thereby generating a reconstructed image depicting the face of the second (j=2) identity;
evaluating an image loss based at least in part on the training image and the reconstructed image;
training at least some parameters of the first image decoder for the second (j=2) identity based at least in part on the image loss associated with each training image depicting the face of the second (j=2) identity
training the encoder parameters based at least in part on the image loss associated with each training image depicting the face of the second (j=2) identity, while requiring that the encoder parameters be shared across the plurality of N=2 identities.

71. The method according to any one of aspects 66 to 70 or any other aspect herein wherein training the second face-swapping model comprises
for the first (j=1) identity:
obtaining training images depicting a face of the second (j=2) identity;
for each training image depicting the face of the second (j=2) identity:
augmenting the training image to obtain an augmented image;
inputting the augmented image to the second face-swapping autoencoder corresponding to the first (j=1) identity and thereby generating a reconstructed image depicting the face of the second (j=2) identity;
evaluating an image loss based at least in part on the training image and the reconstructed image;
maintaining the encoder parameters fixed with values obtained during training of the first face-swapping model;
training at least some parameters of the second image decoder for the first (j=1) identity based at least in part on the image loss associated with each training image depicting the face of the second (j=2) identity for the second (j=2) identity:
obtaining training images depicting a face of the first (j=1) identity;
for each training image depicting the face of the first (j=1) identity:
augmenting the training image to obtain an augmented image;
inputting the augmented image to the first face-swapping autoencoder corresponding to the second (j=2) identity and thereby generating a reconstructed image depicting the face of the first (j=1) identity;
evaluating an image loss based at least in part on the training image and the reconstructed image;

maintaining the encoder parameters fixed with values obtained during training of the first face-swapping model;

training at least some parameters of the second image decoder for the second (j=2) identity based at least in part on the image loss associated with each training image depicting the face of the first (j=1) identity.

72. The method according to any one of aspects 66 to 71 or any other aspect herein wherein combining the identity-specific sets of trained neural-network parameters comprises:

determining one or more linear combinations of one or more corresponding subsets of trained parameters for the first image decoder for the first (j=1) identity and one or more corresponding subsets of the trained parameters for the second image decoder for the first (j=1) identity to thereby obtain one or more corresponding subsets of the blended set of neural-network parameters.

73. The method according to aspect 72 or any other aspect herein wherein the set of interpolation parameters provides the weights for the one or more linear combinations.

74. The method according to any one of aspects 72 and 73 or any other aspect herein wherein determining the one or more linear combinations comprises performing a calculation of the form:

$B_i = \alpha_{i1} M_{i,A-1} + \alpha_{i2} M_{i,B-1}$ for each of i=1, 2 ... I subsets of the trained parameters, where: $M_{i,A-1}$ is a vector whose elements are the $i^{th}$ subset of the first image decoder for the first (j=1) identity, $M_{i,B-1}$ is a vector whose elements are the $i^{th}$ subset of the second image decoder for the first (j=1) identity, $B_i$ is a vector whose elements are the $i^{th}$ subset of the blended set of neural-network parameters and $\alpha_{i1}, \alpha_{i2}$ are the interpolation parameters;

or $B_i = \alpha_{i1} M_{i,A-2} + \alpha_{i2} M_{i,B-2}$ for each of i=1, 2 ... I subsets of the trained parameters, where: $M_{i,A-2}$ is a vector whose elements are the $i^{th}$ subset of the first image decoder for the second (j=2) identity, $M_{i,B-2}$ is a vector whose elements are the $i^{th}$ subset of the second image decoder for the second (j=2) identity, $B_i$ is a vector whose elements are the $i^{th}$ subset of the blended set of neural-network parameters and $\alpha_{i1}, \alpha_{i2}$ are the interpolation parameters.

75. The method according to aspect 74 or any other aspect herein wherein inferring the output image comprises providing an inference autoencoder, the inference autoencoder comprising:

the encoder;

a blended image decoder for receiving latent codes from the encoder and reconstructing reconstructed blended images therefrom.

76. The method according to aspect 75 or any other aspect herein wherein the encoder of the inference autoencoder has parameter values obtained from training the first face-swapping model.

77. The method according to any one of aspects 75 to 76 or any other aspect herein wherein inferring the output image comprises:

constructing the blended image to decoder to comprise at least I layers, where each of the I layers of the blended image decoder is parameterized by an $i^{th}$ subset of the blended set of neural-network parameters represented by the vector $B_i$;

inputting the input image into the encoder to generate a latent code corresponding to the input image; and inputting the latent code corresponding to the input image into the blended image decoder to thereby infer the output image depicting the face that is the blend of the characteristics of the N=2 entities.

78. The method of any one of aspects 66 to 71 or any other aspect herein wherein combining the identity specific sets of trained neural network parameters comprises:

for each of i=1, 2 ... I layers the first image decoder for the first (j=1) identity and i=1, 2 ... I corresponding layers of the second image decoder for the first (j=1) identity, defining an $i^{th}$ subset of blended set of neural-network parameters according to $L_i^* = w_i^* A_i + \mu_i$, where: $L_i^*$ is a vector whose elements are the $i^{th}$ subset of blended set of neural-network parameters; $\mu_i$ is a bias vector whose elements comprise parameters of the $i^{th}$ layer of the first image decoder for the first (j=1) identity, $A_i$ is a basis vector whose elements are a difference (see equation (13B) above) between: parameters of $i^{th}$ layer of the second image decoder for the first (j=1) identity and the parameters of the $i^{th}$ layer of the first image decoder for the first (j=1) identity; and $w_i^*$ is a scalar corresponding to an $i^{th}$ one of the set of interpolation parameters;

or for each of i=1, 2 ... I layers the first image decoder for the first (j=1) identity and i=1, 2 ... I corresponding layers of the second image decoder for the first (j=1) identity, defining an $i^{th}$ subset of blended set of neural-network parameters according to $L_i^* = w_i^* A_i + \mu_i$, where: $L_i^*$ is a vector whose elements are the $i^{th}$ subset of blended set of neural-network parameters; $\mu_i$ is a bias vector whose elements comprise parameters of the $i^{th}$ layer of the first image decoder for the second (j=2) identity, $A_i$ is a basis vector whose elements are a difference (see equation (14B) above) between: parameters of $i^{th}$ layer of the second image decoder for the second (j=2) identity and the parameters of the $i^{th}$ layer of the first image decoder for the second (j=2) identity; and $w_i^*$ is a scalar corresponding to an $i^{th}$ one of the set of interpolation parameters.

79. The method of aspect 78 or any other aspect herein wherein inferring the output image comprises providing an inference autoencoder, the inference autoencoder comprising:

the encoder;

a blended image decoder for receiving latent codes from the encoder and reconstructing reconstructed blended images therefrom.

80. The method according to aspect 79 or any other aspect herein wherein the encoder of the inference autoencoder has parameter values obtained from training the first face-swapping model.

81. The method according to any one of aspects 79 to 80 or any other aspect herein wherein inferring the output image comprises:

constructing the blended image to decoder to comprise at least I layers, where each of the I layers of the blended image decoder is parameterized by an $i^{th}$ subset of the blended set of neural-network parameters represented by the vector $L_i^*$;

inputting the input image into the encoder to generate a latent code corresponding to the input image; and inputting the latent code corresponding to the input image into the blended image decoder to thereby infer the output image depicting the face that is the blend of the characteristics of the N=2 entities.

82. The method according to any one of aspects 66 to 81 or any other aspect herein wherein the first and second face-swapping autoencoders comprise first and second mask decoders for receiving latent codes from the encoder and reconstructing segmentation masks therefrom.

83. The method of aspect 82 or any other aspect herein wherein training the mask decoders involves techniques analogous to training the image decoders, combining the identity-specific sets of trained neural-network parameters involves combining the mask decoder parameters and/or inferring the output image comprises constructing a blended mask decoder.

84. A method, performed on a computer, for morphing an input image depicting a face of one of a plurality of N=2 input identities to an output image depicting a face that is a blend of characteristics of the N=2 input entities, the method comprising:
    training a first face-swapping model comprising, for each of the N=2 identities, a first face-swapping autoencoder comprising: an encoder for encoding identity images into latent codes and a first image decoder for receiving latent codes from the encoder and reconstructing identity images therefrom;
    wherein training the first face-swapping model comprises:
        for the first (j=1) identity, training the first face-swapping autoencoder using training images of the first (j=1) identity and, for the second (j=2) identity, training the first face-swapping autoencoder using training images of the second (j=2) identity;
        forcing parameters of the encoder to be the same for both of (e.g. shared between) the N=2 identities;
    training a second face-swapping model comprising, for each of the N=2 identities, a second face-swapping autoencoder comprising: the encoder for encoding identity images into latent codes and a second image decoder for receiving latent codes from the encoder and reconstructing identity images therefrom;
    wherein training the second face-swapping model comprises:
        fixing the parameters of the encoder (and, optionally, decoder parameters of one or more shared decoder layers) for both of the N=2 identities and to have parameter values obtained from training the first face-swapping model;
        for the first (j=1) identity, training at least a portion of the second image decoder using training images of the second (j=2) identity and, for the second (j=2) identity, training at least a portion of the second image decoder using training images of the first (j=1) identity receiving a set of interpolation parameters;
    combining trained neural-network parameters of the first and second image decoders for at least one of the N=2 identities to thereby obtain a blended set of neural-network parameters;
    inferring an output image depicting a face that is a blend of characteristics of the N=2 input entities using the parameters of the encoder, the blended set of neural-network parameters and the input image.

85. The method according to aspect 84 comprising any of the features, combinations of features and/or sub-combinations of features of any of aspects 66 to 83.

86. A method, performed on a computer, for training a face-morphing model to morph an input image depicting a face of one of a plurality of N input identities to an output image depicting a face that is a blend of characteristics of a blending subset of the plurality of N input entities based on a received set of interpolation parameters, the method comprising:
    providing a face-morphing model comprising:
        a shared set of trainable neural-network parameters that are shared between the plurality of N input identities; and
        for each of the plurality of N input entities, an identity-specific set of trainable neural-network parameters;
    training the face-morphing model to thereby obtain a trained face-morphing model comprising:
        a shared set of trained neural-network parameters that are shared between the plurality of N input identities; and
        for each of the plurality of N input entities, an identity-specific set of trained neural-network parameters.

87. The method according to aspect 86 comprising any of the features, combinations of features and/or sub-combinations of features of any of aspects 1 to 85 or any other aspect herein, particularly those features, combinations of features and/or sub-combinations of features relating to training the face-morphing model.

88. A system comprising one or more processors, the one or more processors configured to perform any of the methods of aspects 1 to 87.

It is therefore intended that the following appended claims and claims hereafter introduced are interpreted to include all such modifications, permutations, additions, omissions, and sub-combinations as may reasonably be inferred. The scope of the claims should not be limited by the preferred embodiments set forth in the examples, but should be given the broadest interpretation consistent with the description as a whole.

The invention claimed is:

1. A method, performed on a computer, for morphing an input image depicting a face of one of a plurality of N input identities to an output image depicting a face that is a blend of characteristics of a blending subset of the plurality of N input identities,
the method comprising:
    training a face-morphing model comprising:
        a shared set of trainable neural-network parameters that are shared between the plurality of N input identities; and
        for each of the plurality of N input identities, an identity-specific set of trainable neural-network parameters;
    to thereby obtain a trained face-morphing model comprising:
        a shared set of trained neural-network parameters that are shared between the plurality of N input identities; and
        for each of the plurality of N input identities, an identity-specific set of trained neural-network parameters;
    receiving an input image depicting a face of one of the plurality of N input identities;
    receiving a set of interpolation parameters;
    combining the identity-specific sets of trained neural-network parameters for the blending subset of the plurality of N input identities based on the interpolation parameters, to thereby obtain a blended set of neural-network parameters;

inferring an output image depicting a face that is a blend of characteristics of the blending subset of the N input identities using the shared set of trained neural-network parameters, the blended set of neural-network parameters and the input image.

2. The method according to claim 1 wherein the blending subset of the plurality of N input identities comprises a plurality of the input identities which includes one of the plurality of N input identities corresponding to the face depicted in the input image.

3. The method according to claim 1 wherein training the face-morphing model comprises:

for each of the plurality of N identities:
  obtaining training images depicting a face of the identity;
  for each training image depicting the face of the identity:
    augmenting the training image to obtain an augmented image;
    inputting the augmented image to a portion of the face-morphing model which includes the shared set of trainable neural-network parameters and the identity-specific set of trainable neural-network parameters corresponding to the identity and thereby generating a reconstructed image depicting the face of the identity;
    evaluating an image loss based at least in part on the training image and the reconstructed image;
  training at least some of the identity-specific set of trainable neural-network parameters corresponding to the identity based at least in part on the image loss associated with each training image depicting the face of the identity; and
  training the shared set of trainable neural-network parameters based at least in part on the image loss associated with each training image depicting the face of the identity, while requiring that the shared set of trainable neural-network parameters be shared across all of the plurality of N identities.

4. The method according to claim 3 wherein:

training the face-morphing model comprises, for each of the plurality of N identities, obtaining a training segmentation mask corresponding to each training image depicting the face of the identity; and for each of the plurality of N identities and for each training image depicting the face of the identity:
  inputting the augmented image to the portion of the face-morphing model which includes the shared set of trainable neural-network parameters and the identity-specific set of trainable neural-network parameters corresponding to the identity comprises generating a reconstructed segmentation mask corresponding to the training image depicting the face of the identity;
  the method comprises evaluating a mask loss based at least in part on the training segmentation mask and the reconstructed segmentation mask; and for each of the plurality of N identities:
  training at least some of the identity-specific set of trainable neural-network parameters corresponding to the identity is based at least in part on the mask loss associated with each training image depicting the face of the identity;

training the shared set of trainable neural-network parameters is based at least in part on the mask loss associated with each training image depicting the face of the identity, while requiring that the shared set of trainable neural-network parameters be shared across all of the plurality of N identities.

5. The method according to claim 1 wherein training the face-morphing model comprises: evaluating a regularization loss based on at least a portion of the shared set of trainable neural-network parameters; and training the at least a portion of the shared set of trainable neural-network parameters based on the regularization loss.

6. The method according to claim 1 wherein combining the identity-specific sets of trained neural-network parameters comprises:

determining one or more linear combinations of one or more corresponding subsets of the identity-specific sets of trained neural-network parameters to thereby obtain one or more corresponding subsets of the blended set of neural-network parameters.

7. The method according to claim 6 wherein determining the one or more linear combinations comprises performing a calculation of the form $w_i^* = \Sigma_{j=1}^{N} \alpha_{ij} w_{ij}$ for each of i=1, 2 . . . I subsets of the identity-specific sets of trained neural-network parameters, where: $w_{ij}$ is a vector whose elements are the $i^{th}$ subset of the identity-specific set of trained neural-network parameters for the $j^{th}$ identity (j∈1, 2 . . . N), $w_i^*$ is a vector whose elements are the $i^{th}$ subset of the blended set of neural-network parameters and $\alpha_{ij}$ are the interpolation parameters.

8. The method according to claim 7 wherein inferring the output image comprises:

providing an autoencoder, the autoencoder comprising:
  an encoder for encoding images into latent codes;
  an image decoder for receiving latent codes from the encoder and reconstructing reconstructed images therefrom;

constructing the image decoder to be a blended image decoder comprising at least I layers, where each of the I layers of the blended image decoder is parameterized by an $i^{th}$ set of blended decoder parameters (represented by the vector $L_i^*$) which are in turn defined by: the vector $w_i^*$ whose elements are the $i^{th}$ subset of the blended set of neural-network parameters; an $i^{th}$ set of basis vectors (represented by a matrix $A_i$) whose elements are among the shared set of trained neural-network parameters; and an $i^{th}$ bias vector $\mu_i$ whose elements are among the shared set of trained neural-network parameters;

inputting the input image into the encoder to generate a latent code corresponding to the input image; and inputting the latent code corresponding to the input image into the blended image decoder to thereby infer the output image depicting the face that is the blend of the characteristics of the blending subset of the N input identities.

9. The method according to claim 7 wherein:

providing an autoencoder, the autoencoder comprising:
  an encoder for encoding images into latent codes;
  an image decoder for receiving latent codes from the encoder and reconstructing reconstructed images therefrom;

the autoencoder comprises a mask decoder for receiving latent codes from the encoder and reconstructing reconstructed segmentation masks therefrom;

inferring the output image comprises:
  constructing the image decoder to be a blended image decoder and the mask decoder to be a blended mask decoder, wherein a combination of parameters of the blended image decoder and the blended mask decoder comprises at least I layers, where each of the I layers of the combination of parameters of the blended image decoder and the blended mask decoder is parameterized by an $i^{th}$ set of blended decoder parameters (represented by the vector $L_i^*$) which are in turn defined by: the vector $w_i^*$ whose elements are the $i^{th}$ subset of the blended set of neural-network parameters; an $i^{th}$ set of basis vectors (represented by a matrix $A_i$) whose elements are among the shared set of trained neural-network parameters; and an $i^{th}$ bias vector $\mu_i$ whose elements are among the shared set of trained neural-network parameters;
  inputting the input image into the encoder to generate a latent code corresponding to the input image;
  inputting the latent code corresponding to the input image into the blended image decoder to thereby infer the output image depicting the face that is the blend of the characteristics of the blending subset of the N input identities; and
  inputting the latent code corresponding to the input image into the blended mask decoder to thereby infer an output segmentation mask.

10. The method according to claim 1 wherein:
the face-morphing model comprises, for each of the plurality of N identities, an autoencoder comprising:
  an encoder for encoding images of the identity into latent codes;
  an image decoder for receiving latent codes from the encoder and reconstructing reconstructed images of the identity therefrom;
the encoder is the same for each of the plurality of N identities and is parameterized by encoder parameters from among the shared set of trained neural-network parameters; and
for each of the N identities (j=1, 2, ... N):
the image decoder comprises at least I layers; and
wherein, for each of the I layers:
the image decoder is parameterized by an $i^{th}$ set of image decoder parameters represented by a vector $L_{i,j}$ whose elements are prescribed according to $L_{i,j}=w_{ij}A_i+\mu_i$ where: $w_{ij}$ is a vector whose elements are among the identity-specific set of trained neural-network parameters for the layer i and the identity j; $A_i$ is a basis matrix for the $i^{th}$ layer, whose rows are basis vectors and whose elements are among the shared set of trained neural-network parameters; and $\mu_i$ is a bias vector for the $i^{th}$ layer, whose elements are among the shared set of trained neural-network parameters.

11. The method according to claim 10 wherein:
the autoencoder comprises a mask decoder for receiving latent codes from the encoder and reconstructing reconstructed segmentation masks of the identity therefrom;
for each of the N identities (j=1, 2, ... N):
a combination of parameters of the image decoder and the mask decoder comprises at least I layers; and
wherein, for each of the I layers:
the combination of parameters of the image decoder and the mask decoder is parameterized by an $i^{th}$ set of combined decoder parameters represented by a vector $L_{i,j}$ whose elements are prescribed according to $L_{i,j}=w_{ij}A_i+\mu_i$ where: $w_{ij}$ is a vector whose elements are among the identity-specific set of trained neural-network parameters for the layer i and the identity j; $A_i$ is a basis matrix for the $i^{th}$ layer, whose rows are basis vectors and whose elements are among the shared set of trained neural-network parameters; and $\mu_i$ is a bias vector for the $i^{th}$ layer, whose elements are among the shared set of trained neural-network parameters.

12. The method according to claim 10 wherein training the face-morphing model comprises:
for each of the plurality of N identities:
  obtaining training images depicting a face of the identity;
  for each training image depicting the face of the identity:
    augmenting the training image to obtain an augmented image;
    inputting the augmented image to the autoencoder corresponding to the identity and thereby generating a reconstructed image depicting the face of the identity;
    evaluating an image loss based at least in part on the training image and the reconstructed image;
  training at least some of the identity-specific set of trainable neural-network parameters corresponding to the identity based at least in part on the image loss associated with each training image depicting the face of the identity; and
  training the shared set of trainable neural-network parameters based at least in part on the image loss associated with each training image depicting the face of the identity, while requiring that the shared set of trainable neural-network parameters be shared across all of the plurality of N identities.

13. The method according to claim 12 wherein:
training the face-morphing model comprises, for each of the plurality of N identities, obtaining a training segmentation mask corresponding to each training image depicting the face of the identity; and
for each of the plurality of N identities and for each training image depicting the face of the identity:
  inputting the augmented image to the autoencoder comprises generating a reconstructed segmentation mask corresponding to the training image depicting the face of the identity;
  the method comprises evaluating a mask loss based at least in part on the training segmentation mask and the reconstructed segmentation mask; and
for each of the plurality of N identities:
  training at least some of the identity-specific set of trainable neural-network parameters corresponding to the identity is based at least in part on the mask loss associated with each training image depicting the face of the identity;
  training the shared set of trainable neural-network parameters is based at least in part on the mask loss associated with each training image depicting the face of the identity, while requiring that the shared set of trainable neural-network parameters be shared across all of the plurality of N identities.

14. The method according to claim 10 wherein training the face-morphing model comprises training a face-swapping model to thereby train the encoder parameters and wherein training the face-swapping model comprises
for each of the plurality of N identities:
  obtaining training images depicting a face of the identity;

for each training image depicting the face of the identity:
  augmenting the training image to obtain an augmented image;
  inputting the augmented image to the autoencoder corresponding to the identity and thereby generating a reconstructed image depicting the face of the identity;
  evaluating an image loss based at least in part on the training image and the reconstructed image;
training the encoder parameters based at least in part on the image loss associated with each training image depicting the face of the identity, while requiring that the encoder parameters be shared across all of the plurality of N identities.

15. The method according to claim 14 wherein:
training the face-swapping model comprises, for each of the plurality of N identities, obtaining a training segmentation mask corresponding to each training image depicting the face of the identity; and
for each of the plurality of N identities and for each training image depicting the face of the identity:
  inputting the augmented image to the autoencoder comprises generating a reconstructed segmentation mask corresponding to the training image depicting the face of the identity;
  the method comprises evaluating a mask loss based at least in part on the training segmentation mask and the reconstructed segmentation mask; and
for each of the plurality of N identities:
  training the encoder parameters based at least in part on the mask loss associated with each training image depicting the face of the identity, while requiring that the encoder parameters be shared across all of the plurality of N identities.

16. The method according to claim 14 herein wherein training the face-morphing model comprises:
fixing the encoder parameters with values obtained from training the face-swapping model;
for each of the plurality of N identities:
  obtaining training images depicting a face of the identity;
  for each training image:
    augmenting the training image to obtain an augmented image;
    inputting the augmented image to the autoencoder corresponding to the identity and thereby generating a reconstructed image depicting the face of the identity;
    evaluating an image loss based at least in part on the training image and the reconstructed image;
for each of the plurality of N identities and for each of the at least I layers of the image decoder:
  training the corresponding $i^{th}$ subset of the identity-specific set of trained neural-network parameters corresponding to the identity (defined by the elements of a vector $w_{ij}$) based at least in part on the image loss associated with each training image depicting the face of the identity; and
  training the $i^{th}$ hypernetwork parameterized by hypernetwork parameters defined by the elements of a basis matrix $A_i$ and a bias vector $\mu_i$ based at least in part on the image loss associated with each training image depicting the face of the identity, while requiring that the hypernetwork parameters be shared across all of the plurality of N identities.

17. The method according to claim 11 wherein training the face-morphing model comprises:
training a face-swapping model to thereby train the encoder parameters,
fixing the encoder parameters (and, optionally, decoder parameters of one or more shared decoder layers) with values obtained from training the face-swapping model;
for each of the plurality of N identities:
  obtaining training images depicting a face of the identity;
  obtaining a training segmentation mask corresponding to each training image;
  for each training image:
    augmenting the training image to obtain an augmented image;
    inputting the augmented image to the autoencoder corresponding to the identity and thereby generating a reconstructed image depicting the face of the identity and a reconstructed segmentation mask corresponding to the training image;
    evaluating an image loss based at least in part on the training image and the reconstructed image;
    evaluating a mask loss based at least in part on the training segmentation mask and the reconstructed segmentation mask;
for each of the plurality of N identities and for each of the at least I layers of the combination of the parameters of the image decoder and the mask decoder:
  training the corresponding $i^{th}$ subset of the identity-specific set of trained neural-network parameters corresponding to the identity (which may be defined by the elements of a vector $w_{ij}$) based at least in part on the image loss and the mask loss associated with each training image depicting the face of the identity; and
  training the $i^{th}$ hypernetwork parameterized by hypernetwork parameters defined by the elements of a basis matrix $A_i$ and a bias vector $\mu_i$ based at least in part on the image loss and the mask loss associated with each training image depicting the face of the identity, while requiring that the hypernetwork parameters be shared across all of the plurality of N identities.

18. The method according to claim 1 wherein:
the plurality of N input identities comprises N=2 identities and the blending subset of the N input identities comprises two identities;
training the face-morphing model comprises:
  training a first face-swapping model comprising, for each of the N=2 identities, a first face-swapping autoencoder comprising: an encoder for encoding identity images into latent codes and a first image decoder for receiving latent codes from the encoder and reconstructing identity images therefrom;
  wherein training the first face-swapping model comprises:
    for the first (j=1) identity, training the first face-swapping autoencoder using training images of the first (j=1) identity and, for the second (j=2) identity, training the first face-swapping autoencoder using training images of the second (j=2) identity;
    forcing parameters of the encoder to be the same for both of the N=2 identities;
  training a second face-swapping model comprising, for each of the N=2 identities, a second face-swapping autoencoder comprising: the encoder for encoding identity images into latent codes and a second image decoder for receiving latent codes from the encoder and reconstructing identity images therefrom;

wherein training the second face-swapping model comprises:

fixing the parameters of the encoder for both of the N=2 identities and to have parameter values obtained from training the first face-swapping model;

for the first (j=1) identity, training the second image decoder using training images of the second (j=2) identity and, for the second (j=2) identity, training the second image decoder using training images of the first (j=1) identity.

19. The method according to claim 18 wherein training the second face-swapping model comprises:

for the first (j=1) identity: initializing parameters of the second image decoder using values obtained from training the first image decoder for the first (j=1) identity; and training the second image decoder using training images of the second (j=2) identity; and for the second (j=2) identity: initializing parameters of the second image decoder using values obtained from training the first image decoder for the second (j=2) identity; and training the second image decoder using training images of the first (j=1) identity.

20. The method according to claim 18 wherein training the first face-swapping model comprises:

for the first (j=1) identity:
  obtaining training images depicting a face of the first (j=1) identity;
  for each training image depicting the face of the first (j=1) identity:
    augmenting the training image to obtain an augmented image;
    inputting the augmented image to the first face-swapping autoencoder corresponding to the first (j=1) identity and thereby generating a reconstructed image depicting the face of the first (j=1) identity;
    evaluating an image loss based at least in part on the training image and the reconstructed image;
  training at least some parameters of the first image decoder for the first (j=1) identity based at least in part on the image loss associated with each training image depicting the face of the first (j=1) identity
  training the encoder parameters based at least in part on the image loss associated with each training image depicting the face of the first (j=1) identity, while requiring that the encoder parameters be shared across the plurality of N=2 identities; and for the second (j=2) identity:
  obtaining training images depicting a face of the second (j=2) identity;
  for each training image depicting the face of the second (j=2) identity:
    augmenting the training image to obtain an augmented image;
    inputting the augmented image to the first face-swapping autoencoder corresponding to the second (j=2) identity and thereby generating a reconstructed image depicting the face of the second (j=2) identity;
    evaluating an image loss based at least in part on the training image and the reconstructed image;
  training at least some parameters of the first image decoder for the second (j=2) identity based at least in part on the image loss associated with each training image depicting the face of the second (j=2) identity
  training the encoder parameters based at least in part on the image loss associated with each training image depicting the face of the second (j=2) identity, while requiring that the encoder parameters be shared across the plurality of N=2 identities.

21. The method according to claim 18 wherein training the second face-swapping model comprises for the first (j=1) identity:
  obtaining training images depicting a face of the second (j=2) identity;
  for each training image depicting the face of the second (j=2) identity:
    augmenting the training image to obtain an augmented image;
    inputting the augmented image to the second face-swapping autoencoder corresponding to the first (j=1) identity and thereby generating a reconstructed image depicting the face of the second (j=2) identity;
    evaluating an image loss based at least in part on the training image and the reconstructed image;
  maintaining the encoder parameters fixed with values obtained during training of the first face-swapping model;
  training at least some parameters of the second image decoder for the first (j=1) identity based at least in part on the image loss associated with each training image depicting the face of the second (j=2) identity for the second (j=2) identity:
  obtaining training images depicting a face of the first (j=1) identity;
  for each training image depicting the face of the first (j=1) identity:
    augmenting the training image to obtain an augmented image;
    inputting the augmented image to the first face-swapping autoencoder corresponding to the second (j=2) identity and thereby generating a reconstructed image depicting the face of the first (j=1) identity;
    evaluating an image loss based at least in part on the training image and the reconstructed image;
  maintaining the encoder parameters fixed with values obtained during training of the first face-swapping model;
  training at least some parameters of the second image decoder for the second (j=2) identity based at least in part on the image loss associated with each training image depicting the face of the first (j=1) identity.

22. The method according to claim 18 wherein combining the identity-specific sets of trained neural-network parameters comprises:

determining one or more linear combinations of one or more corresponding subsets of trained parameters for the first image decoder for the first (j=1) identity and one or more corresponding subsets of the trained parameters for the second image decoder for the first (j=1) identity to thereby obtain one or more corresponding subsets of the blended set of neural-network parameters.

23. The method according to claim 22 wherein determining the one or more linear combinations comprises performing a calculation of the form:

$B_i = \alpha_{i1} M_{i,A-1} + \alpha_{i2} M_{i,B-1}$ for each of i=1, 2 ... I subsets of the trained parameters, where: $M_{i,A-1}$ is a vector whose elements are the $i^{th}$ subset of the first image decoder for the first (j=1) identity, $M_{i,B-1}$ is a vector whose elements are the $i^{th}$ subset of the second image decoder for the first (j=1) identity, $B_i$ is a vector whose elements are the $i^{th}$ subset of the blended set of neural-network parameters and $\alpha_{i1}$, $\alpha_{i2}$ are the interpolation parameters;

or $B_i = \alpha_{i1} M_{i,A-2} + \alpha_{i2} M_{i,B-2}$ for each of i=1, 2 ... I subsets of the trained parameters, where: $M_{i,A-2}$ is a vector whose elements are the $i^{th}$ subset of the first image decoder for the second (j=2) identity, MiB-2 is a vector whose elements are the $i^{th}$ subset of the second image decoder for the second (j=2) identity, $B_i$ is a vector whose elements are the $i^{th}$ subset of the blended set of neural-network parameters and $\alpha_{i1}$, $\alpha_{i2}$ are the interpolation parameters.

24. The method according to claim 23 wherein inferring the output image comprises:
providing an inference autoencoder, the inference autoencoder comprising:
the encoder;
a blended image decoder for receiving latent codes from the encoder and reconstructing reconstructed blended images therefrom;
constructing the blended image to decoder to comprise at least I layers, where each of the I layers of the blended image decoder is parameterized by an $i^{th}$ subset of the blended set of neural-network parameters represented by the vector $B_i$;
inputting the input image into the encoder to generate a latent code corresponding to the input image; and
inputting the latent code corresponding to the input image into the blended image decoder to thereby infer the output image depicting the face that is the blend of the characteristics of the N=2 identities.

25. The method of claim 18 wherein combining the identity specific sets of trained neural network parameters comprises:
for each of i=1, 2 ... I layers the first image decoder for the first (j=1) identity and i=1, 2 ... I corresponding layers of the second image decoder for the first (j=1) identity, defining an $i^{th}$ subset of blended set of neural-network parameters according to $L_i^* = w_j^* A_i + \mu_i$, where: $L_i^*$ is a vector whose elements are the $i^{th}$ subset of blended set of neural-network parameters; $\mu_i$ is a bias vector whose elements comprise parameters of the $i^{th}$ layer of the first image decoder for the first (j=1) identity, $A_i$ is a basis vector whose elements are a difference (see equation (13B) above) between: parameters of $i^{th}$ layer of the second image decoder for the first (j=1) identity and the parameters of the $i^{th}$ layer of the first image decoder for the first (j=1) identity; and $w_i^*$ is a scalar corresponding to an $i^{th}$ one of the set of interpolation parameters;

or for each of i=1, 2 ... I layers the first image decoder for the first (j=1) identity and i=1, 2 ... I corresponding layers of the second image decoder for the first (j=1) identity, defining an $i^{th}$ subset of blended set of neural-network parameters according to $L_i^* = w_i^* A_i + \mu_i$, where: $L_i^*$ is a vector whose elements are the $i^{th}$ subset of blended set of neural-network parameters; $\mu_i$ is a bias vector whose elements comprise parameters of the $i^{th}$ layer of the first image decoder for the second (j=2) identity, $A_i$ is a basis vector whose elements are a difference (see equation (14B) above) between: parameters of $i^{th}$ layer of the second image decoder for the second (j=2) identity and the parameters of the $i^{th}$ layer of the first image decoder for the second (j=2) identity; and $w_i^*$ is a scalar corresponding to an $i^{th}$ one of the set of interpolation parameters.

26. The method according to claim 25 wherein inferring the output image comprises:
providing an inference autoencoder, the inference autoencoder comprising:
the encoder;
a blended image decoder for receiving latent codes from the encoder and reconstructing reconstructed blended images therefrom;
constructing the blended image to decoder to comprise at least I layers, where each of the I layers of the blended image decoder is parameterized by an $i^{th}$ subset of the blended set of neural-network parameters represented by the vector $L_i^*$;
inputting the input image into the encoder to generate a latent code corresponding to the input image; and
inputting the latent code corresponding to the input image into the blended image decoder to thereby infer the output image depicting the face that is the blend of the characteristics of the N=2 identities.

27. The method of claim 18 wherein the first and second face-swapping autoencoders comprise first and second mask decoders for receiving latent codes from the encoder and reconstructing segmentation masks therefrom and wherein training the mask decoders involves techniques analogous to training the image decoders, combining the identity-specific sets of trained neural-network parameters involves combining the mask decoder parameters and/or inferring the output image comprises constructing a blended mask decoder.

28. A method, performed on a computer, for training a face-morphing model to morph an input image depicting a face of one of a plurality of N input identities to an output image depicting a face that is a blend of characteristics of a blending subset of the plurality of N input identities based on a received set of interpolation parameters, the method comprising:
providing a face-morphing model comprising:
a shared set of trainable neural-network parameters that are shared between the plurality of N input identities; and
for each of the plurality of N input identities, an identity-specific set of trainable neural-network parameters;
training the face-morphing model to thereby obtain a trained face-morphing model comprising:
a shared set of trained neural-network parameters that are shared between the plurality of N input identities; and
for each of the plurality of N input identities, an identity-specific set of trained neural-network parameters.

29. A system comprising one or more processors, the one or more processors configured to perform the method of claim 1.

* * * * *